(12) United States Patent
Thomas et al.

(10) Patent No.: US 11,889,224 B2
(45) Date of Patent: Jan. 30, 2024

(54) ELECTRONIC COOKING ASSISTANT

(71) Applicants: C. Douglass Thomas, Saratoga, CA (US); Adrienne Yeung, San Jose, CA (US)

(72) Inventors: C. Douglass Thomas, Saratoga, CA (US); Adrienne Yeung, San Jose, CA (US)

( * ) Notice: Subject to any disclaimer, the term of this patent is extended or adjusted under 35 U.S.C. 154(b) by 271 days.

(21) Appl. No.: 15/393,707

(22) Filed: Dec. 29, 2016

(65) Prior Publication Data
US 2017/0195542 A1    Jul. 6, 2017

Related U.S. Application Data

(60) Provisional application No. 62/273,879, filed on Dec. 31, 2015, provisional application No. 62/273,897, filed on Dec. 31, 2015.

(51) Int. Cl.
| | |
|---|---|
| *H04N 5/232* | (2006.01) |
| *H04N 5/225* | (2006.01) |
| *H04N 5/907* | (2006.01) |
| *H04W 4/20* | (2018.01) |
| *G03B 17/56* | (2021.01) |

(Continued)

(52) U.S. Cl.
CPC ............... *H04N 5/907* (2013.01); *A23L 5/10* (2016.08); *A47J 36/321* (2018.08); *F16B 47/00* (2013.01); *G03B 17/561* (2013.01); *G08B 3/10* (2013.01); *G08B 21/24* (2013.01); *H04N 5/2252* (2013.01); *H04N 5/2253* (2013.01); *H04N 5/23203* (2013.01); *H04N 5/23216* (2013.01); *H04N 5/23293* (2013.01); *H04N 5/247* (2013.01); *H04W 4/21* (2018.02); *A23V 2002/00* (2013.01); *H04N 2005/2255* (2013.01)

(58) Field of Classification Search
CPC .... H04N 5/907; H04N 5/247; H04N 5/23293; H04N 5/23216; H04N 5/23203; H04N 5/2253; H04N 2005/2255; H04N 5/2252; G08B 21/24; G08B 3/10; G03B 17/561; F16B 47/00; A23L 5/10; A23V 2002/00; A47J 36/32
USPC ......................................................... 99/334
See application file for complete search history.

(56) References Cited

U.S. PATENT DOCUMENTS

| | | |
|---|---|---|
| 3,742,173 A | 6/1973 | Kormrumpf et al. |
| 6,559,882 B1 | 5/2003 | Kerchner |

(Continued)

OTHER PUBLICATIONS

"Lenox/Pultx High-Temperature CCTV Furnace Video Camera Systems", www.lenoxinst.com, 2 pages, downloaded May 6, 2014.
Office Action for U.S. Appl. No. 15/393,739, dated Oct. 4, 2018.

*Primary Examiner* — Dana Ross
*Assistant Examiner* — Kuangyue Chen

(57) ABSTRACT

In one embodiment, an apparatus, method, and system for acquiring at least one image inside a cooking device including a housing having a front surface, back surface, and an interior; at least one attachment element removably coupled to the back surface of the housing, the attachment element configured to secure the housing to an external surface of the cooking device; a camera positioned at least partially within the interior of the housing, the camera configured to acquire the at least one image; and a controller configured to manage i) acquisition of the at least one image acquired by the camera and ii) transmission of the at least one image to a remote electronic device.

27 Claims, 26 Drawing Sheets

(51) Int. Cl.

| | | |
|---|---|---|
| *F16B 47/00* | (2006.01) | |
| *G08B 21/24* | (2006.01) | |
| *G08B 3/10* | (2006.01) | |
| *A23L 5/10* | (2016.01) | |
| *H04N 5/247* | (2006.01) | |
| *H04W 4/21* | (2018.01) | |
| *A47J 36/32* | (2006.01) | |

(56) References Cited

U.S. PATENT DOCUMENTS

| | | |
|---|---|---|
| 6,587,739 B1 | 7/2003 | Abrams et al. |
| 2007/0158335 A1 | 7/2007 | Mansbery |
| 2008/0016944 A1* | 1/2008 | Legrand .............. G01N 33/2823 73/25.01 |
| 2011/0167100 A1 | 7/2011 | Brodowski |
| 2012/0133645 A1* | 5/2012 | Jung .................... H04N 13/128 345/419 |
| 2013/0149679 A1 | 6/2013 | Tokuda et al. |
| 2013/0222672 A1* | 8/2013 | Kim .................... H04N 5/23293 348/333.11 |
| 2014/0240125 A1* | 8/2014 | Burch ................ G08B 21/0213 340/539.13 |
| 2015/0330640 A1* | 11/2015 | Stork genannt Wersborg ............. F24C 7/08 99/332 |
| 2016/0063734 A1 | 3/2016 | Divakaran et al. |
| 2017/0188741 A1 | 7/2017 | Thomas |
| 2017/0195542 A1 | 7/2017 | Thomas |
| 2018/0111506 A1* | 4/2018 | Penna ................ B60H 1/00978 |

\* cited by examiner

ELECTRONIC COOKING ASSISTANT

CROSS-REFERENCE TO RELATED APPLICATIONS

This application claims priority benefit of U.S. Provisional Patent Application No. 62/273,879, filed on Dec. 31, 2015 and entitled "ELECTRONIC COOKING ASSISTANT," which is hereby incorporated herein by reference.

This application also claims priority benefit of U.S. Provisional Patent Application No. 62/273,897, filed on Dec. 31, 2015 and entitled "METHOD AND SYSTEM FOR ACQUIRING COOKING INFORMATION," which is hereby incorporated herein by reference.

BACKGROUND OF THE INVENTION

Cooking provides a way for cooks (e.g. chefs) to prepare healthy foods in a creative way. As a chef, cooking puts you in control of what yourself and others are able to eat. Cooking provides a way for those with dietary restrictions to cook foods that are safe for them to eat.

In today's busy society, cooking provides a way for family to get together and socialize with one another. Socializing with family stabilizes family relationships, builds bonds between family members, and allows time to unwind with each other after a long day of school or work. Items such a pottery and shrink art can be cooked to make arts and crafts. Arts and crafts can help promote a creative lifestyle.

While technology, such as ovens, mixers and the like, are gradually becoming infused with more technology, ordinary users are often without the benefit of technology in their cooking endeavors. Sometime technology can assist with better or more efficient cooking results. Technology is today also a means to a social connection with others. Regardless, today, technology does not readily assist ordinary users with cooking and socializing about cooking. Thus, there is need to facilitate cooking though use of technology that can allow for not only better cooking results but also socializing with respect to cooking.

OVERVIEW

An electronic cooking assistant and cooking methods are described herein that use technology to assist in monitoring, controlling and/or socializing with respect to cooking.

An electronic cooking assistant may have a camera to capture images or video of items inside or on a cooking device. The electronic cooking assistant allows for remote monitoring of items inside or on the cooking device. As such, a user does not need to be physically near the cooking device to constantly monitor the item inside the cooking device. The electronic cooking assistant can alternatively or additionally allow the user to remotely control the cooking device.

One embodiment pertains to an apparatus for acquiring at least one image inside a cooking device. The apparatus can include a housing having a front surface, back surface, and an interior; at least one attachment element removably coupled to the back surface of the housing, the attachment element configured to secure the housing to an external surface of the cooking device; a camera positioned at least partially within the interior of the housing, the camera configured to acquire the at least one image; and a controller configured to manage i) acquisition of the at least one image acquired by the camera and ii) transmission of the at least one image to a remote electronic device.

Another embodiment can pertain to an apparatus for acquiring at least one image of an item being cooked with a cooking device including a housing having at least one mounting element configured to mount the housing to the cooking device and a camera coupled to the housing for acquiring one or more images of the item being cooked within the cooking device.

In still another embodiment can pertain to an apparatus for acquiring at least one image inside a cooking device. The cooking device can include a housing having a front surface, back surface and a receiver opening configured to receive a portable electronic device; at least one attachment element removably coupled to the back surface of the housing, the attachment element configured to secure the housing to an external surface of the cooking device; and a controller configured to manage i) acquisition of at least one image acquired by the at least one camera and ii) transmission of the at least one image to a remote electronic device.

One embodiment can pertains to a method for monitoring an item being cooked within a cooking device including capturing, by an image capturing device mounted to an external surface of the cooking device, at least one image of the item being cooked within the cooking device; saving the at least one image to a memory; and transmitting the at least one image to a remote electronic device.

Another embodiment can pertain to a method for capturing at least one image of at least one item in a cooking device including coupling a portable electronic device to a device holding apparatus. The portable electronic device can include a camera to capture at least one image of the at least one item being cooked in the cooking device; and storing the captured images.

One embodiment can pertain to a system for monitoring cooking including a cooking device configured to cook an item, an image acquisition device configured to acquire at least one image inside the cooking device, and a remote device having a display screen, the computing device being configured to receive the at least one image acquired by the image acquisition device and display the at least one image.

The present invention can provide other hardware configured to perform the methods of the invention, as well as software stored in a machine-readable medium (e.g., a tangible storage medium) to control devices to perform these methods. These and other features will be presented in more detail in the following detailed description of the invention and the associated figures.

BRIEF DESCRIPTION OF THE DRAWINGS

The accompanying drawings, which are incorporated into and constitute a part of this specification, illustrate one or more example embodiments and, together with the description of example embodiments, serve to explain the principles and implementations.

In the drawings.

DESCRIPTION OF EXAMPLE EMBODIMENTS

Embodiments are described herein in the context of an electronic cooking assistant. The following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the specific goals, such as compliance with application- and business-related constraints, and that these specific goals will vary from one implementation to another and from one person to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

An electronic cooking assistant and cooking methods are described that use technology to assist in monitoring, controlling and/or socializing with respect to cooking. An electronic cooking assistant may have a camera to capture images or video of items inside or on a cooking device. The electronic cooking assistant allows for remote monitoring of items inside or on the cooking device. As such, a user does not need to be physically near the cooking device to constantly monitor the item inside the cooking device.

Embodiments of this aspect of the invention are discussed below with reference to FIGS. 1A-15B. However, those skilled in the art will readily appreciate that the detailed description given herein with respect to these figures is for explanatory purposes as the invention extends beyond these limited embodiments.

Figure 1A:
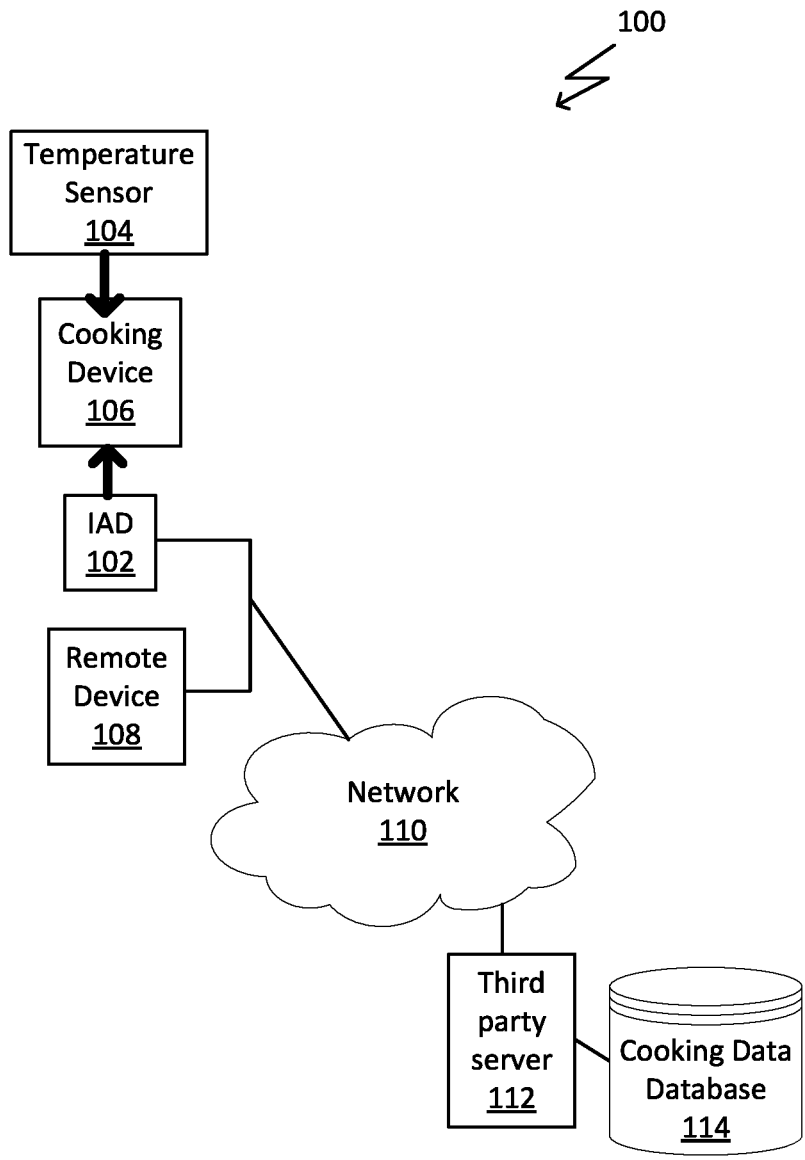
FIGS. 1A-1C illustrate example embodiments of a system for monitoring cooking.
Figure 1B:
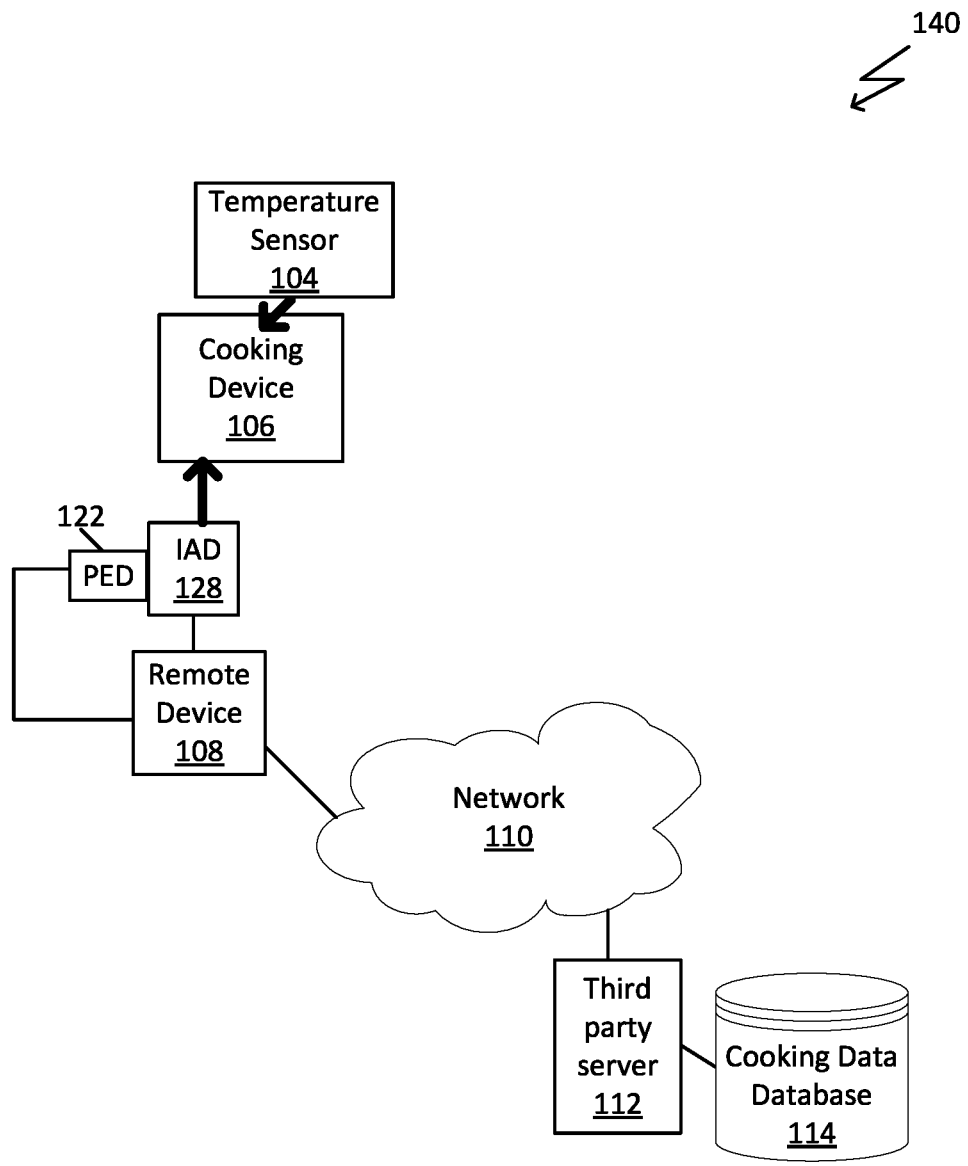
Figure 1C:
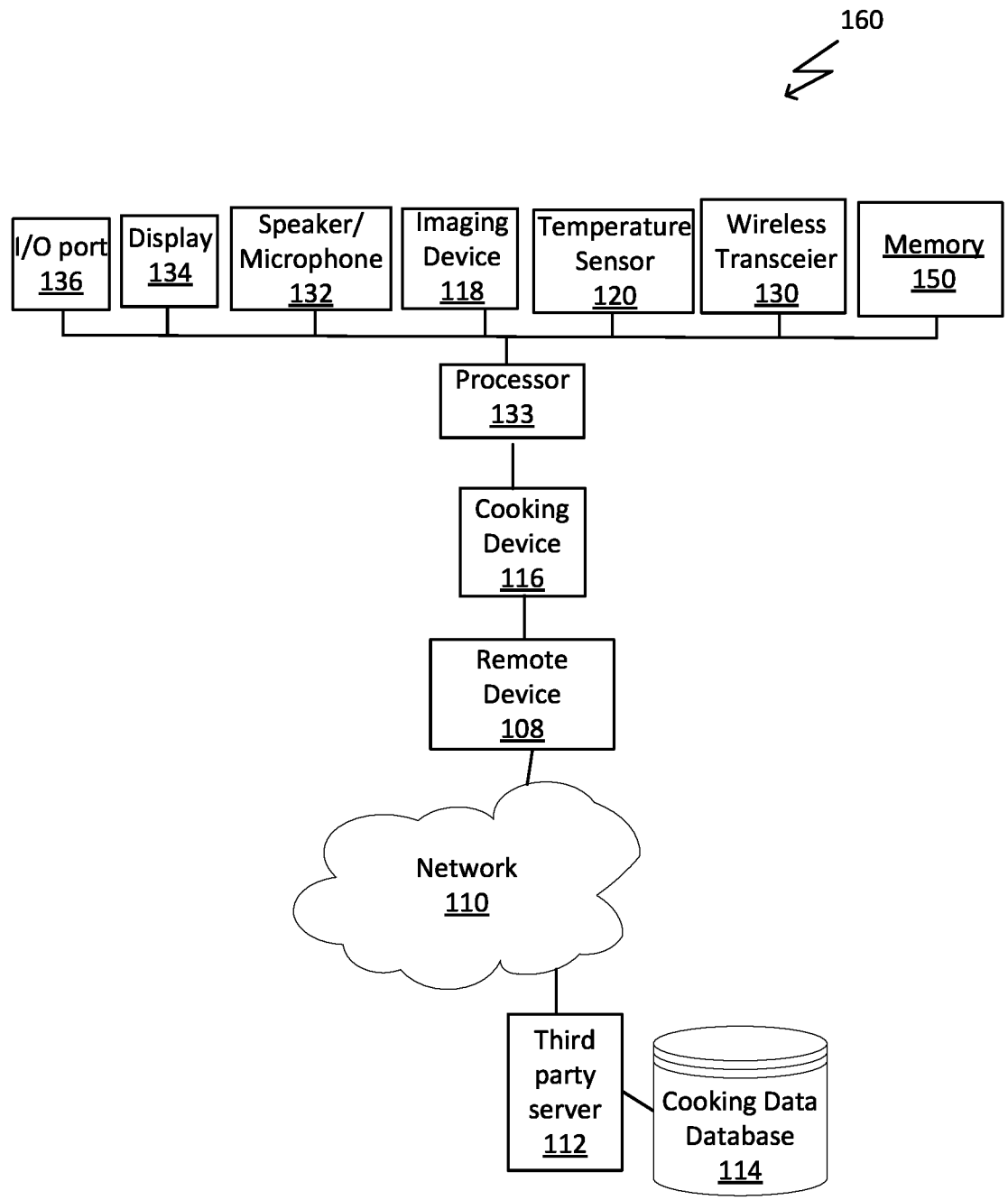

FIGS. 1A-1C illustrate example embodiments of a system for monitoring cooking. Referring now to FIG. 1A, an example embodiment of a system for monitoring cooking. The system 100 may include a cooking device 106. The cooking device 106 may have an image acquisition device (IAD) 102 removably attached thereon. The IAD 102 can communicate with a remote device 108. The IAD 102 can transmit cooking information or data, such as temperature data, pressure data, images, videos, alerts, messages, or any other desired information to remote device 108. The user can then use their remote device 108a to view the transmitted cooking information.

The cooking device 106 may be any device configured to cook or bake such as an oven, a barbeque grill, a fryer, a broiler, a smoker, a stove, a microwave oven, or any other similar devices. The cooking device 106 may have at least one window to allow a user and/or the IAD 102 to view items inside the cooking device 106.

The cooking device 106 may be used to cook or bake various items such as cakes, lasagna, chicken, seafood, meats, vegetables, and any other foods. The cooking device 106 can also be used to cook or bake non-food items such as clay, plastic (e.g. shrink plastic), crayons, other arts and craft materials, and the like.

The cooking device 106 may have a display or control panel designed to adjust temperature, cooking time, or any other features of the cooking device. In one embodiment, the display may be a touch screen display to permit a user to adjust temperature and cooking time by touching the display screen viewed via a graphical user interface. In another embodiment, the control panel may have knobs or buttons (i.e. an up and down arrow button, on and off button, and the like) that a user may use to adjust temperature and cooking time. The temperature and cooking time may then be displayed on a display, such as a light emitting diode (LED) display or any other type of display capable of presenting information or data on the graphical user interface.

Cooking device 106 may have a temperature sensor 104 positioned within the cooking device 106. The temperature sensor 104 may be configured to monitor the temperature of the item being cooked or baked inside the cooking device 106. The temperature sensor 104 can be any device capable of obtaining temperature, such as a thermometer, memory metal, infrared sensor, or any other similar device. As further discussed in detail with reference to FIGS. 7-9, the temperature sensor may be positioned on the cooking device 106, within the item being cooked or baked, or on a substrate containing the item being cooked or baked. In some embodiments, the IAD 102 may be designed to capture the image and/or video of the temperature sensor.

The IAD 102 may be removably mounted or attached to a window of the cooking device 106. When attached to the window, the IAD 102 may acquire information about the item being cooked or baked within the cooking device 106. For example, the IAD 102 may obtain images or videos of the items inside the cooking device 106. This allows for remote monitoring of items within the cooking device 102 as the items are being cooked or baked. As such, a user does not need to be physically near the cooking device 106 to constantly monitor the item inside the cooking device 106 to prevent being overcooked or burned. The IAD 102 may be mounted on the window of the cooking device 106 using any known attachment element such as suction cups, adhesive, magnets, hook and loop fasteners, or any other similar element capable of mounting the IAD 102 to the cooking device 106.

In another embodiment, IAD 102 may be positioned in a position above the cooking device to obtain images or video of items being cooked on top of cooking device 106. For example, the IAD 102 may be positioned on a fan or microwave above a stove.

The IAD 102 may include an imaging device (e.g. a camera, camcorder, or any other similar device capable of taking images and/or video) capable of obtaining images or videos of the items inside the cooking device 106. Each image or video may also include an image or video of the temperature sensor 104. In one embodiment, the IAD 102 may obtain the image and/or video via the imaging device periodically and/or over a predetermined period of time. For example, the imaging device may acquire the images or video every two (2), five (5), or ten (10) minutes. In another example, the imaging device may acquire the images or video every ten (10), fifteen (15), thirty (30), or forty-five (45) seconds. In another embodiment, a user may set the desired time periods. For example, the user may set the IAD 102 to obtain the images or video every one (1), five (5), or ten (10) minutes. The time periods may be selected or changed via the graphical user interface on the display or control panel of the cooking device 106. In another embodiment, the user may remotely set or change the time periods using the remote device 108.

The IAD 102 may obtain the images and/or video for a predetermined period of time during the cooking time of the item within the cooking device 106. For example, if the cooking time is forty-five (45) minutes, the IAD 102 may acquire the images and/or video during the entire forty-five (45) minutes. In another embodiment, the IAD 102 may begin acquiring the image and/or video in the middle of the cooking time. If the cooking time is one hour, the IAD 102 may begin to obtain the image and/or video after thirty (30) minutes of cooking time has passed. In still another embodiment, the IAD 102 may begin to acquire the image and/or video in the last ten (10) or fifteen (15) minutes of cooking time. Regardless of when the IAD 102 begins the imaging time period, the IAD 102 may obtain the images periodically (e.g. as discussed above, such as every five (5) minutes, thirty (30) seconds, etc.) during the predetermined period of time. In one embodiment, the imaging time period may be selected on the IAD 102. In another embodiment, the imaging time period may be remotely selected using the remote device 108.

Additionally, instructions to switch between capturing images and video may be remotely transmitted from the remote device 108 to the cooking device 106. For example, a change instruction may instruct the cooking device to obtain still images for thirty minutes, take video for ten minutes, then capture still images for another thirty minutes.

The cooking information or data, such as the image and/or video, may be stored in a memory of the IAD 102. The images may then be transferred to remote device 108 via any known wired or wireless means. For example, the IAD 102 may be configured to communicate with remote device 108 via any known wired means. The IAD 102 may have an input/output port to connect the IAD 102 via a wire or cable to other devices such as a computer, cellular phone, tablet, or any other similar device. In another example, IAD 102 may have a wireless transceiver configured to wirelessly transmit data to remote device 108. IAD 102 may communicate wireless with remote device 108 via any known wireless means such as Bluetooth, Wi-Fi, WAN, or any other similar wireless communication methods.

In one embodiment, IAD 102 may have a speaker to output audio notification or messages. The audio notifications or messages may be any message to alert the user of any desired information such as the end of the cooking time, whether the item within the cooking device 106 is burning or overcooked, malfunction or power loss, or any other similar audio messages that may or may not require user attention. For example, the IAD 102 may transmit an audio message "cooking complete!" In another example, the IAD 102 may transmit an audio message "15 minutes remaining" not requiring user attention.

The stored images/video of the IAD 102 may be transmitted via wired or wireless means to remote device 108 for remote monitoring of the items being cooked or baked within the cooking device 106. Remote device 108 can be any portable or non-portable computing device such as a cellular phone, tablet, computer, media device, netbook, laptop, or any other similar electronic device. The remote device 108 may have a display to present or display the stored images and/or video. The IAD 102 may also transmit cooking data to remote device 108 for display on the display. The cooking data may be any information such as temperature data, pressure data, images, videos, alerts, messages, or any other desired information.

In one embodiment, the user may remotely monitor the items being cooked within the cooking device 106 based on the images/video transmitted from the IAD 102 to the remote device 108. For example, if the image and/or video displayed on the remote device 108 shows the item having a dark or black color, the user will know that the item being cooked or baked is overcooked or burned. In another example, if the image and/or video displayed on the remote device 108 shows the item as not having risen (e.g. a cake or bread), the user will know that the item being cooked or baked is not completely cooked. In still another embodiment, the images and/or video displayed on the remote device 108 will include an image or video of the temperature sensor 104. Thus, the user is able to monitor the temperature of the item within the cooking device 106. For example, if the optimal cooking temperature is 350° F., yet the image and/or video illustrates the temperature sensor 104 having a temperature of 400° F., this will alert the user that the temperature of the cooking device 106 needs to be lowered.

The images and/or videos may also be automatically monitored by the IAD 102. For example, IAD 102 may determine that the item within the cooking device 106 is overcooked, completely cooked and ready to be removed, burned, or undercooked. The determination may be based upon the color hue, colorfulness, chroma, saturation, lightness, or brightness of the item obtained from the images and/or video. In one embodiment, if the IAD 102 determines that the item being cooked is burned, the IAD 102 may transmit an audio message or notification "The food is burning!" Simultaneously or alternatively, the IAD 102 may transmit a "The food is burning!" alert or notification to the remote device 108 to be presented on the display of the remote device 108.

The IAD 102 may also determine that the cooking temperature is not at the optimal cooking temperature based upon the temperature sensor 104 image obtained or based upon the images and/or video. For example, an image of the temperature sensor 104 after thirty (30) minutes of cooking time may be at 300° F., when it should be at 400° F. In one embodiment, the IAD 102 may transmit an audio alert or notification "The temperature is low!" Simultaneously or in the alternative, the IAD 102 may transmit a "The temperature is low!" alert or notification to the remote device 108 to be presented on the display of the remote device 108. Such cooking information or data (e.g. low temperature, food overcook, and any other cooking information or data) may also be stored in a memory of the IAD 102.

The remote device 108 and/or the IAD 102 may communicate with a third party server 112 via network 110. The third party server 112 may be associated with any service or product provider such as a social media company, advertiser, data collection service, establishment (e.g. grocery store, deli, restaurant, coffee shop, and the like), or any other service or product provider. The images, video, and cooking information/data stored in the IAD 102 may be transmitted to the third party server 112. The third party server 112 may have a cooking database 114 in which to store all the received cooking information or data.

The third party server 112 may allow a plurality of users to share images, videos, and/or cooking information/data with other users in a social media setting. A user may also utilize the third party server 112 to determine how to improve upon previously cooked items. For example, the user may utilize prior cooking information to determine how to adjust, improve upon, or change a bread recipe. In another example, users may use the stored cooking information to obtain cooking instructions if they forgot how to cook a specific item.

The stored cooking information or data can include information such as how long the item was cooked, the temperature at which the item was cooked, the pressure at which the item was cooked, if any malfunctions occurred, or any other similar information. For example, after a specific item is cooked, users can eat the food and determine whether they liked or disliked the way the food was cooked. They can then log a rating on the third party server 112 using any known rating methods such as stars, numerical rating, and the like.

Although illustrated with the use of one cooking device 106 and one IAD 102, this is not intended to be limiting as any number of cooking devices and IADs may be used. As such, each IAD may be configured to communicate with at least one remote device 108. For example, a restaurant chef may choose to have a plurality of cooking devices activated at the same time. An IAD may be coupled to each of the plurality of cooking devices. Each of the IADs may be configured to communicate with at least one remote device 108. In one embodiment, the plurality of IADs 102 may be configured to communicate with the same remote device 108.

Referring now to FIG. 1B, another example embodiment of a system for monitoring cooking. The system 100 may include a cooking device 106. The cooking device 106 may have an image acquisition device (IAD) 128 removably attached thereon. The IAD 128 can communicate with a remote device 108. The IAD 128 can transmit cooking information or data, such as temperature data, pressure data, images, videos, alerts, messages, or any other desired information to remote device 108. The user can then use their remote device 108 to view the transmitted cooking information.

The cooking device 106 may be any device configured to cook or bake such as an oven, a barbeque grill, a fryer, a broiler, a smoker, a stove, a microwave oven, or any other similar devices. The cooking device 106 may have at least one window to allow a user and/or the IAD 128 to view items inside the cooking device 106.

The cooking device 106 may be used to cook or bake various items such as cakes, lasagna, chicken, seafood, meats, vegetables, and any other foods. The cooking device 106 can also be used to cook or bake non-food items such as clay, plastic (e.g. shrink plastic), crayons, other arts and craft materials, and the like. The cooking device 106 may also be used to cook items on top of the cooking device 106.

The cooking device 106 may have a display or control panel designed to adjust temperature, cooking time, or any other features of the cooking device. In one embodiment, the display may be a touch screen display to permit a user to adjust temperature and cooking time by touching the display screen viewed via a graphical user interface. In another embodiment, the control panel may have knobs or buttons (i.e. an up and down arrow button, on and off button, and the like) that a user may use to adjust temperature and cooking time. The temperature and cooking time may then be displayed on a display, such as a light emitting diode (LED) display or any other type of display capable of presenting information or data on the graphical user interface.

Cooking device 106 may have a temperature sensor 104 positioned within the cooking device 106. The temperature sensor 104 may be configured to monitor the temperature of the item being cooked or baked inside the cooking device 106. The temperature sensor 104 can be any device capable of obtaining temperature, such as a thermometer, memory metal, infrared sensor, or any other similar device. As further discussed in detail with reference to FIGS. 7-9, the temperature sensor may be positioned on the cooking device 106, within the item being cooked or baked, or on a substrate containing the item being cooked or baked. In some embodiments, the IAD 128 may be designed to capture the image and/or video of the temperature sensor.

The IAD 128 may be removably mounted or attached to a window of the cooking device 106. When attached to the window, the IAD 128 may acquire information about the item being cooked or baked within the cooking device 106. For example, the IAD 128 may obtain images or videos of the items inside the cooking device 106. This allows for remote monitoring of items within the cooking device 106 as the items are being cooked or baked. As such, a user does not need to be physically near the cooking device 106 to constantly monitor the item inside the cooking device 106 to prevent being overcooked or burned. The IAD 128 may be mounted on the window of the cooking device 106 using any known attachment element such as suction cups, adhesive, magnets, hook and loop fasteners, or any other similar element capable of mounting the IAD 128 to the cooking device 106.

The IAD 128 may be removably mounted or attached to a window of the cooking device 106. When attached to the window, the IAD 128 may acquire information about the item being cooked or baked within the cooking device 106. The IAD 128 may have an opening to receive a portable electronic device (PED) 122. The PED 122 may be any portable device that has an imaging device (e.g. a camera, camcorder, or any other similar device capable of taking images and/or video) configured to obtain images and/or videos. The PED 122 may be a cellular phone, media player, digital camera, digital camcorder, or any other similar device. In use, the PED 122 may be inserted into the IAD 128 to obtain the images and/or videos of the items within the cooking device 106. Each image or video may also include an image or video of the temperature sensor 104.

In another embodiment, IAD 102 may be positioned in a location above the cooking device to obtain images or video of items being cooked on top of cooking device 106. For example, the IAD 102 may be positioned on a fan or microwave above a stove.

In one embodiment, the IAD 128 may obtain the image and/or video via the imaging device periodically and/or over a predetermined period of time. For example, the imaging device may acquire the images or video every two (2), five (5), or ten (10) minutes. In another example, the imaging device may acquire the images or video every ten (10), fifteen (15), thirty (30), or forty-five (45) seconds. In another embodiment, a user may set the desired time periods. For example, the user may set the IAD 128 to obtain the images or video every one (1), five (5), or ten (10) minutes. The time periods may be selected or changed via the graphical user interface on the display or control panel of the cooking device 106. In another embodiment, the user may remotely set or change the time periods using the remote device 108.

The imaging device may obtain the images and/or video for a predetermined period of time during the cooking time of the item within the cooking device 106. For example, if the cooking time is forty-five (45) minutes, the IAD 128 may acquire the images and/or video during the entire forty-five (45) minutes. In another embodiment, the IAD 128 may begin acquiring the image and/or video in the middle of the cooking time. If the cooking time is one hour, the IAD 128 may begin to obtain the image and/or video after thirty (30) minutes of cooking time has passed. In still another embodiment, the IAD 128 may begin to acquire the image and/or video in the last ten (10) or fifteen (15) minutes of cooking time. Regardless of when the IAD 128 begins the imaging time period, the IAD 128 may obtain the images periodically (e.g. as discussed above, such as every five (5) minutes, thirty (30) seconds, etc.) during the predetermined period of time. In one embodiment, the imaging time period may be selected on the IAD 128. In another embodiment, the imaging time period may be remotely selected using the remote device 108.

The cooking information or data, such as the image and/or video, may be stored in a memory of the IAD 128. The images may then be transferred to remote device 108 via any known wired or wireless means. For example, the IAD 128 may be configured to communicate with remote device 108 via any known wired means. The IAD 128 may have an input/output port to connect the IAD 128 via a wire or cable to other devices such as a computer, cellular phone, tablet, or any other similar device. In another example, IAD 128 may have a wireless transceiver configured to wirelessly transmit data to remote device 108. IAD 128 may communicate wireless with remote device 108 via any known wireless means such as blue tooth, Wi-Fi, WAN, or any other similar wireless communication methods.

In one embodiment, IAD 128 may have a speaker to output audio notification or messages. The audio notifications or messages may be any message to alert the user of any desired information such as the end of the cooking time, whether the item within the cooking device 106 is burning or overcooked, malfunction or power loss, or any other similar audio messages that may or may not require user attention. For example, the IAD 128 may transmit an audio message "cooking complete!" requiring user attention. In another example, the IAD 128 may transmit an audio message "15 minutes remaining" not requiring user attention.

The stored images/video of the IAD 128 may be transmitted via wired or wireless means to remote device 108 for remote monitoring of the items being cooked or baked within the cooking device 106. Remote device 108 can be any portable or non-portable computing device such as a cellular phone, tablet, computer, media device, netbook, laptop, or any other similar electronic device. The remote device 108 may have a display to present or display the stored images and/or video. The IAD 128 may also transmit cooking data to remote device 108 for display on the display. The cooking data may be any information such as temperature data, pressure data, images, videos, alerts, messages, or any other desired information.

In one embodiment, the user may remotely monitor the items being cooked within the cooking device 106 based on the images/video transmitted from the IAD 128 to the remote device 108. For example, if the image and/or video displayed on the remote device 108 shows the item having a dark or black color, the user will know that the item being cooked or baked is overcooked or burned. In another example, if the image and/or video displayed on the remote device 108 shows the item as not having risen (e.g. a cake or bread), the user will know that the item being cooked or baked is not completely cooked. In still another embodiment, the images and/or video displayed on the remote device 108 will include an image or video of the temperature sensor 104. Thus, the user is able to monitor the temperature of the item within the cooking device 106. For example, if the optimal cooking temperature is 350° F., yet the image and/or video illustrates the temperature sensor 104 having a temperature of 400° F., this will alert the user that the temperature of the cooking device 106 needs to be lowered.

The images and/or videos may also be automatically monitored by the IAD 128. For example, IAD 128 may determine that the item within the cooking device 106 is overcooked, completely cooked and ready to be removed, burned, or undercooked. The determination may be based upon the color hue, colorfulness, chroma, saturation, lightness, or brightness of the item obtained from the images and/or video. In one embodiment, if the IAD 128 determines that the item being cooked is burned, the IAD 128 may transmit an audio message or notification "The food is burning!" Simultaneously or alternatively, the IAD 128 may transmit a "The food is burning!" alert or notification to the remote device 108 to be presented on the display of the remote device 108.

The IAD 102 may also determine that the cooking temperature is not at the optimal cooking temperature based upon the temperature sensor 104 image obtained or based upon the images and/or video. For example, an image of the temperature sensor 104 after thirty (30) minutes of cooking time may be at 300° F., when it should be at 400° F. In one embodiment, the IAD 128 may transmit an audio alert or notification "The temperature is low!" Simultaneously or in the alternative, the IAD 128 may transmit a "The temperature is low!" alert or notification to the remote device 108 to be presented on the display of the remote device 108. Such cooking information or data (e.g. low temperature, food overcook, and any other cooking information or data) may also be stored in a memory of the IAD 128.

The remote device 108 and/or the IAD 128 may communicate with a third party server 112 via network 110. The third party server 112 may be associated with any service or product provider such as a social media company, advertiser, data collection service, establishment (e.g. grocery store, deli, restaurant, coffee shop, and the like), or any other service or product provider. The images, video, and cooking information/data stored in the IAD 128 may be transmitted to the third party server 112. The third party server 112 may have a cooking database 114 in which to store all the received cooking information or data.

The third party server 112 may allow a plurality of users to share images, videos, and/or cooking information/data with other users in a social media setting. A user may also utilize the third party server 112 to determine how to improve upon previously cooked items. For example, the user may utilize prior cooking information to determine how to adjust, improve upon, or change a bread recipe. In another example, users may use the stored cooking information to obtain cooking instructions if they forgot how to cook a specific item.

The stored cooking information or data can include information such as how long the item was cooked, the temperature at which the item was cooked, the pressure at which the item was cooked, if any malfunctions occurred, or any other similar information. For example, after a specific item is cooked, users can eat the food and determine whether they liked or disliked the way the food was cooked. They can then log a rating on the third party server 112 using any known rating methods such as stars, numerical rating, and the like.

Although illustrated with the use of one cooking device 106 and one IAD 128, this is not intended to be limiting as any number of cooking devices and IADs may be used. As such, each IAD may be configured to communicate with at least one remote device. For example, a restaurant chef may choose to have a plurality of cooking devices activated at the same time. An IAD may be coupled to each of the plurality of cooking devices. Each of the IADs may be configured to communicate with at least one remote device 108. In one embodiment, the plurality of IADs 128 may be configured to communicate with the same remote device 108.

Referring now to FIG. 1C, yet another example embodiment of a system for monitoring cooking. System 160 may have a cooking device 116. The cooking device 116 may include a processor 133 configured to communicate with an imaging device 118, temperature sensor 120, wireless transceiver 130, speaker/microphone 132, display 134, and input/output port 136. In other words, the cooking device 116 may be a "smart" cooking device. A smart cooking device may be a device capable of performing functions automatically without manual user instruction or user interference. Smart cooking devices may also be controlled remotely as further discussed below. For example, a smart cooking device may automatically adjust cooking times, temperature, or pressure when cooking or baking. In another example, a smart cooking device may automatically obtain images or videos of the items being cooked. In other words, a smart cooking device may perform functions either automatically, based on instructions remotely transmitted by a remote device 108 and received by the smart cooking device, or based on instructions manually inputted by a user.

Cooking device 116 may be any device configured to cook and bake foods such as an oven, a barbeque grill, a fryer, a broiler, a smoker, a stove, a microwave oven, and any similar devices. The cooking device 116 may be used to cook or bake various items such as cakes, lasagna, chicken, seafoods, meats, vegetables, and any other foods. The cooking device 116 can also be used to cook or bake non-food items such as clay, shrink plastic, crayons, arts and crafts, and the like.

Processor 133 may be configured to communicate with display 134 designed to adjust temperature and cooking time. Although illustrated with a display 134, this is not intended to be limiting as cooking device 116 may use a control panel designed to adjust temperature and cooking time. In one embodiment, the display 134 may be a touch screen display to permit adjusting temperature and cooking time by touching the display screen viewed via a graphical user interface. In another embodiment, the control panel may have knobs or buttons (i.e. an up and down arrow button, on and off button, and the like) that may be used to adjust temperature and cooking time. The temperature and cooking time may then be displayed on a display 134, such as an LED display or any other type of display. In still another embodiment, the display 134 may present images and/or videos of the item being cooked within or on the cooking device 116.

Processor 133 may also be configured to communicate with imaging device 118 to acquire images and/or videos. Imaging device 118 may be, for example, a camera, camcorder, or any other similar device capable of taking images and/or video of the items inside or on top of cooking device 116. In one embodiment, the images or video may include an image or video of temperature sensor 120 as further discussed below. The image or video of the temperature sensor 120 may assist in monitoring cooking or baking of the item.

In one embodiment, the images and/or videos may be acquired periodically and/or over a predetermined period of time. For example, the imaging device 118 may acquire the images or video every two (2), five (5), or ten (10) minutes. In another example, the imaging device 118 may acquire the images or video every ten (10), fifteen (15), thirty (30), or forty-five (45) seconds. In another embodiment, the desired time periods may be set. For example, cooking device 116 may be programmed to obtain the images or video every one (1), five (5), or ten (10) minutes. The time periods may be selected or changed via a graphical user interface on the display 134 or control panel of the cooking device 116. In another embodiment, an image capture instruction may be transmitted by a remote device and received by the cooking device to remotely set or change the time periods to capture the images and/or video.

Additionally, instructions to switch between capturing images and video may be remotely transmitted from the remote device to the cooking device. For example, a change instruction may instruct the cooking device to obtain still images for thirty minutes, take video for ten minutes, then capture still images for another thirty minutes.

The imaging device 118 may obtain the images and/or video for a predetermined period of time during the cooking time of the item within or on the cooking device 106. For example, if the cooking time is forty-five (45) minutes, the imaging device 118 may acquire the images and/or video during the entire forty-five (45) minutes. In another embodiment, the imaging device 118 may begin acquiring the image and/or video in the middle of the cooking time. If the cooking time is one hour, the imaging device 118 may begin to obtain the image and/or video after thirty (30) minutes of cooking time has passed. In still another embodiment, the imaging device 118 may begin to acquire the image and/or video in the last ten (10) or fifteen (15) minutes of cooking time. Regardless of when the imaging device 118 begins the imaging time period, the imaging device 118 may obtain the images periodically (e.g. as discussed above, such as every five (5) minutes, thirty (30) seconds, etc.) during the predetermined period of time. In one embodiment, the imaging time period may be selected on the display 134. In another embodiment, an imaging time period instruction to change the imaging time periods may be remotely transmitted from the remote device and received by the cooking device.

The cooking information or data, such as the image and/or video, cooking temperature, pressure, or any other cooking information or data, may be stored in memory 150. In one embodiment, the images may be transferred to remote device 108 via any known wired or wireless means. For example, the cooking device 116 may be configured to communicate with remote device 108 via any known wired means. Cooking device 116 may have an input/output port 136 to connect cooking device 116 via a wire or cable to other devices such as a computer, cellular phone, tablet, or any other similar device. In another example, processor 133 may be configured to communicate with wireless transceiver 103 to wirelessly transmit data to remote device 108. Cooking device 116 may communicate wireless with remote device 108 via any known wireless means such as blue tooth, Wi-Fi, WAN, or any other similar wireless communication methods.

The stored images/video of items being cooked on or inside the cooking device 116 and any other cooking information or data may be transmitted to remote device 108 for remote monitoring of the items being cooked. The remote device 108 can be any portable or non-portable computing device such as a cellular phone, tablet, computer, media device, netbook, laptop, or any other similar electronic device. The remote device 108 may have a display to present or display the stored images, video, or any other information or data. The cooking data may be any information such as temperature data, pressure data, images, videos, alerts, messages, or any other desired information.

Cooking device 116 can have a temperature sensor 120 and pressure sensor (not illustrated). The temperature sensor 120 may be configured to monitor the temperature of the item being cooked or baked inside the cooking device 116. The temperature sensor 120 can be any device capable of obtaining temperature, such as a thermometer, memory metal, infrared sensor, or any other similar device. As further discussed in detail with reference to FIGS. 7-9, the temperature sensor may be positioned on the cooking device 116, in the item being cooked or baked, or on a substrate containing the item being cooked or baked. Cooking device 116 can automatically, without user interaction or instructions, change the temperature of the item being cooked or baked to ensure an ideal temperature is used to cook the item. In another example, cooking device 116 can also automatically adjust or change the temperature of the item being cooked or baked based on the pressure detected at the cooking location The cooking device 116 may contain a speaker and/or microphone 132. Cooking device 116 may be configured to present audio alerts or notifications. The audio alerts or notifications may be any predetermined notifications such as notifying the user that the cooking is completed, power losses, malfunctions, or any other desired alerts or notifications. For example, the cooking device 116 may determine that the cooking is complete and transmit an complete alert such as: "cooking complete, please remove the food", or any other similar message. In another example, the cooking device 116 may transmit informational notifications about the item being cooked. For example, the cooking device 116 may determine that a cake is rising and say: "Cake is rising". In another example, the cooking device 116 may determine that the item is at its optimal temperature and transmit an informational notification: "Optimal temperature reached". In another embodiment, the cooking device 116 may transmit an electronic message or notification to the remote device 108 to be presented on a display of the remote device 108. The electronic message may be a text, instant message, audio message, or any other electronic message. Thus, if the user is not in a location to hear or is unable to hear the audio alerts or notification, the user will still be informed via the electronic messages or notifications.

A user may also provide vocal instructions via the microphone 132. In one alternative, the user may provide vocal or verbal instructions. For example, the user's hands may be occupied and unable to use the touch screen display 134 or control panel. Thus, the user may voice instructions to the cooking device 116. For example, the user can verbally say: "Cooking time is 45 minutes" or "boil noodles on high heat for 10 minutes then lower to low heat for 10 minutes." In one embodiment, the user may use remote device 108 to transmit the verbal instructions to cooking device 116. The verbal instructions may be received by processer 133 and processed accordingly. For example, the verbal instructions may be: "increase temperature by 5 degrees". The instructions may be received by processer 133 which thereby increases the cooking temperature by 5 degrees.

The user may manually monitor the items being cooked within the cooking device 116 via the images/video transmitted from the cooking device 116 to the remote device 108. For example, if the image and/or video displayed on the remote device 108 shows the item having a dark or black color, it will be known that the item being cooked or baked is overcooked or burned. In another example, if the image and/or video displayed on the remote device 108 shows the item as not having risen (e.g. a cake or bread), it will be known that the item being cooked or baked is not completely cooked. The images and videos may an image of the temperature sensor 120. Thus, the cooking temperature can be monitored. For example, the optimal cooking temperature may be 350° F., yet the temperature sensor 120 measures a cooking temperature of 400° F. In one embodiment, the cooking device 116 may automatically adjust the cooking temperature to lower it. In another embodiment, the cooking device 116 may transmit a high temperature alert (e.g. audio alert, electronic alert to remote device 108, or both): "Temperature 50° too high!" Once observed and/or the high temperature alert is received, the user may manually adjust the temperature or remotely (e.g. via remote device 108) transmit instructions to the cooking device 116. The instructions may be received by processor 133 which thereby causes the cooking temperature to be lowered.

The images and/or videos may also be automatically monitored by the cooking device 116. For example, the cooking device 116 may determine that the item being cooked is overcooked, completely cooked, and ready to be removed, burned, or undercooked based upon the color hue, colorfulness, chroma, saturation, lightness, or brightness obtained from the images and/or video. In one embodiment, if the cooking device 116 determines that the item being cooked is burned, the cooking device 116 may transmit an audio message or notification "The food is burning!" via the speaker/microphone 132. Simultaneously or alternatively, the cooking device 116 may transmit a "The food is burning!" electronic notification or message to the remote device 108 to be presented on the display of the remote device 108. In another embodiment, cooking device 116 may automatically cease cooking of the item by turning off the stove, oven, microwave, and the like.

The cooking device 116 may also determine that the cooking temperature is not at the optimal cooking temperature based upon the temperature sensor 120 readings. For example, the temperature sensor 120 after thirty (30) minutes of cooking time may be at 300° F., when it should be at 400° F. In one embodiment, the cooking device 116 may transmit an audio message or notification "The temperature is low!" via the speaker/microphone 132. Simultaneously or in the alternative, the cooking device 116 may transmit a "The temperature is low!" notification or message to the remote device 108 to be presented on the display of the remote device 108. In another embodiment, cooking device 116 may automatically increase the temperature without user interaction.

The remote device 108 and/or cooking device 116 may communicate with third party server 112 via network 110. The third party server 112 may be associated with any service or product provider such as a social media company, advertiser, data collection service, establishment (e.g. grocery store, deli, restaurant, coffee shop, and the like), or any other service or product provider. The images, video, and cooking information/data stored in the memory 150 of cooking device 116 may be transmitted to the third party server 112. The third party server 112 may include or have access to a cooking database 114 in which to store all the received cooking information or data.

The third party server 112 may for example allow a plurality of users to share images, videos, and/or cooking information/data with other users in a social media setting. For example, a user may also utilize the third party server 112 to determine how to improve upon previously cooked items. In another example, the user may utilize prior cooking information to determine how to adjust, improve upon, or change a bread recipe. In yet another example, users may use the stored cooking information to obtain cooking instructions if they forgot how to cook a specific item.

The stored cooking information or data can include information such as how long the item was cooked, the temperature at which the item was cooked, the pressure at which the item was cooked, if any malfunctions occurred, or any other similar information. For example, after a specific item is cooked, users can eat the food and determine whether they liked or disliked the way the food was cooked. They can then log a rating on the third party server 112 using any known rating methods such as stars, numerical rating, and the like.

Cooking device 116 may be configured to automatically obtain optimal cooking times, temperature, pressure, and any other cooking-related information from third party server 112. For example, using display 134, cooking device 116 may be informed that the item being cooked in the oven is lasagna. Cooking device 116 may automatically obtain cooking information and data from the cooking data database 114 of the third party server 112. Cooking device 116 may then automatically adjust the cooking temperature, time, and any other necessary functions to properly cook the lasagna, without user intervention. Cooking device 116 can also store recipes or pre-determined cooking instructions and automatically adjust cooking temperature and cooking time according to the pre-determined instructions. Thus, items may be cooked or baked without user interaction and the user does not need to be physically present to monitor the items being cooked.

Although illustrated with the use of one cooking device 116, this is not intended to be limiting as any number of smart cooking devices may be used. As such, each cooking device may be configured to communicate with at least one remote device. For example, a restaurant chef may choose to have a plurality of cooking devices activated at the same time. Each of the cooking devices may be configured to communicate with at least one remote device 108. In one embodiment, the plurality of cooking devices may be configured to communicate with the same remote device 108.

Figure 2A:
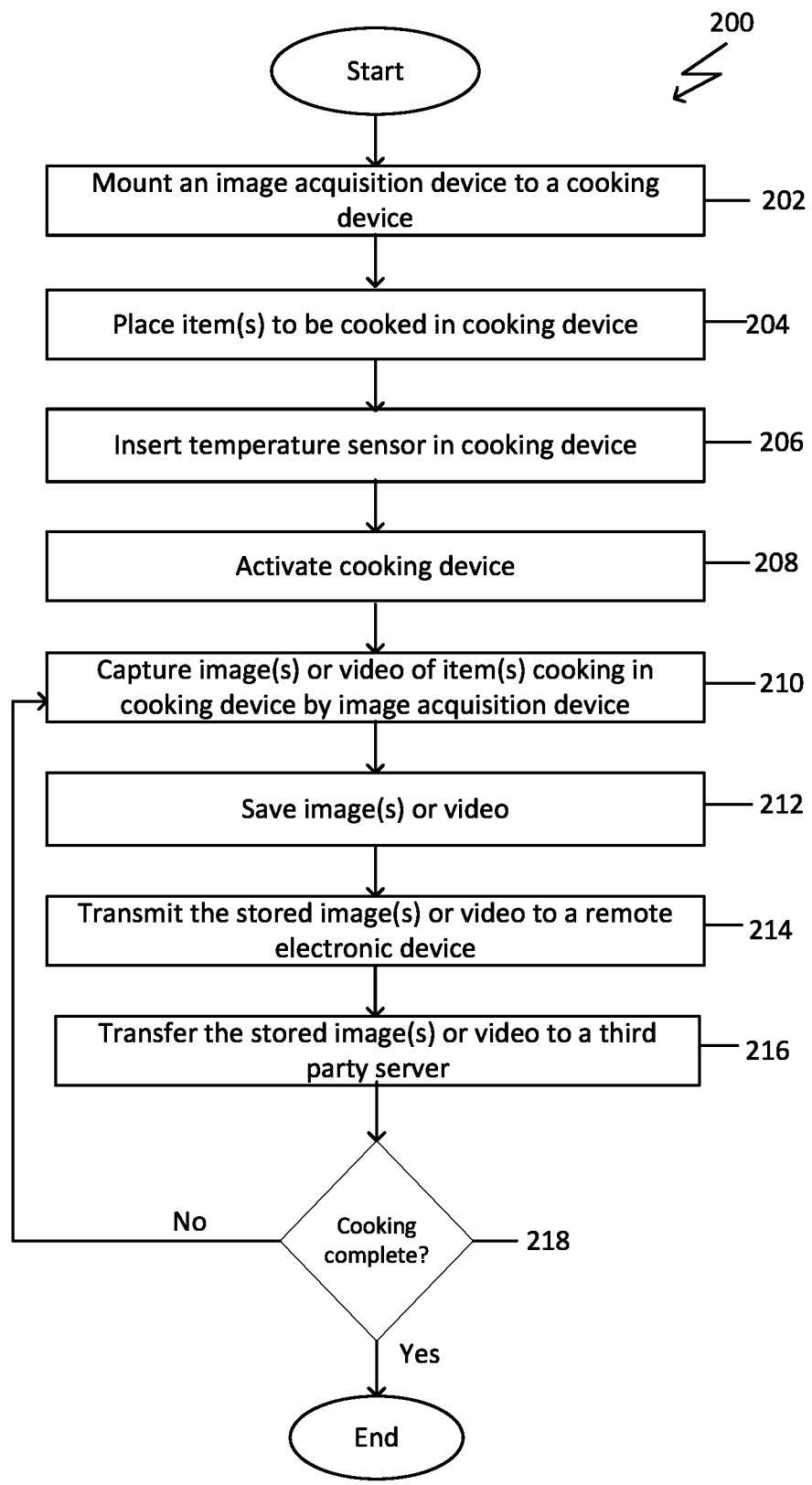
FIGS. 2A and 2B illustrate example embodiments of a method for monitoring cooking.
Figure 2B:
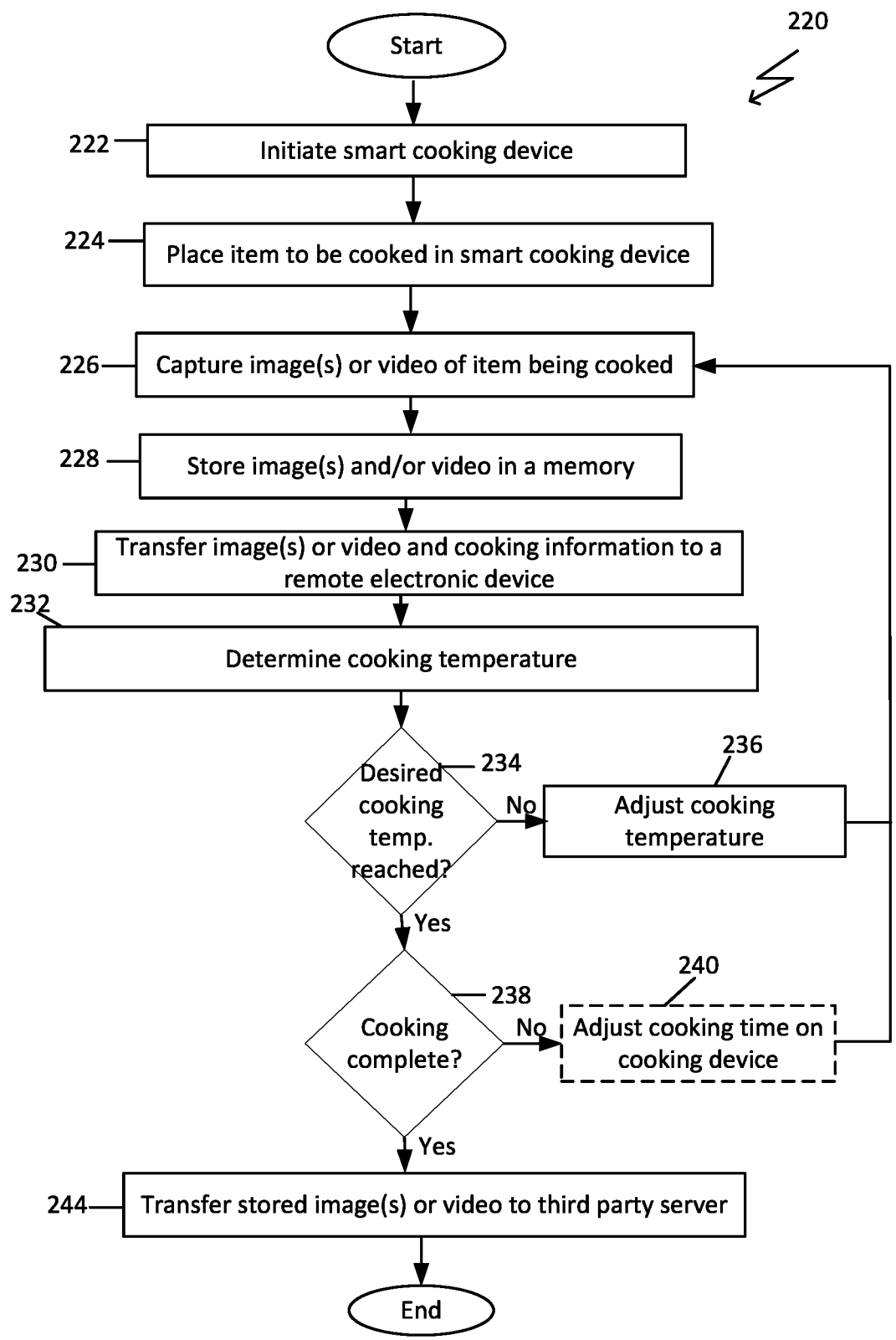

FIGS. 2A and 2B illustrate example embodiments of a method 200 for monitoring cooking. Referring now to FIG. 2A, an embodiment of a method for monitoring cooking. The method 200 can begin with mounting an IAD to a cooking device at 202. The cooking device may be any device configured to cook or bake such as an oven, a barbeque grill, a fryer, a broiler, a smoker, a stove, a microwave oven, or any other similar devices. In one embodiment, the IAD may be mounted to a microwave oven above a stove to monitor items being cooked on the stove. In another embodiment, the IAD may be mounted to a fan above a stove. In another embodiment, the IAD may be positioned on a window of the cooking device to view items being cooked or baked within the cooking device.

The IAD may be removably attached on the cooking device using mounting elements. The mounting elements may be at least one suction cup, adhesive, magnets, hook and loop fasteners, screws, nails, or other similar attachment means. This allows for remote monitoring of items within the cooking device as the items are being cooked or baked. As such, a user does not need to be physically near the cooking device to constantly monitor the item on or inside the cooking device to prevent being overcooked, undercooked, or burned.

The item to be cooked or baked may be placed on or in the cooking device at 204. Items that may be cooked or baked may include foods such as cakes, lasagna, chicken, seafood, meats, vegetables, and any other foods. The cooking device can also cook or bake non-food items such as clay, plastic (e.g. shrink plastic), crayons, other arts and craft materials, and the like. The items may be cooked within the cooking device (e.g. oven) or on top of the cooking device (e.g. stovetop).

At 206, a temperature sensor may be inserted or positioned in the cooking device. The temperature sensor may be configured to monitor the temperature of the item being cooked or baked inside the cooking device. The temperature sensor can be any device capable of obtaining temperature, such as a thermometer, memory metal, infrared sensor, or any other similar device. As further discussed in detail with reference to FIGS. 7-9, the temperature sensor may be positioned on the cooking device, within the item being cooked or baked, or on a substrate containing the item being cooked or baked. In all embodiments, the IAD may be designed to capture the image and/or video of the temperature sensor.

The cooking device may be activated at 208. In one embodiment, a "Start" button on a display of the cooking device may be activated. In another embodiment, a knob may be turned to activate the cooking device. In still another embodiment, an activation request may be transmitted to the cooking device via a remote device to activate the cooking device.

The IAD may capture image(s) or video of the item cooking in the cooking device at 210. The IAD may include an imaging device (e.g. a camera, camcorder, or any other similar device capable of taking images and/or video) capable of obtaining images or videos of the items inside or on the cooking device. Each image or video may also include an image or video of the temperature sensor. In one embodiment, the IAD may obtain the image and/or video via the imaging device periodically and/or over a predetermined period of time. For example, the imaging device may acquire the images or video every two (2), five (5), or ten (10) minutes. In another example, the imaging device may acquire the images or video every ten (10), fifteen (15), thirty (30), or forty-five (45) seconds. In another embodiment, a user may set the desired time periods. For example, the user may set the IAD to obtain the images or video every one (1), five (5), or ten (10) minutes. The time periods may be selected or changed via the graphical user interface on the display or control panel of the cooking device. In another embodiment, the user may remotely set or change the time periods using the remote device.

The IAD may obtain the images and/or video for a predetermined period of time during the cooking time of the item within the cooking device. For example, if the cooking time is forty-five (45) minutes, the IAD may acquire the images and/or video during the entire forty-five (45) minutes. In another embodiment, the IAD may begin acquiring the image and/or video in the middle of the cooking time. If the cooking time is one hour, the IAD may begin to obtain the image and/or video after thirty (30) minutes of cooking time has passed. In still another embodiment, the IAD may begin to acquire the image and/or video in the last ten (10) or fifteen (15) minutes of cooking time. Regardless of when the IAD begins the imaging time period, the IAD may obtain the images periodically (e.g. as discussed above, such as every five (5) minutes, thirty (30) seconds, etc.) during the predetermined period of time. In one embodiment, the imaging time period may be selected on the IAD. In another embodiment, the imaging time period may be remotely selected using the remote device.

The image(s) or video may be saved at 212. The cooking information or data, such as the image and/or video, may be stored in a memory of the IAD 102. At 214, the stored image(s) or video may be transmitted to a remote electronic device. The images may then be transferred to remote electronic device via any known wired or wireless means. For example, the IAD may be configured to communicate with remote electronic device via any known wired means. The IAD may have an input/output port to connect the IAD via a wire or cable to other devices such as a computer, cellular phone, tablet, or any other similar device. In another example, IAD may have a wireless transceiver configured to wirelessly transmit data to remote electronic device. IAD may communicate wireless with remote electronic device via any known wireless means such as blue tooth, Wi-Fi, WAN, or any other similar wireless communication methods.

The image(s) or video can conveniently be viewed on the remote electronic device to allow a user to view the item being cooked or baked. This allows for remote monitoring of items within the cooking device as the items are being cooked or baked. As such, a user does not need to be physically near the cooking device to constantly monitor the item inside the cooking device to prevent the item from being overcooked, undercooked, or burned. For example, if the image and/or video displayed on the remote device shows the item having a dark or black color, the user will know that the item being cooked or baked is overcooked or burned. In another example, if the image and/or video displayed on the remote device shows the item as not having risen (e.g. a cake or bread), the user will know that the item being cooked or baked is not completely cooked. In still another embodiment, the images and/or video displayed on the remote device will include an image or video of the temperature sensor. Thus, the user is able to monitor the temperature of the item within the cooking device. For example, if the optimal cooking temperature is 350° F., yet the image and/or video illustrates the temperature sensor having a temperature of 400° F., this will alert the user that the temperature of the cooking device needs to be lowered.

At 216, the stored image(s) or video may be transferred to a third party server. The third party server may be associated with any service or product provider such as a social media company, advertiser, data collection service, establishment (e.g. grocery store, deli, restaurant, coffee shop, and the like), or any other service or product provider. The images, video, and cooking information/data stored in the IAD may be transmitted to the third party server. The third party server may have a cooking database in which to store all the received cooking information or data.

The third party server may allow a plurality of users to share images, videos, and/or cooking information/data with other users in a social media setting. A user may also utilize the third party server to determine how to improve upon previously cooked items. For example, the user may utilize prior cooking information to determine how to adjust, improve upon, or change a bread recipe. In another example, users may use the stored cooking information to obtain cooking instructions if they forgot how to cook a specific item.

The stored cooking information or data can include information such as how long the item was cooked, the temperature at which the item was cooked, the pressure at which the item was cooked, if any malfunctions occurred, or any other similar information. For example, after a specific item is cooked, users can eat the food and determine whether they liked or disliked the way the food was cooked. They can then log a rating on the third party server using any known rating methods such as stars, numerical rating, and the like.

A determination of whether cooking is complete may be made at 218. The determination may be based on the cooking data obtained from the IAD. For example, the images or videos obtained by the IAD may show the item completely cooked based on the color, size, look, and the like of the item. In another embodiment, the determination that the cooking is complete may be based on the total cooking time of the item. For example, if the overall cooking time is 12 minutes, the cooking may be complete after 12 minutes. In any event, if it is determined that cooking is complete at 218, method 200 may end. If it is determined that cooking is not complete at 218, the IAD may continue to capture image(s) or video of the item cooking in the cooking device at step 210.

Referring now to FIG. 2B, another embodiment of a method for monitoring cooking. The method 220 may begin by initiating a "smart" cooking device at 222. The smart cooking device may be any device configured to cook and bake foods such as an oven, a barbeque grill, a fryer, a broiler, a smoker, a stove, a microwave oven, and any similar devices. A smart cooking device may be a device capable of performing functions automatically without manual user instruction or user interference. Smart cooking devices may also be controlled remotely as further discussed below. For example, a smart cooking device may automatically adjust cooking times, temperature, or pressure when cooking or baking. In another example, a smart cooking device may automatically obtain images or videos of the items being cooked. In other words, a smart cooking device may perform functions either automatically, based on instructions remotely transmitted by a remote device and received by the smart cooking device, or based on instructions manually inputted by a user.

The cooking device may be initiated by pressing a "Start" button on a display of the cooking device. In another embodiment, a knob on a control panel may be turned to activate the cooking device. In still another embodiment, an activation request may be transmitted from a remote device to the cooking device to activate the cooking device, such as cooking device 116 illustrated in FIG. 1C.

At 224, the item to be cooked or baked may be placed on or in the cooking device. Items that may be cooked or baked may include foods such as cakes, lasagna, chicken, seafood, meats, vegetables, and any other foods. The cooking device can also cook or bake non-food items such as clay, plastic (e.g. shrink plastic), crayons, other arts and craft materials, and the like.

Image(s) or video of the item being cooked may be captured at 226. The cooking device may have an imaging device (e.g. a camera, camcorder, or any other similar device capable of taking images and/or video) capable of obtaining images or videos of the items being cooked. In one embodiment, the cooking device may obtain the image and/or video via the imaging device periodically and/or over a predetermined period of time. For example, the imaging device may acquire the images or video every two (2), five (5), or ten (10) minutes. In another example, the imaging device may acquire the images or video every ten (10), fifteen (15), thirty (30), or forty-five (45) seconds. In another embodiment, set desired time periods may be set. For example, the cooking device may be set to obtain the images or video every one (1), five (5), or ten (10) minutes. The time periods may be selected or changed via a graphical user interface on the display or control panel of the cooking device. In another embodiment, an image capture instruction may be transmitted by a remote device and received by the cooking device to remotely set or change the time periods to capture the images and/or video.

Additionally, instructions to switch between capturing images and video may be remotely transmitted from the remote device to the cooking device. For example, a change instruction may instruct the cooking device to obtain still images for thirty minutes, take video for ten minutes, then capture still images for another thirty minutes.

The cooking device may obtain the images and/or video for a predetermined period of time during the cooking time of the item within the cooking device. For example, if the cooking time is forty-five (45) minutes, the imaging device may acquire the images and/or video during the entire forty-five (45) minutes. In another embodiment, the imaging device may begin acquiring the image and/or video in the middle of the cooking time. If the cooking time is one hour, the imaging device begins to obtain the image and/or video after thirty (30) minutes of cooking time has passed. In still another embodiment, the imaging device may begin to acquire the image and/or video in the last ten (10) or fifteen (15) minutes of cooking time. Regardless of when the imaging device begins the imaging time period, the imaging device may obtain the images periodically (e.g. as discussed above, such as every five (5) minutes, thirty (30) seconds, etc.) during the predetermined period of time. In one embodiment, the imaging time period may be selected using the graphical user interface on a display or control panel of the cooking device. In another embodiment, an imaging time period instruction to change the imaging time periods may be remotely transmitted from the remote device and received by the cooking device.

The image(s) and/or video may be stored in a memory at 228. The cooking information or data, such as the image and/or video, cooking temperature, pressure, and any other desired information or data may be stored in a memory of the cooking device. At 230, the stored image(s) or video may be transmitted to a remote electronic device. The images may be transferred to the remote electronic device via any known wired or wireless means. For example, the cooking device may be configured to communicate with remote electronic device via any known wired means. The cooking device may have an input/output port to connect the cooking device via a wire or cable to other devices such as a computer, cellular phone, tablet, or any other similar device. In another example, the cooking device may have a wireless transceiver configured to wirelessly transmit data to remote electronic device. The cooking device may communicate wireless with remote electronic device via any known wireless means such as Bluetooth, Wi-Fi, WAN, or any other similar wireless communication methods.

The image(s) or video or any other cooking information may be viewed on a display of the remote electronic device to allow a user to view the item being cooked or baked. This allows for remote monitoring of items being cooked or baked within or on the cooking device. As such, it is not necessary for a user to be physically near the cooking device to constantly monitor the items being cooked. For example, if the image and/or video displayed on the remote device shows the item having a dark or black color, it will be known that the item being cooked or baked is overcooked or burned. In another example, if the image and/or video displayed on the remote device shows the item as not having risen (e.g. a cake or bread), it will be known that the item being cooked or baked is not completely cooked.

Cooking temperature may be determined at 232. The cooking device may determine the cooking temperature based on the temperature sensor. In another embodiment, the user may determine the cooking temperature based on the images and video of the temperature sensor captured by the imaging device of the cooking device.

A determination of whether the desired cooking temperature is reached may be made at 234. In one embodiment, the cooking device may determine the optimal cooking temperature based on cooking information received from a third party server cooking data database. In another embodiment, the optimal cooking temperature may be manually inputted by a user using a display or control panel of the cooking device. In still another embodiment, a temperature instruction to set the cooking temperature may be transmitted from a remote device to the cooking device. If it is determined that the desired cooking temperature is not reached at 234, the cooking temperature may be adjusted at 236. For example, if the optimal cooking temperature is 350° F., yet the determined cooking temperature from step 232 is 400° F., the cooking device may automatically adjust the cooking temperature by lowering the temperature. In another embodiment, the user may transmit a temperature adjustment notification to the cooking device using the remote device.

In another example, if the cooking temperature is determined to be at 350° F. from step 232, yet the images and/or video of the item being cooked shows that the edges of the item is burning and the center of the item is fully cooked, the temperature of the cooking device can be decreased. The cooking device, being a smart cooking device, may automatically adjust the temperature based on an analysis of the captured images and/or video. In another embodiment, the user may transmit a temperature adjustment notification to the cooking device using the remote device.

Once the cooking temperature is adjusted at 236, the process may repeat at 226. However, if it is determined that the desired cooking temperature is reached at 234, a determination of whether the cooking time is complete at 238. A determination of whether cooking is complete may be based on an analysis of the images and/or video, overall or total cooking time, or information obtained from the user or third party server cooking data database, or any other reference. The analysis of the images and/or video may be based on color, size, appearance, and the like, and may indicate that the item still needs to be cooked for a longer period of time. The captured images and/or video may be compared to other images and/or videos stored in the cooking data database of the third party server. In another example, the overall cooking time may be 12 minutes and it may be determined that cooking is complete based on the end of the cooking time. In other words, the cooking may be complete after 12 minutes.

Optionally, the cooking time may be adjusted on the cooking device at 240. The cooking device may automatically adjust the cooking time. In another embodiment, the user may determine that the item needs to be cooked longer based on the images and video. The user may then transmit a cooking time request to the cooking device from the remote device. In another embodiment, the user may manually adjust the cooking time on the cooking device using the display or control panel of the cooking device. The process may then repeat at 226.

If it is determined that the cooking is complete at 238, the stored image(s) or video may be transferred to a third party server at 244. The third party server may be associated with any service or product provider such as a social media company, advertiser, data collection service, establishment (e.g. grocery store, deli, restaurant, coffee shop, and the like), or any other service or product provider. The images, video, and/or cooking information/data stored in a memory of the cooking device may be transmitted to the third party server. The third party server may have a cooking data database in which to store all the received cooking information and data.

The third party server may for example allow a plurality of users to share images, videos, and/or cooking information/data with other users in a social media setting. In another example, a user may also utilize the third party server to determine how to improve upon previously cooked items. In another example, the user may utilize prior cooking information to determine how to adjust, improve upon, or change a recipe. In yet another example, users may use the stored cooking information to obtain cooking instructions if they forgot how to cook a specific item.

The stored cooking information or data can include information such as how long the item was cooked, the temperature at which the item was cooked, the pressure at which the item was cooked, if any malfunctions occurred, or any other similar information. For example, after a specific item is cooked, users can eat the food and determine whether they liked or disliked the way the food was cooked. They can then log a rating on the third party server using any known rating methods such as stars, numerical rating, and the like.

Figure 3A:
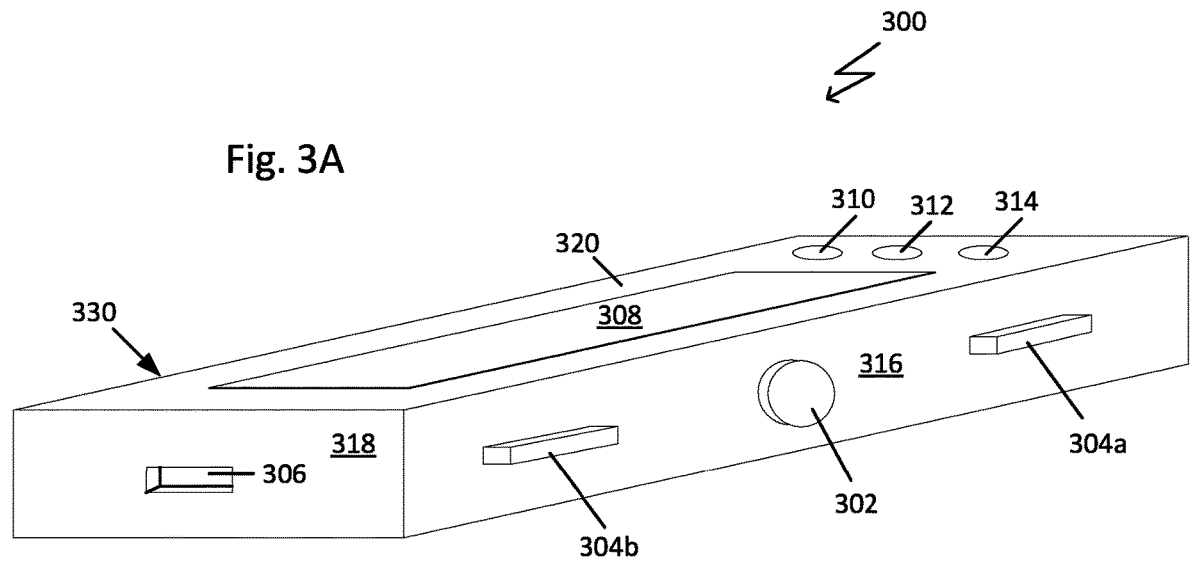
FIGS. 3A and 3B illustrate example embodiments of an IAD.
Figure 3B:
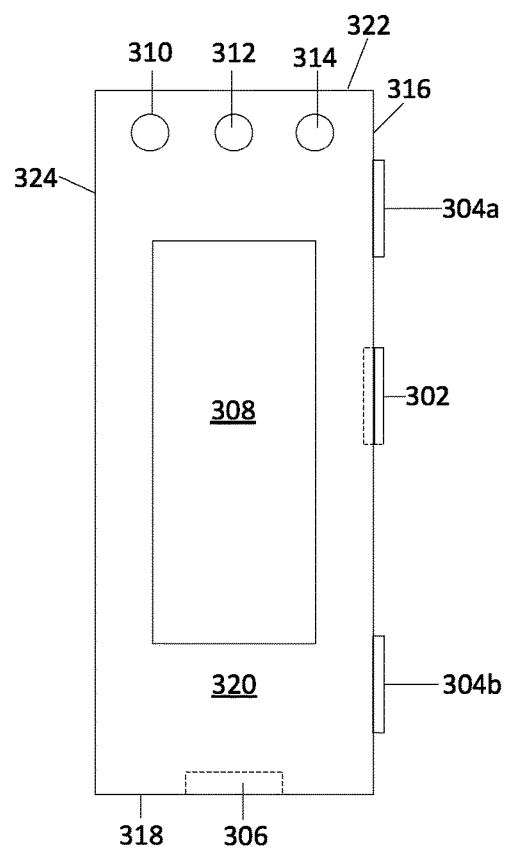

FIGS. 3A and 3B illustrate example embodiments of an IAD. FIG. 3A illustrates an example perspective view of the IAD 300. The IAD 300 may have a housing 330, display 308, attachment elements 304a, 304b, input/output port 306, speaker 312, microphone 310, and power indicator 314.

The housing 330 may contain surfaces and sides all connected together to form one three dimensional surface. The housing 330 may be made of plastic, silicon, metal, mixtures of each material, or any other similar cost effective material. The material may be stretchy to fit different sized components contained within the IAD 300. The housing 330 may also be injection molded which can mold the material to its desired shape.

The housing 330 of the IAD 300 may contain a top surface 320, a bottom surface (not shown), a right side 316, a left side (not shown), a back side 318, and a front side (not shown). The right side 316 of the housing 330 may contain attachment elements 304a and 304b. The attachment elements 304a and 304b may be any known attachment elements such as suction cups, adhesive, magnets, hook and loop fasteners, or any other similar element capable of mounting the IAD 300.

The attachment elements 304a and 304b may removably mount or attach the IAD 300 to a window of the cooking device. The IAD 300 can then obtain images/video or information of an item being cooked inside the cooking device. The attachment elements 304a and 304b may removably mount or attach the IAD 300 above the cooking device. Therefore, the IAD 300 may provide images/video or information of an item being cooked on top of the stove.

The right side 316 of the housing 330 may also contain a camera opening 302. The camera opening 302 may allow the lens of an imaging device to face the camera opening 302 so it can view the area outside the IAD 300. The imaging device may be a camera, camcorder, or any other similar device capable of taking images and/or video. The lens of the imaging device may also extend through the camera opening 302 and outside of the right side 316 of the housing 330, which will allow the imaging device to take clear images/video of the area outside the IAD 300. The IAD 300 may be mounted or attached to the window of a cooking device, where the camera opening 302 may be facing the window looking into the inside of the cooking device. Therefore, the lens of the imaging device can face through the aperture 302 and take images/video of items being cooking inside the cooking device. The IAD 300 may be positioned above the cooking device, where the camera opening 302 may be facing downward toward the top of the cooking device. Therefore, the lens of the imaging device can face through the camera opening 302 and view the top of the cooking device. The imaging device may then take images/video of items being cooking on a stove.

The bottom side 318 of the housing 330 may contain an input/output port 306. The input/output port 306 can connect the IAD 300 via a wire or cable to other devices such as a computer, cellular phone, tablet, or any other similar device. The input/output port 306 may be a universal serial bus (USB) port and allow the IAD 300 to communicate with any of the other devices mentioned above. Therefore, information obtained by the IAD 300 may be viewed and/or transferred and saved to those other devices. The input/output port 306 may also be used as a power port.

The top surface 320 of the housing 330 may contain a display 308. The display 308 may be a light emitting diode (LED) display. The display 308 may present or display the stored images and/or video. The display 308 may also display cooking data. The cooking data may be any information such as temperature data, pressure data, images, videos, alerts, messages, or any other desired information. The display 308 may allow monitoring of the items being cooked within the cooking device based on the images/video transmitted from the IAD 300. The display 308 may also display alerts when an item is done cooking or is burning.

The housing 330 may also contain a wireless transceiver 310. The wireless transceiver 310 may be configured to wirelessly transmit data to a remote electronic device. The remote electronic device can be any portable or non-portable computing device such as a cellular phone, tablet, computer, media device, netbook, laptop, or any other similar electronic device. The wireless transceiver 310 may provide the means for the IAD 300 to communicate wirelessly with the remote electronic device via any known wireless means such as blue tooth, Wi-Fi, WAN, or any other similar wireless communication methods.

The housing 330 may also contain speakers 312. The speakers 312 may output audio notification or messages. The audio notifications or messages may be any message to alert the user of any desired information such as the end of the cooking time, whether the item within the cooking device is burning or overcooked, malfunction or power loss, or any other similar audio messages that may or may not require user attention.

The housing 330 may also contain a power indicator 314. The power indicator 314 may provide means for connecting a power jack. The power indicator 314 may also allow provide means for charging the IAD 300 if the device is battery powered.

FIG. 3B illustrates an example top view of the IAD 300. The IAD 300 may have housing 330, display 308, attachment elements 304a, 304b, input/output port 306, speaker 312, microphone 310, and power indicator 314.

The housing 330 may contain surfaces and sides all connected together to form one three dimensional surface. The housing 330 may be made of a plastic, silicon, metal, mixtures of each material, or any other similar cost effective material. The material may be stretchy to fit different sized components contained within the IAD 300. The housing 330 may also be injection molded which can mold the material to its desired shape.

The housing 330 of the IAD 300 may contain a top surface 320, a bottom surface (not shown), a right side 316, a left side 324, a back side 318, and a front side 322. The right side 316 of the housing 330 may contain attachment elements 304a and 304b. The attachment elements 304a and 304b may be any known attachment elements such as suction cups, adhesive, magnets, hook and loop fasteners, or any other similar element capable of mounting the IAD 300.

The attachment elements 304a and 304b may removably mount or attach the IAD 300 to a window of the cooking device. The IAD 300 can then obtain images/video or information of an item being cooked inside the cooking device. The attachment elements 304a and 304b may removably mount or attach the IAD 300 above the cooking device. Therefore, the IAD 300 may provide images/video or information of an item being cooked on top of the stove.

The right side 316 of the housing 330 may also contain a camera opening 302. The camera opening 302 may allow the lens of an imaging device to face the camera opening 302 so it can view the area outside the IAD 300. The imaging device may be a camera, camcorder, or any other similar device capable of taking images and/or video. The lens of the imaging device may also extend through the camera opening 302 and outside of the right side 316 of the housing 330, which will allow the imaging device to take clear images/video of the area outside the IAD 300. The IAD 300 may be mounted or attached to the window of a cooking device, where the camera opening 302 may be facing the window looking into the inside of the cooking device. Therefore, the lens of the imaging device can face through the aperture 302 and take images/video of items being cooking inside the cooking device. The IAD 300 may be positioned above the cooking device, where the camera opening 302 may be facing downward toward the top of the cooking device. Therefore, the lens of the imaging device can face through the camera opening 302 and view the top of the cooking device. The imaging device may then take images/video of items being cooking on a stove.

The bottom side 318 of the housing 330 may contain an input/output port 306. The input/output port 306 can connect the IAD 300 via a wire or cable to other devices such as a computer, cellular phone, tablet, or any other similar device. The input/output port 306 may be a universal serial bus (USB) port and allow the IAD 300 to communicate with any of the other devices mentioned above. Therefore, information obtained by the IAD 300 may be viewed and/or transferred and saved to those other devices. The input/output port 306 may also be used as a power port.

The top surface 320 of the housing 330 may contain a display 308. The display 308 may be a light emitting diode (LED) display. The display 308 may present or display the stored images and/or video. The display 308 may also display cooking data. The cooking data may be any information such as temperature data, pressure data, images, videos, alerts, messages, or any other desired information. The display 308 may allow monitoring of the items being cooked within the cooking device based on the images/video transmitted from the IAD 300. The display 308 may also display alerts when an item is done cooking or is burning.

The top surface 320 of the housing 330 may also contain a wireless transceiver 310. The wireless transceiver 310 may be configured to wirelessly transmit data to a remote electronic device. The remote electronic device can be any portable or non-portable computing device, such as a cellular phone, tablet, computer, media device, netbook, laptop, or any other similar electronic device. The wireless transceiver 310 may provide the means for the IAD 300 to communicate wirelessly with the remote electronic device via any known wireless means such as Bluetooth, Wi-Fi, WAN, or any other similar wireless communication methods.

The housing 330 may also contain a speakers 312. The speakers 312 may output audio notification or messages. The audio notifications or messages may be any message to alert the user of any desired information such as the end of the cooking time, whether the item within the cooking device is burning or overcooked, malfunction or power loss, or any other similar audio messages that may or may not require user attention.

The housing 330 may also contain a power indicator 314. The power indicator 314 may provide means for connecting a power jack. The power indicator 314 may also allow provide means for charging the IAD 300 if the device is battery powered.

Figure 4:
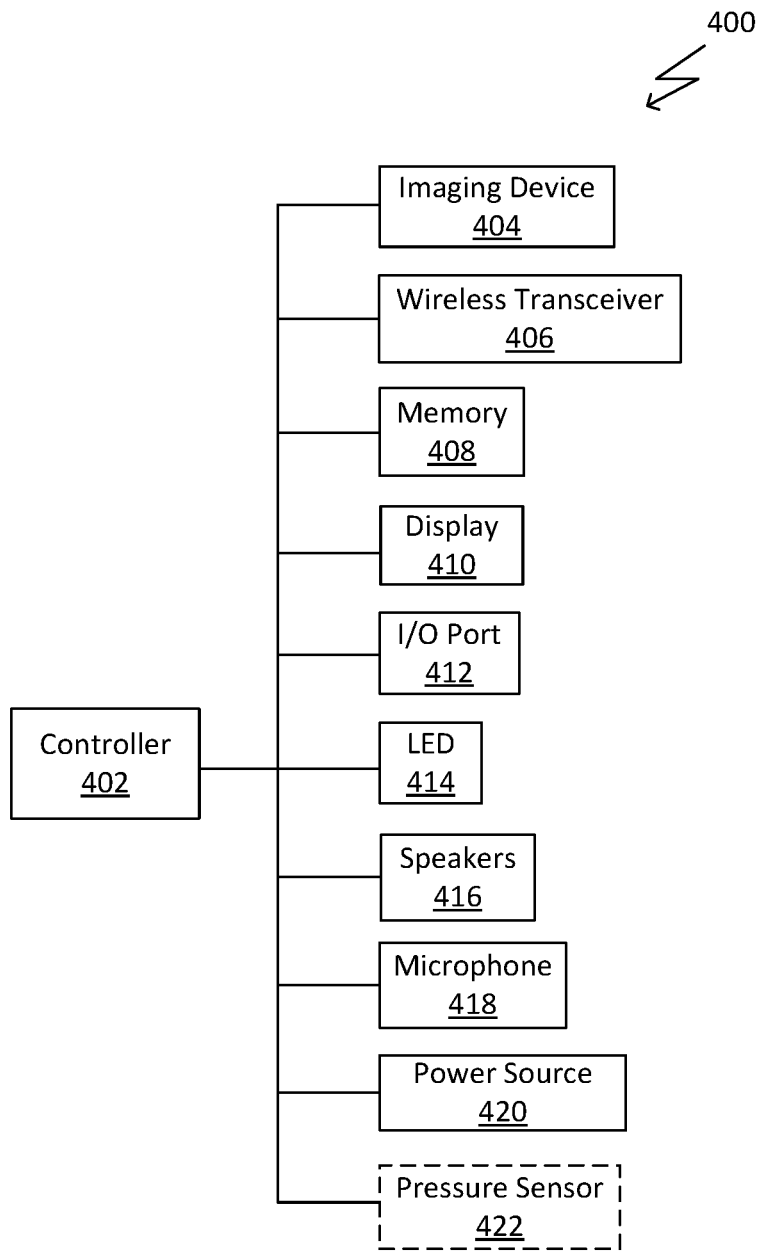
FIG. 4 illustrates a block diagram of an IAD.

FIG. 4 illustrates a block diagram of an IAD. The IAD 400 can be used to transmit cooking information or data, such as temperature data, pressure data, images, videos, alerts, messages, or any other desired information. This information can be viewed using the display 408 of the IAD 400 or on a remote electronic device further described below.

For example, the IAD 400 may acquire information about an item being cooked or baked within a cooking device. In another example, the IAD 400 may obtain images or videos of the items inside the cooking device. This allows for remote monitoring of items within the cooking device as the items are being cooked or baked. As such, it is not necessary to be physically near the cooking device to constantly monitor the item inside the cooking device to prevent being overcooked or burned.

The IAD 400 may contain a controller 402 that may be configured to communicate with an imaging device 404, wireless transceiver 406, memory 408, display 410, an input/output port 412, a light emitting diode (LED) 414, speakers 416, a microphone 418, a power source 420, and a pressure sensor 422. The controller 402 may be positioned within the housing described in FIGS. 3A and 3B.

The controller 402 may be configured to communicate with the imaging device 404 to acquire images and/or videos. The imaging device 404 may be positioned inside the housing. The imaging device 404 may be, for example, a camera, camcorder, or any other similar device capable of taking images and/or video. In one embodiment, the images and/or videos may be acquired periodically and/or over a predetermined period of time. For example, the imaging device 404 may be configured to acquire the images or video every two (2), five (5), or ten (10) minutes. In another example, the imaging device 404 may acquire the images or video every ten (10), fifteen (15), thirty (30), or forty-five (45) seconds. In another embodiment, the desired time periods may be set. For example, the imaging device 404 may be programmed by the controller 402 to obtain the images or video every one (1), five (5), or ten (10) minutes.

The imaging device 404 may obtain the images and/or video for a predetermined period of time. For example, if an item is cooking in a cooking device and the cooking time is forty-five (45) minutes, the imaging device 404 may acquire the images and/or video during the entire forty-five (45) minutes. In another embodiment, the imaging device 404 may begin acquiring the image and/or video in the middle of the cooking time. If the cooking time is one hour, the imaging device 404 may begin to obtain the image and/or video after thirty (30) minutes of cooking time has passed. In still another embodiment, the imaging device 404 may begin to acquire the image and/or video in the last ten (10) or fifteen (15) minutes of cooking time. Regardless of when the imaging device 404 begins the imaging time period, the imaging device 404 may obtain the images periodically (e.g. as discussed above, such as every five (5) minutes, thirty (30) seconds, etc.) during the predetermined period of time.

The controller 402 may also be configured to communicate with the display 410. The display 410 may be positioned inside the housing. The display 410 may be a LED display powered by the LED 414 further described below. The display 410 may present or display the stored images and/or video. The display 410 may also display cooking data. The cooking data may be any information such as temperature data, pressure data, images, videos, alerts, messages, or any other desired information. The display 410 may allow monitoring of the items being cooked within the cooking device based on the images/video transmitted from the IAD 400. For example, if the image and/or video displayed on the display 410 shows the item having a dark or black color, it may be known that the item being cooked or baked is overcooked or burned. In another example, if the image and/or video displayed on the display 410 shows the item as not having risen (e.g. a cake or bread), it may be known that the item being cooked or baked is not completely cooked. The display 410 may also display alerts. For example, if the IAD 400 determines that the item being cooked is burned, the IAD 400 may transmit "The food is burning!" alert or notification to be presented on the display 410.

The controller 402 may also be configured to communicate with the wireless transceiver 406. The wireless transceiver 406 may be positioned inside the housing. The wireless transceiver 406 may be configured to wirelessly transmit data to a remote electronic device. The remote electronic device can be any portable or non-portable computing device such as a cellular phone, tablet, computer, media device, netbook, laptop, or any other similar electronic device. The wireless transceiver 406 may provide the means for the IAD 400 to communicate wirelessly with the remote electronic device via any known wireless means such as blue tooth, Wi-Fi, WAN, or any other similar wireless communication methods. This conveniently may allow remote monitoring of the items being cooked within the cooking device based on the images/video transmitted from the IAD 400 to the remote electronic device. Much like the above example, if the image and/or video displayed on the remote device shows the item having a dark or black color, it will be known that the item being cooked or baked is overcooked or burned. In another similar example, if the image and/or video displayed on the remote electronic device shows the item as not having risen (e.g. a cake or bread), it will be known that the item being cooked or baked is not completely cooked.

The controller 402 may also be configured to communicate with the input/output port 412. The input/output port 412 may be positioned inside the housing. The input/output port 412 may be used to connect the IAD 400 via a wire or cable to other devices such as a computer, cellular phone, tablet, or any other similar device. The input/output port 412 may for example be a universal serial bus (USB) port and allow the IAD 400 to communicate with any of the other devices mentioned above. Therefore, information obtained by the IAD 400 may be viewed and/or transferred and saved to those other devices. The input/output port 412 for example may also be used as a power port. This conveniently may allow the IAD 400 to be powered without using a separate power source.

The controller 402 may also be configured to communicate with the LED 414. The LED 414 may be positioned inside the housing. The LED 414 may be used to power the display 410. The LED 414 may allow the display to be lit for a very long period of time without burning out since LEDs generate very little heat and use a high percentage of their electrical power to directly generate light. The LED 414 may also be easy to install and fit into the IAD 400 as they are small in size and fit easily into an electronic circuit. This may provide for example, an easy way to display cooking images/video and/or cooking information on the display 410.

The controller 402 may also be configured to communicate with the speakers 416. The speakers 416 may be positioned inside the housing. The speakers 416 may output audio notification or messages. The audio notifications or messages may be any message to alert the user of any desired information such as the end of the cooking time, whether the item within the cooking device is burning or overcooked, malfunction or power loss, or any other similar audio messages that may or may not require user attention. For example, the speakers 416 may transmit an audio message "cooking complete!" In another example, the speakers 416 may transmit an audio message "15 minutes remaining" not requiring user attention. These audio alerts may be useful if for example, a user does not have a remote electronic device or is blind and can only learn of cooking information by hearing it. In another example, a person may be in another room doing housework that makes remote visual monitoring difficult, and can instead rely on the audio messages to learn of cooking information.

The controller 402 may also be configured to communicate with the microphone 418. The microphone 418 may be positioned inside the housing. The microphone 418 may amplify sound coming from the IAD 400 so the audio can be heard clearly from the speakers 416. The microphone 418 may allow for the audio messages to be heard from several feet away. For example, a user can be in another room in a home while an item is cooking inside the cooking device in the kitchen and still hear the alerts. This way, the user may not have to worry about not hearing the audio messages.

The controller 402 may also be configured to couple to with the power source 420. The power source 420 may be positioned inside the housing. The power source 420 may provide means for connecting a power jack. The power source 420 may also allow provide means for charging the IAD 400 if the device is battery powered.

The controller 402 may also be configured to communicate with the pressure sensor 422. The pressure sensor 422 may be positioned inside the housing. The pressure sensor 422 may sense the pressure of the location of the IAD 400. For example, this can be useful when the cooking device is located in higher elevations. In higher elevations, the pressure sensor 422 may detect the pressure to be lower, which may make it necessary to increase the temperature of the cooking device or length of time the item is cooked for the item to be cooked to its desired state. In higher elevations, liquids may also evaporate faster. Therefore, the amount of liquids used in a recipe may be changed accordingly.

The controller 402 may also be configured to communicate with the memory 408. The memory 408 may be positioned within the housing. The memory 408 may store images, video, and cooking information. This may allow the stored images, video, and cooking information to thereafter be transferred to a third party server. The third party server may for example allow a plurality of users to share images, videos, and/or cooking information/data with other users in a social media setting. For example, a user may also utilize the third party server to determine how to improve upon previously cooked items. In another example, the user may utilize prior cooking information to determine how to adjust, improve upon, or change a recipe. In yet another example, users may use the stored cooking information to obtain cooking instructions if they forgot how to cook a specific item.

Figure 5A:
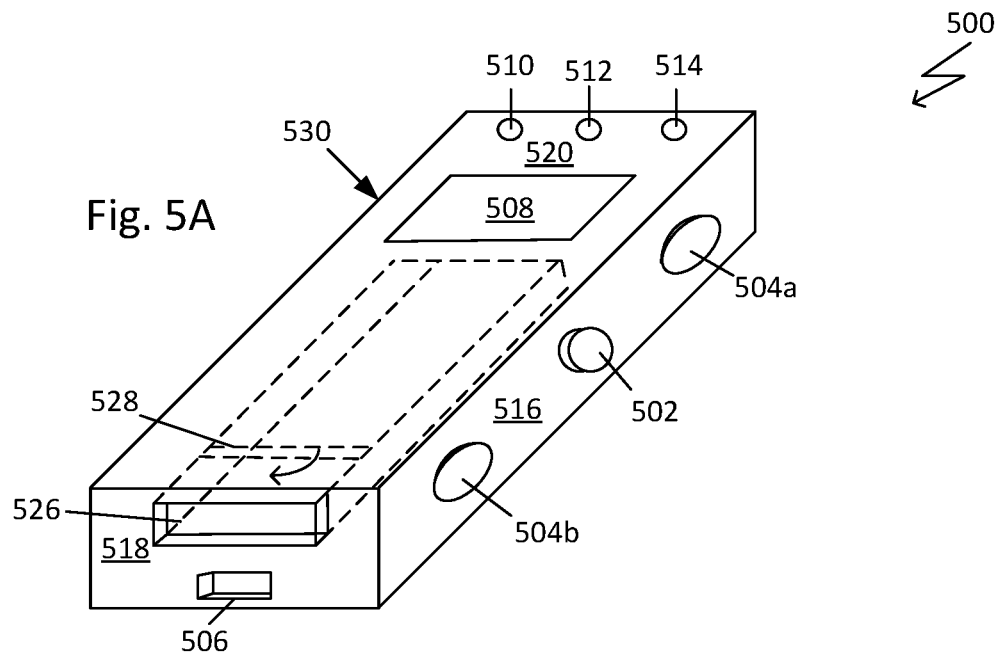
FIGS. 5A and 5B illustrate another example embodiments of an IAD.
Figure 5B:
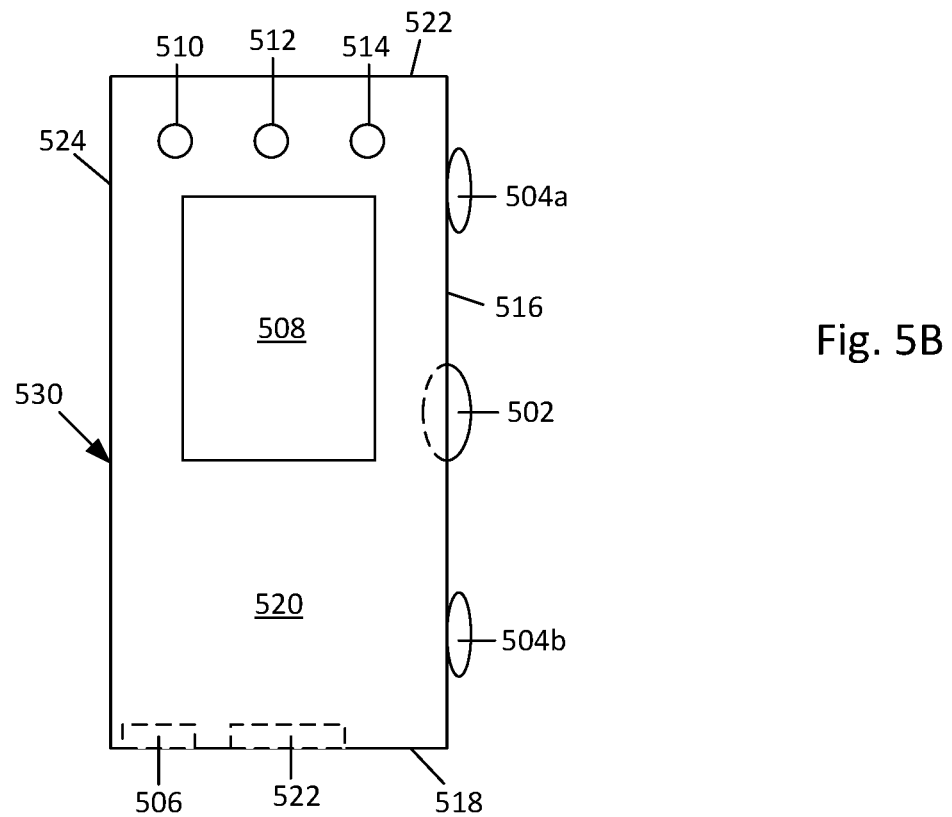

FIGS. 5A and 5B illustrate example embodiments of an IAD. FIG. 5A illustrates an example perspective view of the IAD 500. The IAD 500 may have a housing 530, display 508, attachment elements 504a, 504b, input/output port 506, speaker 512, microphone 510, and power indicator 514.

The housing 530 may contain surfaces and sides all connected together to form one three dimensional structure. The housing may be made of a plastic, silicon, metal, mixtures of each material, or any other similar cost effective material. The material may be stretchy to fit different sized components contained within the IAD 500. The housing 530 may also be injection molded which can mold the material to its desired shape.

The housing 530 of the IAD 500 may contain a top surface 520, a bottom surface (not shown), a right side 516, a left side (not shown), a back side 518, and a front side (not shown). The right side 516 of the housing 530 may contain attachment elements 504a and 504b. The attachment elements 504a and 504b may be any known attachment elements such as suction cups, adhesive, magnets, hook and loop fasteners, or any other similar element capable of mounting the IAD 500.

The attachment elements 504a and 504b may removably mount or attach the IAD 500 to a window of the cooking device. The IAD 500 can then obtain images/video or information of an item being cooked inside the cooking device. The attachment elements 504a and 504b may removably mount or attach the IAD 500 above the cooking device. Therefore, the IAD 500 may provide images/video or information of an item being cooked on top of the stove.

The right side 516 of the housing 530 may also contain a camera opening 502. The camera opening 502 may allow the lens of an imaging device to face the camera opening 502 so it can view the area outside the IAD 500. The imaging device may be a camera, camcorder, or any other similar device capable of taking images and/or video. The lens of the imaging device may also extend through the camera opening 502 and outside of the right side 516 of the housing 530, which will allow the imaging device to take clear images/video of the area outside the IAD 500. The IAD 500 may be mounted or attached to the window of a cooking device, where the camera opening 502 may be facing the window looking into the inside of the cooking device. Therefore, the lens of the imaging device can face through the aperture 502 and take images/video of items being cooking inside the cooking device. The IAD 500 may be positioned above the cooking device, where the camera opening 502 may be facing downward toward the top of the cooking device. Therefore, the lens of the imaging device can face through the camera opening 502 and view the top of the cooking device. The imaging device may then take images/video of items being cooking on a stove.

The bottom side 518 of the housing 530 may contain an opening 526 to allow a PED to be positioned inside housing of the IAD 500. The PED may be held in place inside the opening 526 by a movable latch 528. Both ends of the movable latch 528 may be removably secured horizontally to each side of the opening 526 by any attachment means after the PED is positioned inside the opening 526. To remove the PED from the opening 526, the movable latch 528 may be disconnected at one end of the opening 526 to allow the PED to slide out of the opening 526 and thereafter be removed. The PED may be any cellular phone that fits within the opening 526 and has an imaging device (e.g. a camera, camcorder, or any other similar device capable of taking images and/or video) configured to obtain images and/or videos. Using the PED may allow for the images or video to be viewed and stored on the PED itself.

The bottom side 518 of the housing 530 may contain an input/output port 506. The input/output port 506 can connect the IAD 500 via a wire or cable to other devices such as a computer, cellular phone, tablet, or any other similar device. The input/output port 506 may be a universal serial bus (USB) port and allow the IAD 500 to communicate with any of the other devices mentioned above. Therefore, information obtained by the IAD 500 may be viewed and/or transferred and saved to those other devices. The input/output port 506 may also be used as a power port.

The top surface 520 of the housing 530 may contain a display 508. The display 508 may be a light emitting diode (LED) display. The display 508 may present or display the stored images and/or video. The display 508 may also display cooking data. The cooking data may be any information such as temperature data, pressure data, images, videos, alerts, messages, or any other desired information. The display 508 may allow monitoring of the items being cooked within the cooking device based on the images/video transmitted from the IAD 300. The display 508 may also display alerts when an item is done cooking or is burning.

The housing 530 may also contain a wireless transceiver 510. The wireless transceiver 510 may be configured to wirelessly transmit data to a remote electronic device. The remote electronic device can be any portable or non-portable computing device such as a cellular phone, tablet, computer, media device, netbook, laptop, or any other similar electronic device. The wireless transceiver 510 may provide the means for the IAD 500 to communicate wirelessly with the remote electronic device via any known wireless means such as Bluetooth, Wi-Fi, WAN, or any other similar wireless communication methods.

The housing 530 (e.g. top surface) may also contain a speaker 512. The speaker 512 may output audio notification or messages. The audio notifications or messages may be any message to alert the user of any desired information such as the end of the cooking time, whether the item within the cooking device is burning or overcooked, malfunction or power loss, or any other similar audio messages that may or may not require user attention.

The housing 530 (e.g. top surface) may also contain a power indicator 514. The power indicator 514 may provide means for connecting a power jack. The power indicator 514 may also allow provide means for charging the IAD 500 if the device is battery powered.

FIG. 5B illustrates an example perspective view of the IAD 500. The IAD 500 may have a housing 530, display 508, attachment elements 504a, 504b, input/output port 506, speaker 512, microphone 510, and power indicator 514.

The housing 530 may contain surfaces and sides all connected together to form one three dimensional structure. The housing may be made of plastic, silicon, metal, mixtures of each material, or any other similar cost effective material. The material may be stretchy to fit different sized components contained within the IAD 500. The housing may also be injection molded which can mold the material to its desired shape.

The housing of the IAD 500 may contain a top surface 520, a bottom surface (not shown), a right side 516, a left side 524, a back side 518, and a front side 522. The right side 516 of the housing 530 may contain attachment elements 504a and 504b. The attachment elements 504a and 504b may be any known attachment elements such as suction cups, adhesive, magnets, hook and loop fasteners, or any other similar element capable of mounting the IAD 500.

The attachment elements 504a and 504b may removably mount or attach the IAD 500 to a window of the cooking device. The IAD 500 can then obtain images/video or information of an item being cooked inside the cooking device. The attachment elements 504a and 504b may removably mount or attach the IAD 500 above the cooking device. Therefore, the IAD 500 may provide images/video or information of an item being cooked on top of the stove.

The right side 516 of the housing 530 may also contain a camera opening 502. The camera opening 502 may allow the lens of an imaging device to face the camera opening 502 so it can view the area outside the IAD 500. The imaging device may be a camera, camcorder, or any other similar device capable of taking images and/or video. The lens of the imaging device may also extend through the camera opening 502 and outside of the right side 516 of the housing 530, which will allow the imaging device to take clear images/video of the area outside the IAD 500. The IAD 500 may be mounted or attached to the window of a cooking device, where the camera opening 502 may be facing the window looking into the inside of the cooking device. Therefore, the lens of the imaging device can face through the aperture 502 and take images/video of items being cooking inside the cooking device. The IAD 500 may be positioned above the cooking device, where the camera opening 502 may be facing downward toward the top of the cooking device. Therefore, the lens of the imaging device can face through the camera opening 502 and view the top of the cooking device. The imaging device may then take images/video of items being cooking on a stove.

The bottom side 518 of the housing 530 may contain an opening 526 to allow a PED to be positioned inside housing of the IAD 500. The PED may be held in place inside the opening 526 by a movable latch (not shown). Both ends of the movable latch may be removably secured horizontally to each side of the opening 526 by any attachment means after the PED is positioned inside the opening 526. To remove the PED from the opening 526, the movable latch may be disconnected at one end of the opening 526 to allow the PED to slide out of the opening 526 and thereafter be removed.

The PED may be any cellular phone that fits within the opening 526 and has an imaging device (e.g. a camera, camcorder, or any other similar device capable of taking images and/or video) configured to obtain images and/or videos. Using the PED may allow for the images or video to be viewed and stored on the PED itself.

The bottom side 518 of the housing 530 may contain an input/output port 506. The input/output port 506 can connect the IAD 500 via a wire or cable to other devices such as a computer, cellular phone, tablet, or any other similar device. The input/output port 506 may be a universal serial bus (USB) port and allow the IAD 500 to communicate with any of the other devices mentioned above. Therefore, information obtained by the IAD 500 may be viewed and/or transferred and saved to those other devices. The input/output port 506 may also be used as a power port.

The top surface 520 of the housing 530 may contain a display 508. The display 508 may be a light emitting diode (LED) display. The display 508 may present or display the stored images and/or video. The display 508 may also display cooking data. The cooking data may be any information such as temperature data, pressure data, images, videos, alerts, messages, or any other desired information. The display 508 may allow monitoring of the items being cooked within the cooking device based on the images/video transmitted from the IAD 500. The display 508 may also display alerts when an item is done cooking or is burning.

The housing 530 may also contain a wireless transceiver 510. The wireless transceiver 510 may be configured to wirelessly transmit data to a remote electronic device. The remote electronic device can be any portable or non-portable computing device such as a cellular phone, tablet, computer, media device, netbook, laptop, or any other similar electronic device. The wireless transceiver 510 may provide the means for the IAD 500 to communicate wirelessly with the remote electronic device via any known wireless means such as blue tooth, Wi-Fi, WAN, or any other similar wireless communication methods.

The housing 530 (e.g. top surface) may also contain a speaker 512. The speaker 512 may output audio notification or messages. The audio notifications or messages may be any message to alert the user of any desired information such as the end of the cooking time, whether the item within the cooking device is burning or overcooked, malfunction or power loss, or any other similar audio messages that may or may not require user attention.

The housing 530 (e.g. top surface) may also contain a power indicator 514. The power indicator 514 may provide means for connecting a power jack. The power indicator 514 may also allow provide means for charging the IAD 500 if the device is battery powered.

Figure 6:
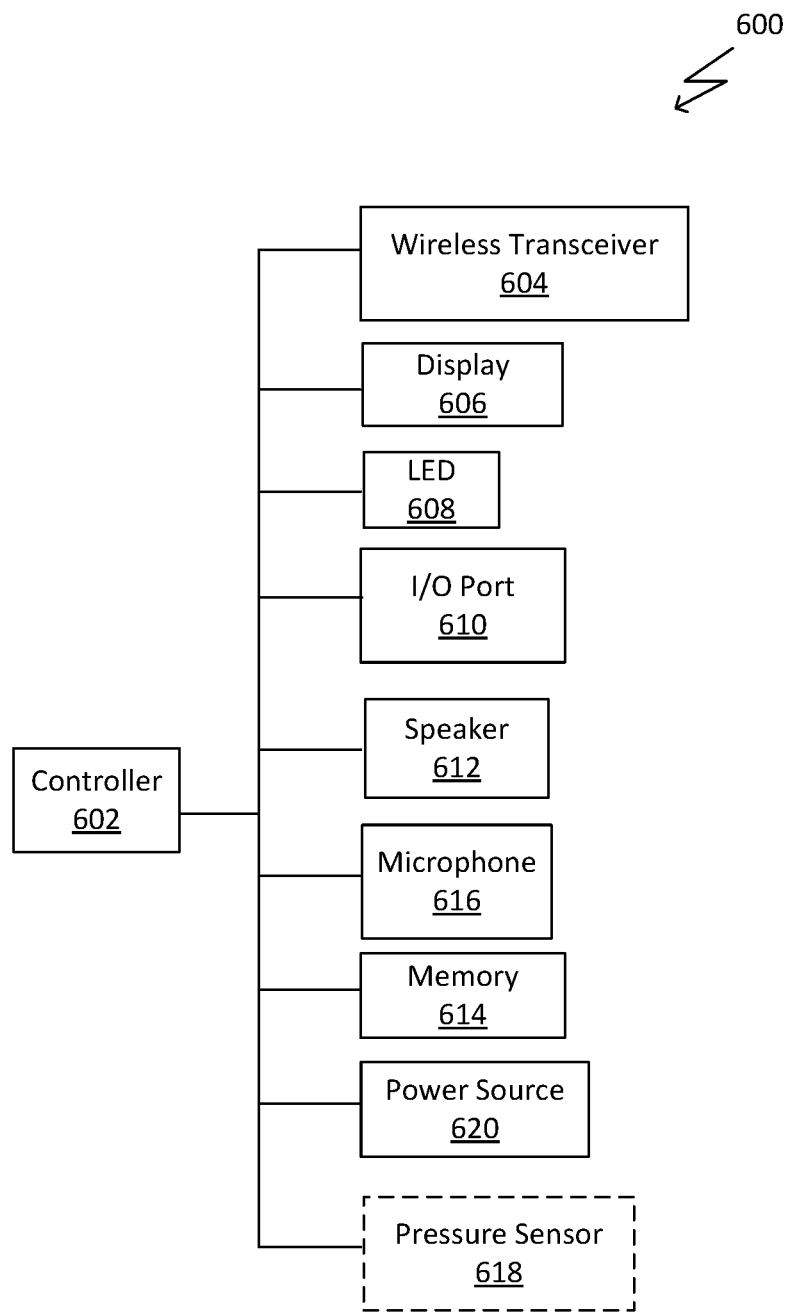
FIG. 6 illustrates another block diagram of an IAD.

FIG. 6 illustrates a block diagram of an IAD 600. The IAD 600 can be used to transmit cooking information or data, such as temperature data, pressure data, images, videos, alerts, messages, or any other desired information. This information can be viewed using the display 606 of the IAD 600 or on a remote electronic device further described below.

For example, the IAD 600 may acquire information about an item being cooked or baked within a cooking device. In another example, the IAD 600 may obtain images or videos of the items inside the cooking device. This allows for remote monitoring of items within the cooking device as the items are being cooked or baked. As such, it is not necessary to be physically near the cooking device to constantly monitor the item inside the cooking device to prevent being overcooked or burned.

The IAD 600 may contain a controller 602 that may be configured to communicate with a wireless transceiver 604, a display 606, a light emitting diode (LED) 608, an input/output port 610, speakers 612, a memory 614, a microphone 616, a pressure sensor 618, and a power source 620. The controller 602 may be positioned within a housing, such as the housing described in FIGS. 5A and 5B.

The controller 602 may also be configured to communicate with the display 606. The display 606 may be positioned inside the housing. The display 606 may be a LED display powered by the LED 608 further described below. The display 606 may present or display the stored images and/or video. The display 606 may also display cooking data. The cooking data may be any information such as temperature data, pressure data, images, videos, alerts, messages, or any other desired information. The display 606 may allow monitoring of the items being cooked within the cooking device based on the images/video transmitted from the IAD 600. For example, if the image and/or video displayed on the display 606 shows the item having a dark or black color, it may be known that the item being cooked or baked is overcooked or burned. In another example, if the image and/or video displayed on the display 606 shows the item as not having risen (e.g. a cake or bread), it may be known that the item being cooked or baked is not completely cooked. The display 606 may also display alerts. For example, if the IAD 600 determines that the item being cooked is burned, the IAD 600 may transmit "The food is burning!" alert or notification to be presented on the display 606.

The controller 602 may also be configured to communicate with the wireless transceiver 604. The wireless transceiver 604 may be positioned inside the housing. The wireless transceiver 604 may be configured to wirelessly transmit data to a remote electronic device. The remote electronic device can be any portable or non-portable computing device such as a cellular phone, tablet, computer, media device, netbook, laptop, or any other similar electronic device. The wireless transceiver 604 may provide the means for the IAD 600 to communicate wirelessly with the remote electronic device via any known wireless means such as Bluetooth, Wi-Fi, WAN, or any other similar wireless communication methods. This conveniently may allow remote monitoring of the items being cooked within the cooking device based on the images/video transmitted from the IAD 600 to the remote electronic device. Much like the above example, if the image and/or video displayed on the remote device shows the item having a dark or black color, it will be known that the item being cooked or baked is overcooked or burned. In another similar example, if the image and/or video displayed on the remote electronic device shows the item as not having risen (e.g. a cake or bread), it will be known that the item being cooked or baked is not completely cooked.

The controller 602 may also be configured to communicate with the input/output port 610. The input/output port 610 may be positioned inside the housing. The input/output port 610 may be used to connect the IAD 400 via a wire or cable to other devices such as a computer, cellular phone, tablet, or any other similar device. The input/output port 610 may for example be a universal serial bus (USB) port and allow the IAD 600 to communicate with any of the other devices mentioned above. Therefore, information obtained by the IAD 600 may be viewed and/or transferred and saved to those other devices. The input/output port 610 for example may also be used as a power port. This conveniently may allow the IAD 600 to be powered without using a separate power source.

The controller 602 may also be configured to communicate with the LED 608. The LED 608 may be positioned inside the housing. The LED 608 may be used to power the display 606. The LED 608 may allow the display to be lit for a very long period of time without burning out since LEDs generate very little heat and use a high percentage of their electrical power to directly generate light. The LED 608 may also be easy to install and fit into the IAD 600 as they are small in size and fit easily into an electronic circuit. This may provide for example, an easy way to display cooking images/video and/or cooking information on the display 606.

The controller 602 may also be configured to communicate with the speakers 612. The speakers 612 may be positioned inside the housing. The speakers 612 may output audio notification or messages. The audio notifications or messages may be any message to alert the user of any desired information such as the end of the cooking time, whether the item within the cooking device is burning or overcooked, malfunction or power loss, or any other similar audio messages that may or may not require user attention. For example, the speakers 612 may transmit an audio message "cooking complete!" In another example, the speakers 612 may transmit an audio message "15 minutes remaining" not requiring user attention. These audio alerts may be useful if for example, a user does not have a remote electronic device or is blind and can only learn of cooking information by hearing it. In another example, a person may be in another room doing housework that makes remote visual monitoring difficult, and can instead rely on the audio messages to learn of cooking information.

The controller 602 may also be configured to communicate with the microphone 616. The microphone 616 may be positioned inside the housing. The microphone 616 may amplify sound coming from the IAD 400 so the audio can be heard clearly from the speakers 612. The microphone may allow for the audio messages to be heard from several feet away. For example, a user can be in another room in a home while an item is cooking inside the cooking device in the kitchen and still hear the alerts. This way, the user may not have to worry about not hearing the audio messages.

The controller 602 may also be configured to couple to the power source 620. The power source 620 may be positioned inside the housing. The power source 620 may provide means for connecting a power jack. The power source 620 may also allow provide means for charging the IAD 600 if the device is battery powered.

The controller 602 may also be configured to communicate with the pressure sensor 618. The pressure sensor 618 may be positioned inside the housing. The pressure sensor 618 may sense the pressure of the location of the IAD 600. For example, this can be useful when the cooking device is located in higher elevations. In higher elevations, the pressure sensor 618 may detect the pressure to be lower, which may make it necessary to increase the temperature of the cooking device or length of time the item is cooked for the item to be cooked to its desired state. In higher elevations, liquids may also evaporate faster. Therefore, the amount of liquids used in a recipe may be changed accordingly.

The controller 602 may also be configured to communicate with the memory 614. The memory 614 may be positioned within the housing. The memory 614 may store images, video, and cooking information. This may allow the stored images, video, and cooking information to thereafter be transferred to a third party server. The third party server may for example allow a plurality of users to share images, videos, and/or cooking information/data with other users in a social media setting. For example, a user may also utilize the third party server to determine how to improve upon previously cooked items. In another example, the user may utilize prior cooking information to determine how to improve upon, or change a recipe. In yet another example, users may use the stored cooking information to obtain cooking instructions if they forgot how to cook a specific item.

FIGS. 7A-10B illustrate different types of temperature sensors (temperature sensor 104) which may be positioned on a cooking device, within the item being cooked or baked, or on a substrate containing the item being cooked or baked. While a few specific types of temperature sensors are being described, as can be appreciated by one skilled in the art, the invention is not limited thereto as the temperature sensors used herein can be any temperature sensor which may be used to monitor an item being cooked. The cooking device may have the temperature sensor positioned within the cooking device. The temperature sensor may be configured to monitor the temperature of the item being cooked or baked inside the cooking device. The temperature sensor can be any device capable of obtaining temperature, such as a thermometer, memory metal, infrared sensor, or any other similar device. In all embodiments, the IAD may be designed to capture the image and/or video of the temperature sensor.

Figures 7A, 7B:
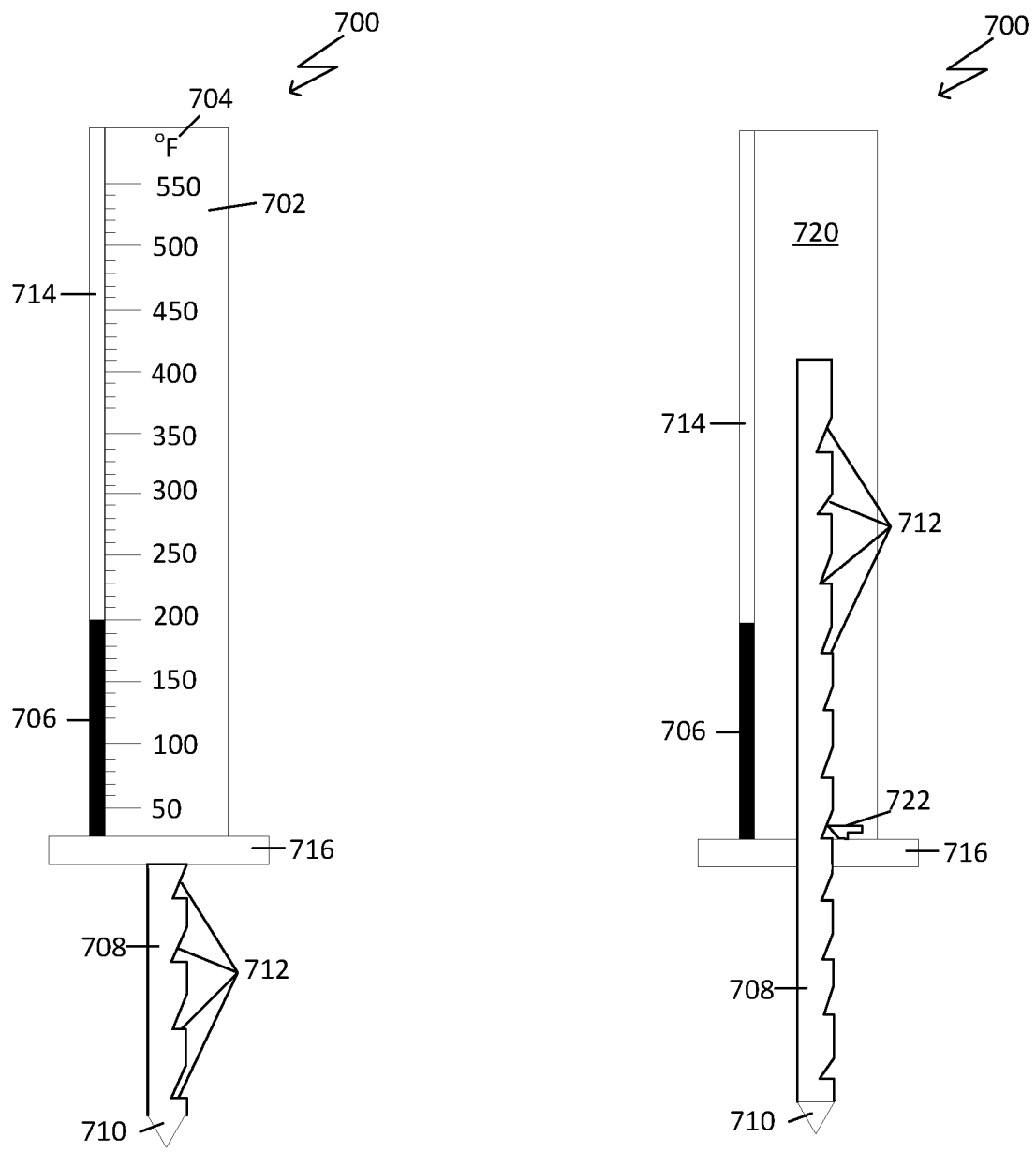
FIGS. 7A and 7B illustrate example embodiment of a temperature sensor.

FIGS. 7A and 7B illustrate example embodiments of a temperature sensor. Temperature sensor 700 may be a thermometer 700 positioned on the cooking device, within the item being cooked or baked, or on a substrate containing the item being cooked or baked. FIG. 7A illustrates a frontal view of the thermometer 700 and FIG. 7B illustrates a rear view of the thermometer 700. The thermometer 700 used to monitor an item being cooked may comprise a sealed protective tube 702, an indicia bearing member/scale containing temperature indicating numerals 704, a reservoir 714, a rising substrate 706, a connector 716, a probe 708, probe teeth 712, and probe head 710. The sealed protective tube 702 is fully encloses the indicia bearing member/scale containing temperature indicating numerals 704 and the rising substrate 706.

The sealed protective tube 702 may be made of any heat resistant material, such as heat resistant glass, heat resistant plastics, or any other types of similar material. The sealed protective tube 702 is clear or translucent to allow a clear reading of the temperature. The sealed protective tube 702 encloses the indicia bearing member/scale containing temperature indicating numerals 704.

The indicia bearing member/scale containing temperature indicating numerals 704 may be in any useful temperature range and any available units of temperature, such as Fahrenheit, Celsius, Kelvin, Rankine, Delisle, Newton, Réaumur, Rømer, or any other similar units of temperature measurement. The indicia bearing member/scale containing temperature indicating numerals 704 may be made of any heat resistant material which may withstand the potential high temperature in the cooking device 106 and the material may be printable, etchable, engravable, or any other similar method of fixing the scale onto the material.

The reservoir 714 extends from approximately the top of the sealed protective tube 702 to approximately the bottom of the tube 702. The rising substrate 706 is contained within the reservoir 714. The rising substrate 706 can be any fluid that may be heated by conduction as the item being cooked is heated. When introduced to heat, the rising substrate 706 within the cavity/channel 714 begins to expand and thereby rise within the reservoir 714 towards the opposite end of the sealed protective tube 702. This provides a precise heat indication and the actual cooking status of the item being cooked. For a purpose of being able to be used within a microwave, the rising substrate 706 may be a non-ionic fluid such as an organic liquid-diphenyl, toluene, or any other non-ionic fluid which will not respond to a microwave energy source. The rising substrate 706 may also be any suitable fluid selected for its character of remaining liquid under the elevated temperature conditions to which the device is subjected in a cooking device 106, which can include glycerol, propylene glycol, glycerol dioleate and glycerol distearate, or any other similar material. As used herein "fluid" is also inclusive of materials which are normally solid at ambient temperatures but which at temperatures approaching cooking temperatures can change from a solid to a liquid state, e.g., a solid which becomes liquid at about 130° F.

The sealed protective tube 702 is coupled to the connector 716. The connector 716 connects the sealed protective tube 702 to the probe 708. The connector 716 can be any suitable heat resistant material, such as glass, metal, plastic, a combination, or any other similar material. The connector 716 may be removable coupled to the sealed protective tube 702, to make removal and parts replacement possible. The connector 716 can be of any suitable thickness and width.

The probe 708 is adjustably coupled to the connector 716. The probe 708 can be made of any suitable, non-toxic and heat resistant material, such as any suitable metal, glass, plastic, a combination, or any other similar material. The probe 708 may be inserted into the item being cooked and transfer the heat to the connector 716 and the rising substrate 706 to initiate the reading of the temperature. The probe 708, which can be any suitable length and width, comprises probe teeth 712 on one side and probe head 710 on an end that is placed into the item being cooked. The probe teeth 712 are any suitable numbers of jagged edges, they may be edges of even or uneven quality. The probe teeth 712 can make many small points of contact with the item it is being placed into, which makes the probe 708 easier to insert into the item being cooked and once inserted the jagged edges also secures or holds the thermometer in position. The probe head 710 is located on the free end of the probe 708 and it can be in any suitable shape, such as round, cone, or any other similar shape for breaking into the material of the item being cooked and for easy insertion.

In addition to all the parts covered above, FIG. 7B also shows the back of the sealed protective tube 720 and a fastener 722. The fastener 722 can be joined to connector 716, the fastener 722 can move around to allow adjustment of the probe 708 and, once adjusted, the fastener 722 can be set to hold the probe 708 in place free from any unintended movement.

As can be appreciated by one skilled in the art, the invention is not limited the parts mentioned above. Additional parts may be added as necessary to improve the functionality of the thermometer.

Figures 8A, 8B, 8C:
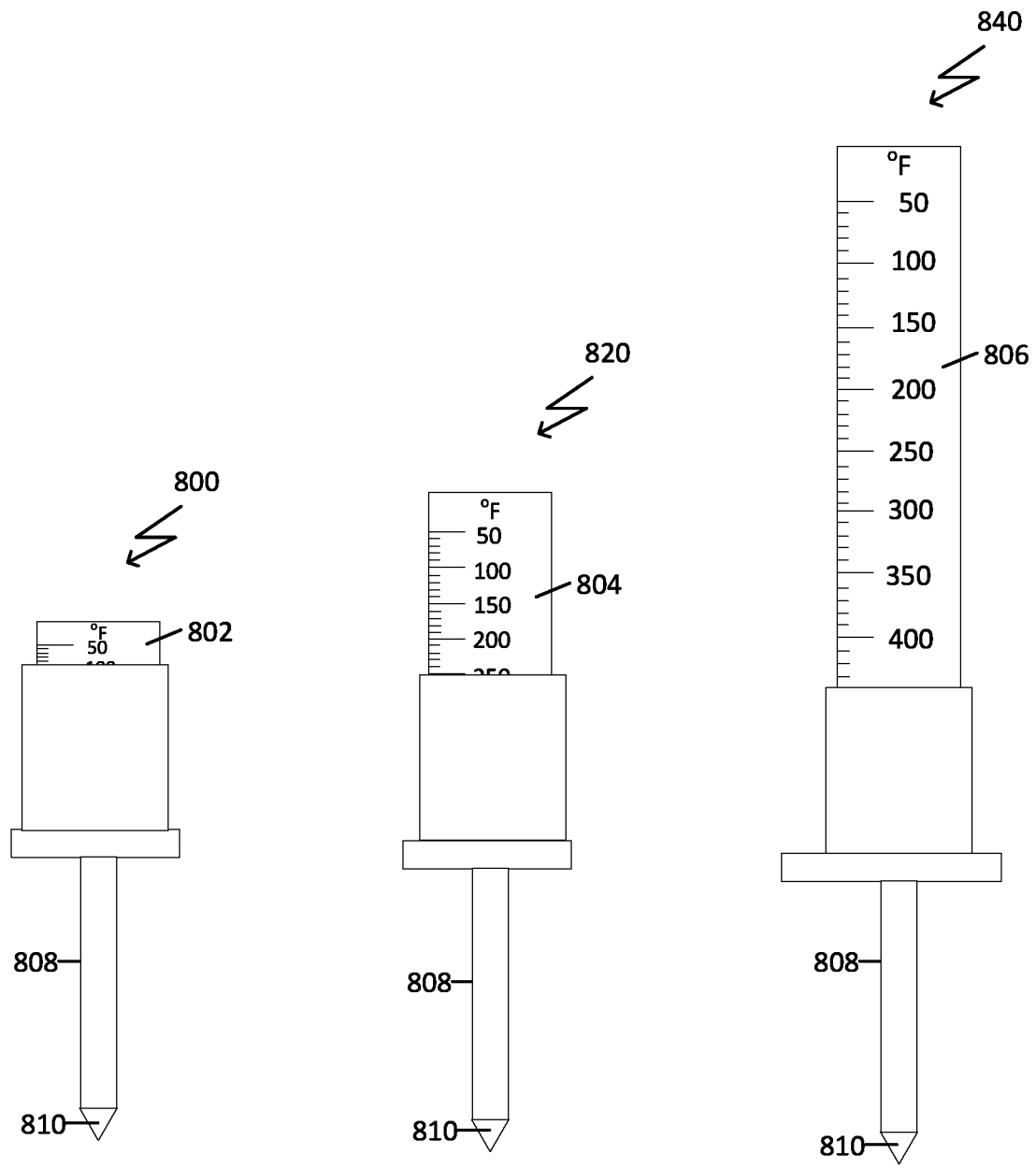
FIGS. 8A-8C illustrate another embodiment of a temperature sensor.

FIGS. 8A-8C illustrate another embodiments of a temperature sensor. The temperature sensor may be a shape-memory alloy (SMA, smart metal, memory metal, memory alloy, muscle wire, smart alloy) positioned on a cooking device, within the item being cooked or baked, or on a substrate containing the item being cooked or baked. FIG. 8A illustrates a temperature sensor 800 which may be a shape-memory alloy 802 in a relaxed state. The shape-memory alloy 802 is an alloy in a non-deformed shape. This material is lightweight and remains in a solid-state. The shape-memory alloy 802 may be made of copper-aluminumnickel, nickel-titanium (NiTi) alloys, alloy zinc, copper, gold, iron, a combination, or any other similar stable, practicable, non-toxic, and heat-resistant material with superior thermo-mechanic performance. The shape-memory alloy 802 may be a one-way or a two-way shape-memory alloy. The shape-memory alloy 802 is removably connected to a holder with a probe 808, where a first side of the holder with a probe 808 secures the shape-memory alloy 802 in place and a second side may be inserted into the item being cooked.

The holder with a probe 808 can be made of any suitable, non-toxic and heat resistant material, such as any suitable metal, glass, plastic, a combination, or any other similar material. The holder with a probe 808 may be inserted into the item being cooked and transfer the heat to the shape-memory alloy to initiate the temporary deformity of the shape of the alloy. The holder with a probe 808 can be any suitable length and width and may comprise a probe head 810 on an end being placed into the item being cooked. The probe head 810 is located on the free end of the holder with a probe 808 and it can be in any suitable shape, such as round, cone, or any other similar shape for breaking into the material of the item being cooked and for easy insertion.

FIG. 8B illustrates a shape-memory alloy 804 in an intermediate deformed state, where the shape-memory alloy 804 is vertically expanding to indicate the rise in temperature. The expansion may be measured by an indicia bearing member/scale containing temperature indicating numerals; the scale may be in any useful temperature range and any available units of temperature, such as Fahrenheit, Celsius, Kelvin, Rankine, Delisle, Newton, Réaumur, Rømer, or any other similar units of temperature measurement. The indicia bearing member/scale containing temperature indicating numerals may be made of any heat resistant material which may withstand the potential high temperature in the cooking device and the material may be printable, etchable, engravable, or any other similar method of fixing the scale onto the material.

The shape-memory alloy in an intermediate deformed state 820 is removably connected to a holder with a probe 808, where a first side of the holder with a probe 808 secures the shape-memory alloy in place and a second side may be inserted into the item being cooked. The holder with a probe 808 can be made of any suitable, non-toxic and heat resistant material, such as any suitable metal, glass, plastic, a combination, or any other similar material. The holder with a probe 808 may be inserted into the item being cooked and transfer the heat to the shape-memory alloy to initiate the temporary deformity of the shape of the alloy. The holder with a probe 808 can be any suitable length and width and may comprises a probe head 810 on an end being placed into the item being cooked. The probe head 810 is located on the free end of the holder with a probe 808 and it can be in any suitable shape, such as round, cone, or any other similar shape for breaking into the material of the item being cooked and for easy insertion.

FIG. 8C illustrates the shape-memory alloy in a fully deformed state 840, where a shape-memory alloy 806 has vertically expanded to indicate the risen in temperature. The expansion may be measured by an indicia bearing member/scale containing temperature indicating numerals; the scale may be in any useful temperature range and any available units of temperature, such as Fahrenheit, Celsius, Kelvin, Rankine, Delisle, Newton, Réaumur, Rømer, or any other similar units of temperature measurement. The indicia bearing member/scale containing temperature indicating numerals may be made of any heat resistant material which may withstand the potential high temperature in the cooking device 106 and the material may be printable, etchable, engravable, or any other similar method of fixing the scale onto the material.

The shape-memory alloy 806 in a fully deformed state 840 is removably connected to a holder with a probe 808, where a first side of the holder with a probe 808 secures the shape-memory alloy 806 in place and a second side may be inserted into the item being cooked. The holder with a probe 808 can be made of any suitable, non-toxic and heat resistant material, such as any suitable metal, glass, plastic, a combination, or any other similar material. The holder with a probe 808 may be inserted into the item being cooked and transfer the heat to the shape-memory alloy 806 to initiate the temporary deformity of the shape of the alloy. The holder with a probe 808 can be any suitable length and width and may comprises a probe head 810 on an end being placed into the item being cooked. The probe head 810 is located on the free end of the holder with a probe 808 and it can be in any suitable shape, such as round, cone, or any other similar shape for breaking into the material of the item being cooked and for easy insertion.

Figure 9A:
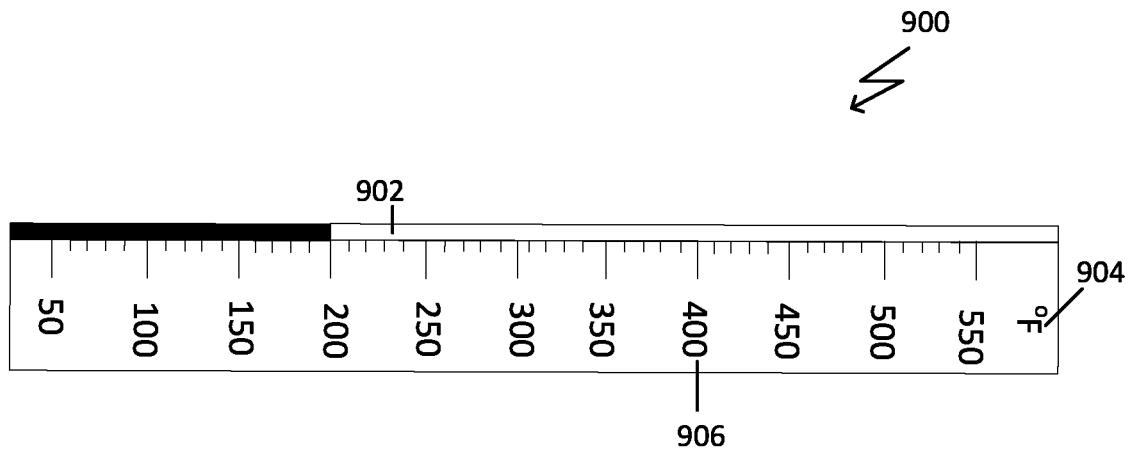
FIGS. 9A and 9B illustrate still another example embodiment of a temperature sensor.
Figure 9B:
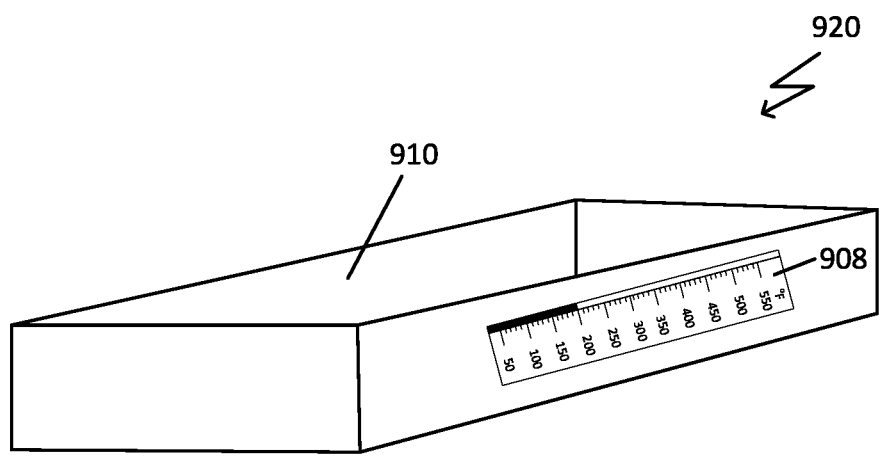

FIGS. 9A and 9B illustrate still another example embodiment of a temperature sensor 900. The temperature sensor 900 may be temperature indication sticker positioned on the cooking device, within the item being cooked or baked, or on a substrate containing the item being cooked or baked. FIG. 9A illustrates the temperature sensor 900 which may be or include a temperature indication sticker. The temperature indication sticker may be reversible or non-reversible for one time use. The temperature indication sticker may be made of any suitable heat resistant material, such as glass, metal, plastic, a combination, or any other similar material. The temperature sticker may be made of any printable, etchable, or engravable material which can accommodate the presence of an indicia bearing member/scale containing temperature indicating numerals 904 on the front side of the sticker. The indicia bearing member/scale containing temperature indicating numerals 904 may be in any useful temperature range and any available units of temperature, such as Fahrenheit, Celsius, Kelvin, Rankine, Delisle, Newton, Réaumur, Rømer, or any other similar units of temperature measurement.

A channel 902 may extends from the top to the bottom of the temperature indication sticker. The channel 902 may contain a rising substrate, which can be any fluid that may be heated by conduction as the item being cooked is heated. When introduced to heat, the rising substrate within the channel 902 begins to expand and thereby rise within the channel 902. This provides a precise heat indication and the actual cooking status of the item being cooked. For a purpose of being able to be used within a microwave, the rising substrate may be a non-ionic fluid such as an organic liquid-diphenyl, toluene, or any other non-ionic fluid which will not respond to a microwave energy source. The rising substrate may also be any suitable fluid selected for its character of remaining liquid under the elevated temperature conditions to which the device is subjected in a cooking device, which can include glycerol, propylene glycol, glycerol dioleate and glycerol distearate, or any other similar material. As used herein "fluid" is also inclusive of materials which are normally solid at ambient temperatures but which at temperatures approaching cooking temperatures can change from a solid to a liquid state, e.g., a solid which becomes liquid at about 130° F. The channel 902 may also contain thermochromatic liquid crystals, leuco dyes, or any other similar material capable of displaying different colors at different temperatures. An adhesive or attaching material 906 is placed on a back side of the temperature indication sticker. The adhesive or attaching material 906 can be any heat resistant material, such as epoxy, silicone, urethanes, or any other similar material. The adhesive or attaching material 906 can be any water proof material. The adhesive or attaching material 906 may be reusable or for one time use.

FIG. 9B illustrates an assembly 920 comprising a temperature indication device 908 attached onto a container 910. The container 910 can be made of any suitable heat resistant material, such as glass, metal, plastic, silicone, a combination, or any other similar material. The container 910 may be any suitable dimension for the cooking device and may or may not have a top cover. The temperature indication device 908 may be reversible or non-reversible for one time use. The temperature indication device 908 may be made of any suitable heat resistant material, such as glass, metal, plastic, a combination, or any other similar material. The temperature device 908 may be made of any printable, etchable, or engravable material which can accommodate the presence of an indicia bearing member/scale card containing temperature indicating numerals on the front side of the sticker. The indicia bearing member/scale card containing temperature indicating numerals may be in any useful temperature range and any available units of temperature, such as Fahrenheit, Celsius, Kelvin, Rankine, Delisle, Newton, Réaumur, Rømer, or any other similar units of temperature measurement.

A channel may extend from the top to the bottom of the temperature indication sticker. The channel may contain a rising substrate, which can be any fluid that may be heated by conduction as the item being cooked is heated. When introduced to heat, the rising substrate within the channel begins to expand and thereby rise within the channel. This provides a precise heat indication and the actual cooking status of the item being cooked. For a purpose of being able to be used within a microwave, the rising substrate may be a non-ionic fluid such as an organic liquid-diphenyl, toluene, or any other non-ionic fluid which will not respond to a microwave energy source. The rising substrate may also be any suitable fluid selected for its character of remaining liquid under the elevated temperature conditions to which the device is subjected in a cooking device, which can include glycerol, propylene glycol, glycerol dioleate and glycerol distearate, or any other similar material. As used herein "fluid" is also inclusive of materials which are normally solid at ambient temperatures but which at temperatures approaching cooking temperatures can change from a solid to a liquid state, e.g., a solid which becomes liquid at about 130° F. The channel may also contain thermochromatic liquid crystals, leuco dyes, or any other similar material capable of displaying different colors at different temperatures. An adhesive or attaching material is placed on a back side of the temperature indication device 908. The adhesive or attaching material can be any heat resistant material, such as epoxy, silicone, urethanes, or any other similar material. The adhesive or attaching material can be any water proof material. The adhesive or attaching material may be reusable or for one time use and is used to attach the temperature indication device 908 to the container 910.

Figure 10A:
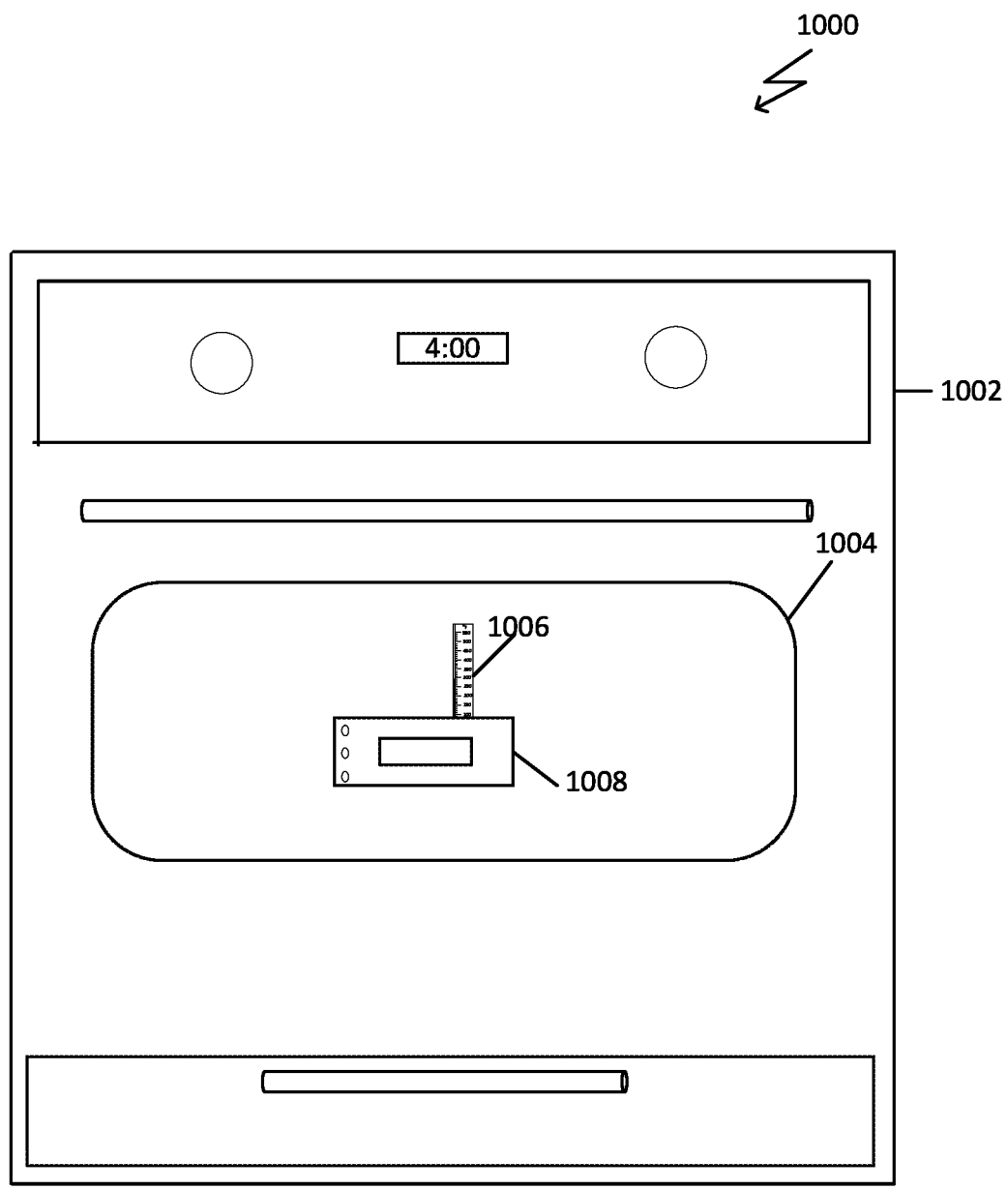
FIGS. 10A and 10B illustrate another example embodiment of a system for monitoring cooking.
Figure 10B:
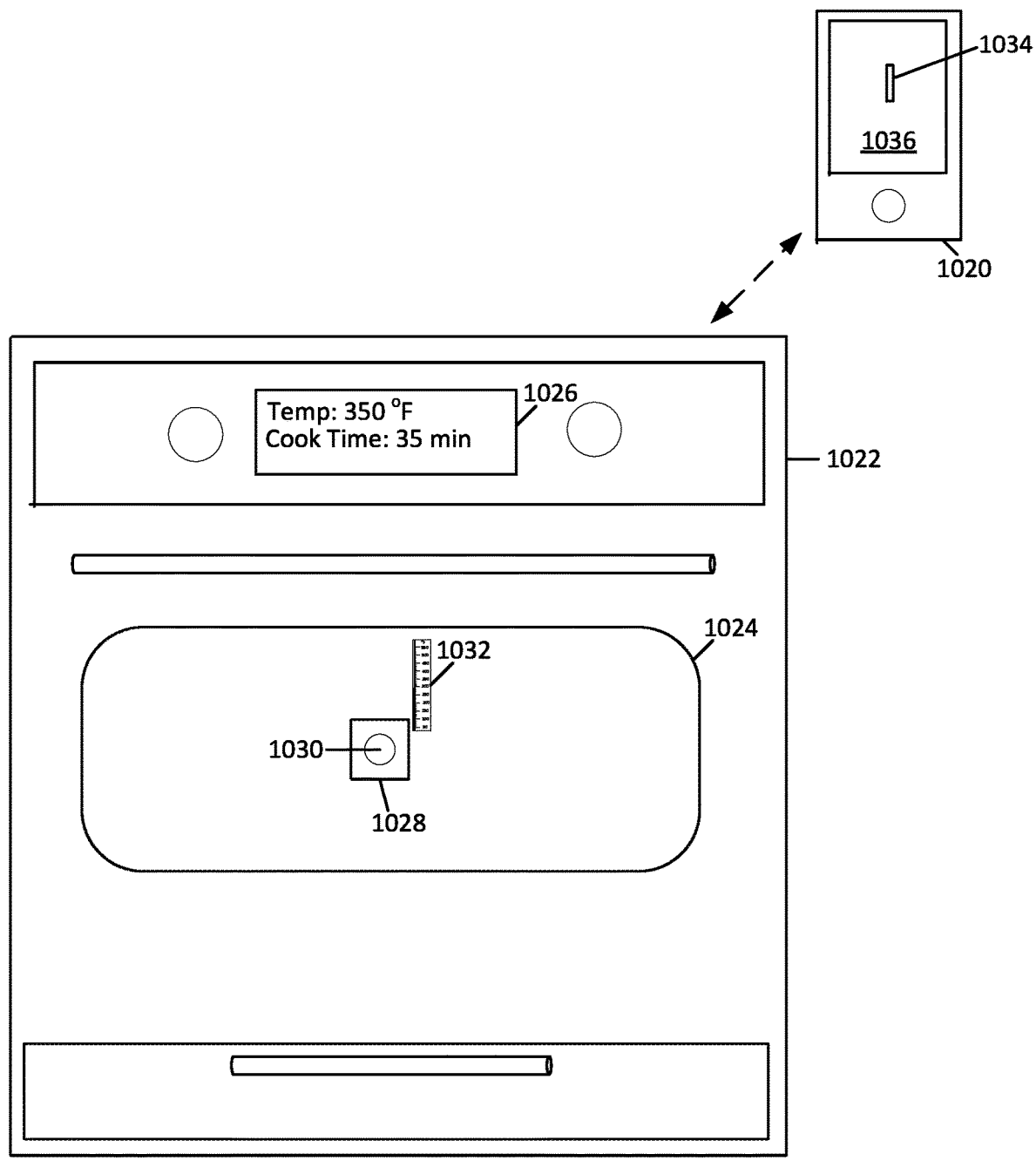

FIGS. 10A and 10B illustrates another example embodiment of a system for monitoring cooking. FIG. 10A illustrates yet another example embodiment of a system for monitoring cooking. The system 1000 may contain a cooking device 1002. The cooking device 1002 is a "smart" oven and it may comprise a built-in temperature sensor 1006, an oven window 1004, and a built-in imaging device 1008. When a cooking device 1002 is "smart" it can be programmed to perform some automatic tasks without manual user instruction or user interference. Smart cooking devices may also be controlled remotely as further discussed below. For example, a smart cooking device may automatically adjust cooking times, temperature, or pressure when cooking or baking. In another example, a smart cooking device may automatically obtain images or videos of the items being cooked. In other words, a smart cooking device may perform functions either automatically or instructions may be remotely transmitted to the smart cooking device.

The cooking device 1002 may control and command the imaging device 1008 to acquire still images or video of the item being cooked. The cooking device 1002 may then send the acquired images to a remote device 1020 for a viewing of the cooking progress. The cooking device 1002 can have a built-in temperature sensor 1006. The cooking device 1002 can automatically make adjustments to ensure an ideal temperature is being provided to cook the item to a desirable state. The cooking device 1002 can repeat this process until cooking completion has been reached.

The cooking device 1002 can transmit cooking information, such as temperature data and images to a remote device. The cooking device 1002 can store recipes or pre-determined cooking instructions and automatically adjust cooking temperature and cooking time according to the pre-determined instructions.

The cooking device 1002 may have a viewing window 1004, which can be made from any heat resistant and translucent material, such as glass, plastic, or any other similar material.

The cooking device 1002 may have a display or control panel designed to adjust temperature and cooking time. In one embodiment, the display may be a touch screen display to permit adjusting temperature and cooking time by touching the display screen viewed via a graphical user interface. In another embodiment, the control panel may have knobs or buttons (i.e. an up and down arrow button, on and off button, and the like) that may be used to adjust temperature and cooking time. The temperature and cooking time may then be displayed on a display, such as an LED display or any other type of display. In still another embodiment, the display may present images and/or videos of the item being cooked within the cooking device 1002. The images and/or videos may be obtained from the imaging device 1008.

The cooking device 1002 may have a temperature sensor 1006 built inside. The temperature sensor 1006 may be configured to monitor the temperature of the item being cooked or baked inside the cooking device 1002. The temperature sensor 1006 can be any device capable of obtaining temperature, such as a thermometer, memory metal, infrared sensor, or any other similar device. The temperature sensor may be positioned on the cooking device 1002, in the item being cooked or baked, or on a substrate containing the item being cooked or baked.

The cooking device 1002 may include the imaging device 1008 (e.g. a camera, camcorder, or any other similar device capable of taking images and/or video) capable of obtaining images or videos of the items inside the cooking device 1002. In one embodiment, the cooking device 1002 may obtain the image and/or video via the imaging device 1008 periodically and/or over a predetermined period of time. For example, the imaging device 1008 may acquire the images or video every two (2), five (5), or ten (10) minutes. In another example, the imaging device 1008 may acquire the images or video every ten (10), fifteen (15), thirty (30), or forty-five (45) seconds. In another embodiment, the desired time periods may be set. For example, cooking device 1002 may be set to obtain the images or video every one (1), five (5), or ten (10) minutes. The time periods may be selected or changed via the graphical user interface on the display or control panel of the cooking device 1002. A user may choose from a list of preprogrammed time increments or choose to self-program time increments. For example, the user may manually choose a preprogrammed setting to acquire the images or video every two (2), five (5), or ten (10) minutes. In another embodiment, the remote device may be used to remotely set or change the time periods.

The cooking device 1002 may obtain the images and/or video, in set time increments, for a predetermined period of time during the cooking time. For example, if the cooking time is forty-five (45) minutes, the imaging device 1008 may acquire the images and/or video during the entire forty-five (45) minutes. In another embodiment, the imaging device 1008 may begin acquiring the image and/or video in the middle of the cooking time. If the cooking time is one hour, the imaging device 1008 may begin to obtain the image and/or video after thirty (30) minutes of cooking time has passed. In still another embodiment, the imaging device 1008 may begin to acquire the image and/or video in the last ten (10) or fifteen (15) minutes of cooking time. Regardless of when the imaging device 1008 begins the imaging time period, the imaging device 1008 may obtain the images periodically (e.g. as discussed above, such as every five (5) minutes, thirty (30) seconds, etc.) during the predetermined period of time. In one embodiment, the imaging time period may be selected on the graphical user interface on the display or control panel of the cooking device 1002. In another embodiment, the imaging time period may be remotely selected using the remote device.

FIG. 10B illustrates a similar oven as disclosed in FIG. 10A in communication with a remote device 1020. The cooking device 1022 may comprise a display 1026, a temperature sensor 1032, an image device 1028 with a protective lens cover 1030, and an oven window 1024. The protective lens cover 1030 may be detachable, removable for cleaning purposes, and made of any clear heat resistant material. The remote device may comprise a screen 1036 with a touch screen option 1034. The cooking device 1022 may communicate with and receive information from other electronic devices. In this embodiment, the cooking device 1022 can communicate wirelessly with the remote device 1020. The cooking device 1022 can transmit cooking information, such as temperature data, pressure data, images, alerts/messages, or additional information to the remote device 1020. The remote device 1020 can be used to select or adjust cooking temperature and cooking time after the transmitted cooking information is viewed. The cooking device 1002 can receive commands transmitted by the remote device 1020 to adjust cooking temperature and cooking time.

Stored images/video of items being cooked inside the cooking device 1022 may be transmitted via wired or wireless means to remote device 1020 for remote monitoring of the items being cooked. For example, the cooking device 1022 may be configured to communicate with remote device 1022 via any known wired means. The cooking device 1002 may communicate wireless with remote device 1020 via any known wireless means such as Bluetooth, Wi-Fi, WAN, or any other similar wireless communication methods. The remote device 1020 can be any portable or non-portable computing device such as a cellular phone, tablet, computer, media device, netbook, laptop, or any other similar electronic device. The remote device 1020 may have a display to present or display the stored images and/or video. The cooking device 1022 may also transmit cooking data to remote device 1020 for display. The cooking data may be any information such as temperature data, pressure data, images, videos, alerts, messages, or any other desired information.

In one embodiment, the user may manually monitor the items being cooked within the cooking device 1022 via the images/video transmitted from the cooking device 1022 to the remote device 1020. For example, if the image and/or video displayed on the remote device 1020 shows the item having a dark or black color, it will be known that the item being cooked or baked is overcooked or burned. In another example, if the image and/or video displayed on the remote device 1020 shows the item being as not having risen (e.g. a cake or bread), it will be known that the item being cooked or baked is not completely cooked. In another embodiment, the remote device 1020 will include the temperature inside the cooking device 1022 as measured by the temperature sensor 1032. Thus, the temperature of the item can be monitored within the cooking device 1022. For example, if the optimal cooking temperature is 350° F., yet the temperature sensor 1032 measures a temperature of 400° F., this will alert the temperature of the "smart" cooked device 1022 needs to be lowered and then the cooking device 1022 can cause the temperature to be lower. The cooking device 1022 can communicate this information to the remote device 1020.

The images and/or videos may also be automatically monitored by the cooking device 1002. For example, the cooking device 1002 may determine that the item being cooked is overcooked, completely cooked, and ready to be removed, burned, or undercooked based upon the color hue, colorfulness, chroma, saturation, lightness, or brightness obtained from the images and/or video. In one embodiment, if the cooking device 1022 determines that the item being cooked is burned, the cooking device 1002 may transmit an audio message or notification "The food is burning!" via the speaker/microphone. Simultaneously or alternatively, the cooking device 1022 may transmit a "The food is burning!" notification or message to the remote device 1020 to be presented on the display 1036 of the remote device 1020 and/or to be audio output by the remote device 1020.

The cooking device 1022 may also determine that the cooking temperature is not at the optimal cooking temperature based upon the temperature sensor 1032 readings. For example, the temperature sensor 1032 after thirty (30) minutes of cooking time may be at 300° F., when it should be at 400° F. In one embodiment, the cooking device 1022 may transmit an audio message or notification "The temperature is low!" via the speaker/microphone. Simultaneously or in the alternative, the cooking device 1002 may transmit a "The temperature is low!" notification or message to the remote device 1020 to be presented on the display 1036 of the remote device 1020.

A user can use their remote device 1020 to select or adjust cooking temperature and cooking time after the user views the transmitted cooking information. The cooking device 1022 can then receive commands transmitted by the remote device 1020 to adjust cooking temperature and cooking time. For example, the cooking device 1022 can store recipes or pre-determined cooking instructions and automatically adjust cooking temperature and cooking time according to the pre-determined instructions. In another example, the user may adjust cooking temperature and cooking time by using a touch screen 1034 on the remote device, by pressing numbers on the key pad, or by sending an audio command to a voice recognition system in the cooking device 1022. This way, the user can change the cooking time and temperature without even being in the kitchen or even at their home, apartment, or place of living.

Although illustrated with the use of one cooking device 1002, this is not intended to be limiting as any number of cooking devices may be used. As such, each cooking device may be configured to communicate with at least one remote device. For example, a restaurant chef may choose to have a plurality of cooking devices activated at the same time. Each of the cooking devices may be configured to communicate with at least one remote device 1020.

Figure 11:
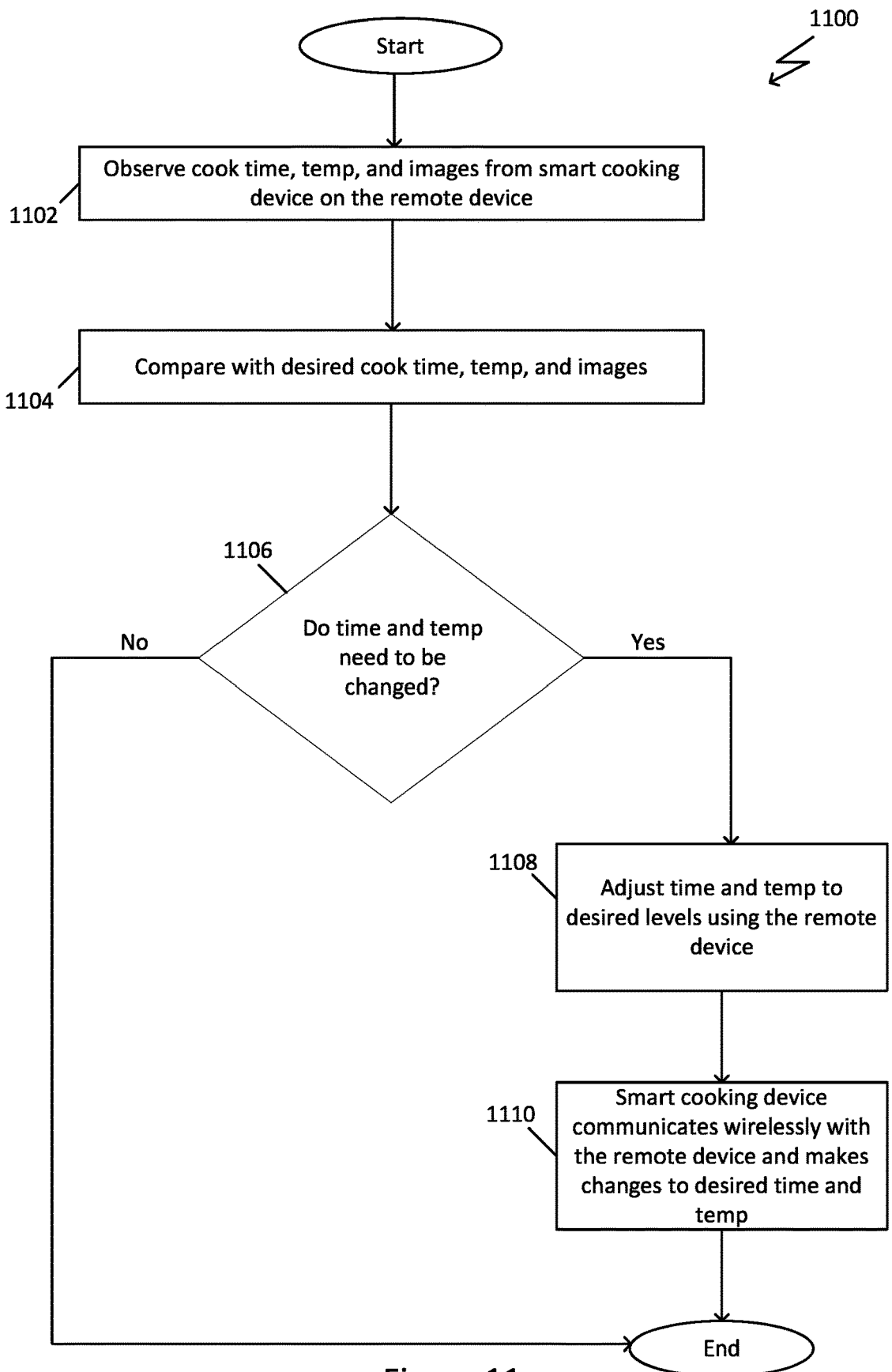
FIG. 11 illustrates an example embodiment of a method for monitoring cooking.

FIG. 11 illustrates an example embodiment of a method for monitoring cooking. The method 1100 can begin by observing the images and/or video of an item being cooked inside a cooking device and cooking time and temperature on the remote device at 1102. The remote device can be any portable or non-portable computing device such as a cellular phone, tablet, computer, media device, netbook, laptop, or any other similar electronic device. The remote device may have a display to present or display the stored images and/or video. This may allow for remote monitoring of items within the cooking device as the items are being cooked or baked. As such, it is not necessary to be physically near the cooking device to constantly monitor the item inside the cooking device to prevent being overcooked or burned. For example, a user can be watching TV, taking a bath, working outside, shopping, or any other similar activities while monitoring the cooking information on their remote device. In the method 1100, the cooking device can be a "smart" cooking device which communicates with the remote device.

At 1104, the cooking information displayed on the remote device may be compared with the desired cooking information. For example, the images or video of the item being cooked at a certain time may be viewed on the remote device and compared with what the item being cooked typically looks like at that certain time. In another example, the temperature inside of the cooking device may be viewed on the remote electronic device and compared with the desired temperature used when cooking that item at that point in time. In another example, the cooking time remaining for the item being cooked may be compared with the desired amount of cooking time remaining at that point in time when cooking that item.

After the cooking information is compared, then it may be determined whether the cooking time and/or cooking temperature need to be changed at 1106. If it does not need to be changed, then the method may end. If it does need to be changed, then at 1108, the cooking temperature and/or cooking time may be changed to their desired levels using the remote device. For example, if the images or video of the item being cooked appear undercooked for that point in time, the cooking temperature may be raised and/or cooking time may be lengthened using the remote device. The cooking temperature and time may be changed using a touch screen display on the remote device. The tough screen may contain buttons to press to raise and lower temperature and/or time. In another example, the remote device may receive audio messages and make the changes according to that audio message. A user may say "raise the temperature to 400 degrees" and the remote device will cause the temperature to be raised to that temperature. In yet another example, a user can turn off the cooking device via the remote device if they receive an alert the food is burning. This may provide a piece of mind when cooking such that the item being cooked will not burn and potentially start a fire if the user is away from the cooking device.

After the changes are made to the remote device, the cooking device may communicate wirelessly with the cooking device and made the changes to the desired cooking time and temperature at the cooking device that were made on the remote device at 1110. The cooking device may communicate wirelessly with the remote device using a wireless transceiver located within the cooking device. The cooking device may communicate wirelessly with remote device via any known wireless means such as Bluetooth, Wi-Fi, WAN, or any other similar wireless communication methods. This may allow changing the temperature and time when not being physically near the cooking device. For example, a user can be watching TV, taking a bath, working outside, shopping, or any other similar activities while changing the cooking time and temperature on their remote device.

Figure 12A:
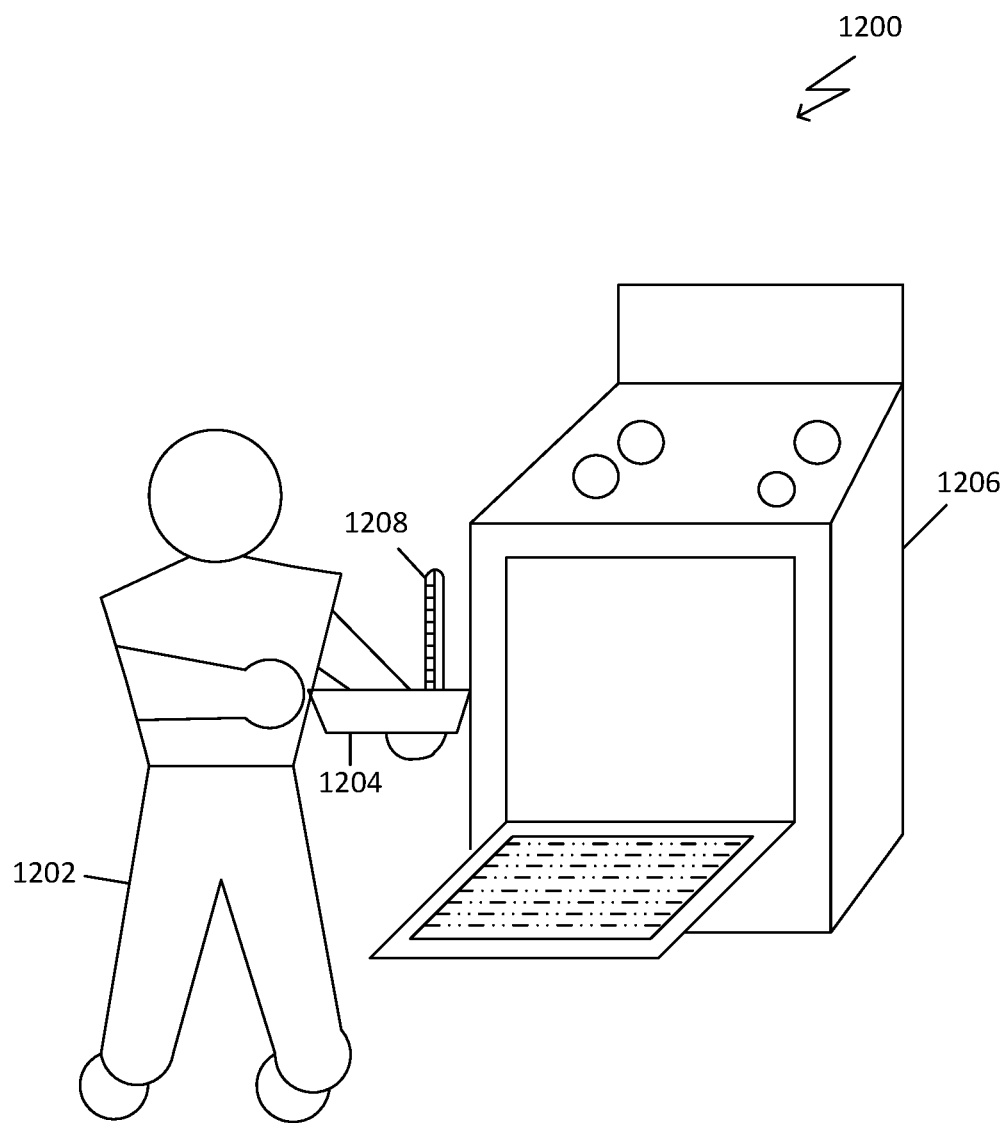
FIGS. 12A and 12B illustrate an example for monitoring cooking.
Figure 12B:
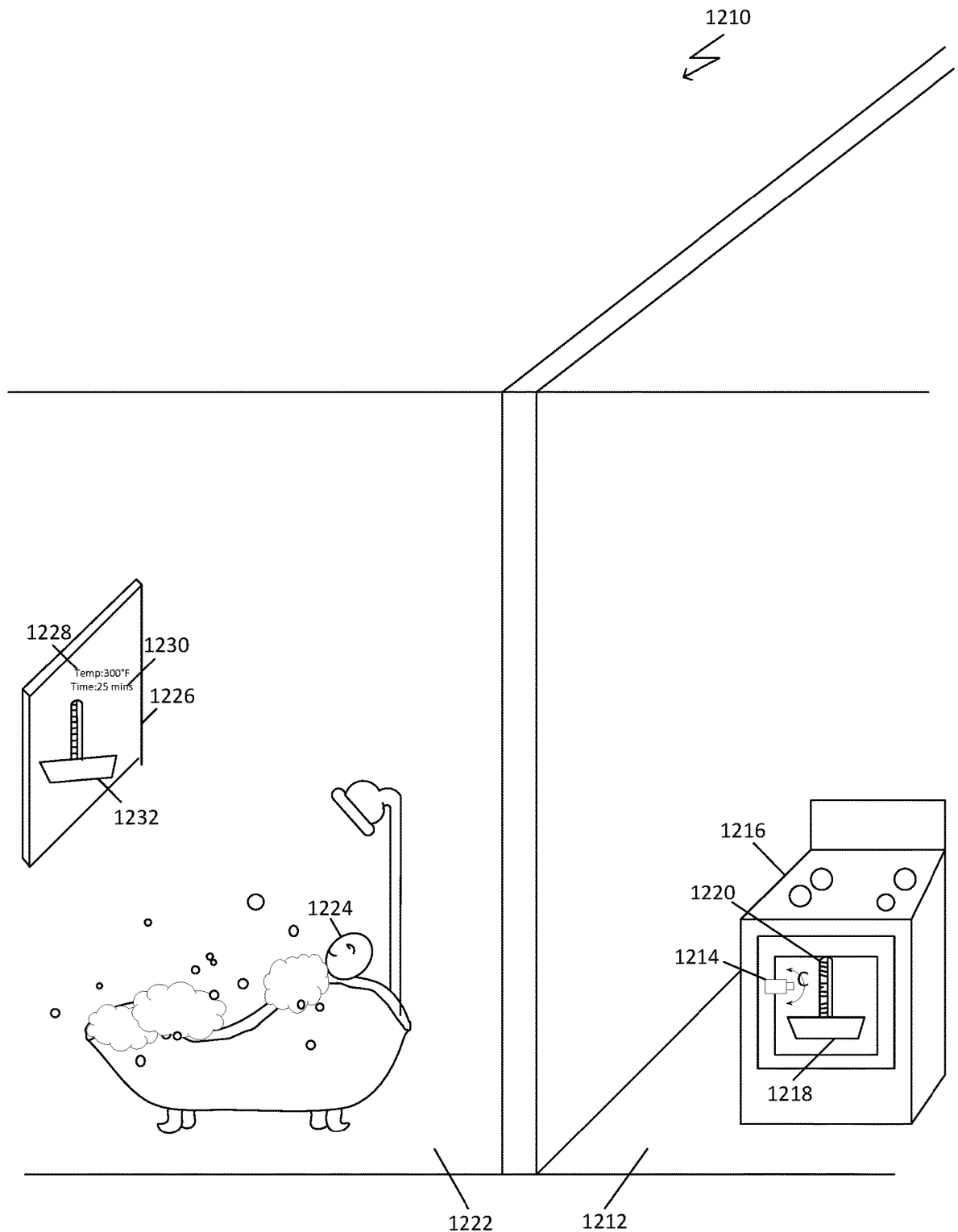

FIGS. 12A and 12B illustrate an example for monitoring cooking. FIG. 12A at 1200 shows a person 1202 placing an item 1204 inside the cooking device 1206. The item 1204 to be cooked or baked may be placed on or in the cooking device 1206, which in this example is an oven. The item 1204 that may be cooked or baked may include foods such as cakes, lasagna, chicken, seafood, meats, vegetables, and any other foods. The cooking device 1206 can also cook or bake non-food items such as clay, plastic (e.g. shrink plastic), crayons, other arts and craft materials, and the like. The item 1204 may be cooked within the cooking device 1206 (e.g. oven) or on top of the cooking device 1206 (e.g. stovetop).

FIG. 12A also shows the person 1202 placing a temperature sensor 1208 in the cooking device. The temperature sensor 1208 may be configured to monitor the temperature of the item 1204 being cooked or baked inside the cooking device 1206. The temperature sensor 1208 can be any device capable of obtaining temperature, such as a thermometer, memory metal, infrared sensor, or any other similar device. The temperature sensor 1208 may be positioned on the cooking device 1206, within the item 1204 being cooked or baked, or on a substrate containing the item 1204 being cooked or baked.

FIG. 12B at 1210 shows an image acquisition device (IAD) 1214 mounted to the window of a cooking device 1216 located in a kitchen 1212. The IAD 1214 may be removably attached on the cooking device 1216 using mounting elements. The mounting elements may be at least one suction cup, adhesive, magnets, hook and loop fasteners, screws, nails, or other similar attachment means. This allows for remote monitoring of item 1218 being cooked or baked. As such, a user does not need to be physically near the cooking device to constantly monitor the item 1218 on or inside the cooking device 1216 to prevent being overcooked, undercooked, or burned. In all embodiments, the temperature sensor 1220 may also be monitored by the IAD 1214.

Additionally, FIG. 12B shows a person 1224 in a bathroom 1222 watching on a remote device 1226 the images and/or a video of the item 1218 being cooked inside the cooking device 1216 by the IAD 1214. The IAD 1214 may include an imaging device (e.g. a camera, camcorder, or any other similar device capable of taking images and/or video) capable of obtaining images or videos of the items inside or on the cooking device. Each image or video may also include an image or video of the temperature sensor 1220. In one embodiment, the IAD 1214 may obtain the image and/or video via the imaging device periodically and/or over a predetermined period of time. For example, the IAD 1214 may acquire the images or video every two (2), five (5), or ten (10) minutes. In another example, the IAD 1214 may acquire the images or video every ten (10), fifteen (15), thirty (30), or forty-five (45) seconds. In another embodiment, a person 1224 may set the desired time periods. For example, the person 1224 may set the IAD 1214 to obtain the images or video every one (1), five (5), or ten (10) minutes. The time periods may be selected or changed via the graphical user interface on the display or control panel of the cooking device 1216. In another embodiment, the person 1224 may remotely set or change the time periods using the remote device 1226.

The IAD 1214 may obtain the images and/or video for a predetermined period of time during the cooking time of the item within the cooking device 1216. For example, if the cooking time is forty-five (45) minutes, the IAD 1214 may acquire the images and/or video during the entire forty-five (45) minutes. In another embodiment, the IAD 1214 may begin acquiring the image and/or video in the middle of the cooking time. If the cooking time is one hour, the IAD 1214 may begin to obtain the image and/or video after thirty (30) minutes of cooking time has passed. In still another embodiment, the IAD 1214 may begin to acquire the image and/or video in the last ten (10) or fifteen (15) minutes of cooking time. Regardless of when the IAD 1214 begins the imaging time period, the IAD 1214 may obtain the images periodically (e.g. as discussed above, such as every five (5) minutes, thirty (30) seconds, etc.) during the predetermined period of time. In one embodiment, the imaging time period may be selected on the IAD 1214. In another embodiment, the imaging time period may be remotely selected using the remote device 1226.

The image(s) or video 1232 can conveniently be viewed on the remote device 1226 to allow the person 1224 to view the item 1218 being cooked or baked. This allows for remote monitoring of items within the cooking device 1216 as the item 1218 is being cooked or baked. As such, the person 1224 does not need to be physically near the cooking device 1216 to constantly monitor the item 1218 inside the cooking device to prevent being overcooked, undercooked, or burned. In this example, the person 1224 is viewing the item being cooked inside the cooking device 1216 and the temperature of the item 1218 being cooked. If the image and/or video displayed on the remote device 1226 shows the item having a dark or black color, the person 1224 will know that the item 1218 being cooked or baked is overcooked or burned. Thus, the person 1224 is able to monitor the temperature of the item within the cooking device 1216. For example, if the optimal cooking temperature is 350° F., yet the image and/or video illustrates the temperature sensor 1220 having a temperature of 400° F., this will alert the user that the temperature of the cooking device 1216 needs to be lowered.

The remote device 1226 may also display the temperature 1228 and cooking time remaining 1230. This may allow the person 1224 to further monitor and make changes to the temperature and cooking time of the item 1218 being cooked based on the typical temperature and cooking times used to cook that particular item.

Figure 13A:
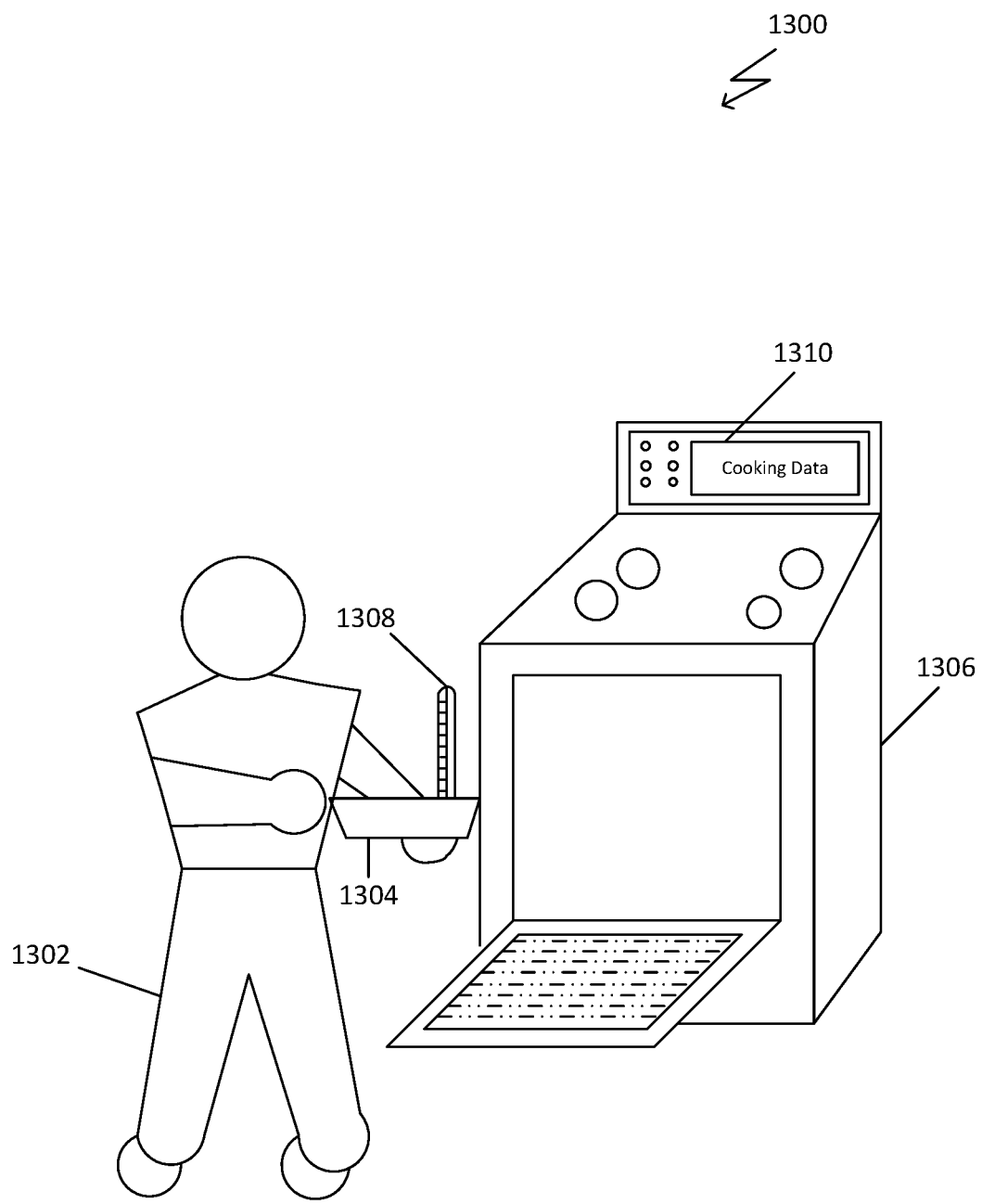
FIGS. 13A-13D illustrate another example for monitoring cooking.

FIGS. 13A-13D illustrate another example for monitoring cooking. In this example, the cooking device may be a "smart" cooking device. FIG. 13A at 1300 shows a person 1302 placing a cake 1304 inside the cooking device 1306. The cake 1304 being baked may be placed inside the cooking device 1306.

FIG. 13A also shows the person 1302 placing a temperature sensor 1308 inside a cooking device 1306. The temperature sensor 1308 may be configured to monitor the temperature of a cake 1304 being baked inside the cooking device 1306. The temperature sensor 1308 can be any device capable of obtaining temperature, such as a thermometer, memory metal, infrared sensor, or any other similar device. The temperature sensor 1308 may be positioned on the cooking device, within the cake 1304 being cooked or baked, or on a substrate containing the cake 1304 being baked.

FIG. 13A also shows a display 1310 on the cooking device 1306. The display 310 may display cooking data. The cooking data may be any information such as temperature data, pressure data, images, videos, alerts, messages, or any other desired information. The display 1310 may also display alerts when an item is done cooking or is burning.

Figure 13B:
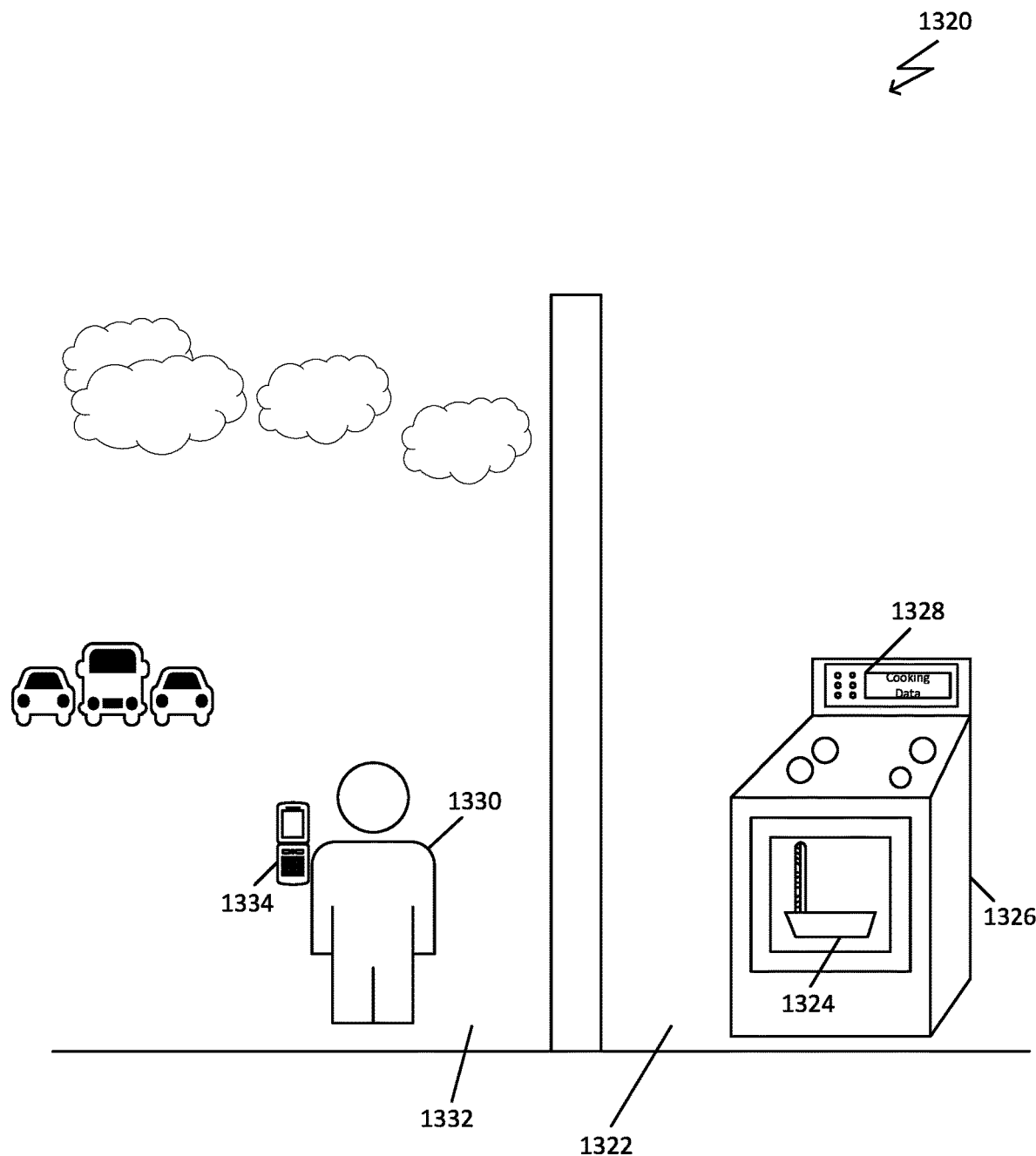

FIG. 13B at 1320 shows a cake 1324 cooking inside a cooking device 1326 located at a kitchen 1322. The FIG. 13B also shows the cooking device 1326 displaying cooking information on its display 1328. Additionally, FIG. 13B shows a person 1330 outside a home at 1332 viewing the cooking information on a remote device 1334. In this example, the images are transferred to a remote device 1334 via any known wired or wireless means. The cooking device may have a wireless transceiver (not shown) configured to wirelessly transmit data to remote electronic device. The cooking device 1326 may communicate wirelessly with remote device 1334 via any known wireless means such as Bluetooth, Wi-Fi, WAN, or any other similar wireless communication methods.

The cooking information may be viewed on the remote device 1334 to allow the person 1330 to view the cake 1324 being baked. This allows for remote monitoring of the cake 1324 being baked within the cooking device 1326. As such, it is not necessary for the person 1330 to be physically near the cooking device 1326 to constantly monitor the cake 1324 being baked. For example, if the image and/or video displayed on the remote device 1334 may show the cake 1324 having a dark or black color, it will be known that the cake 1324 baked is overcooked or burned. In another example, the image and/or video displayed on the remote device 1334 may show the cake 1324 as not having risen, therefore it will be known that the cake 1324 being baked is not completely cooked.

Figure 13C:
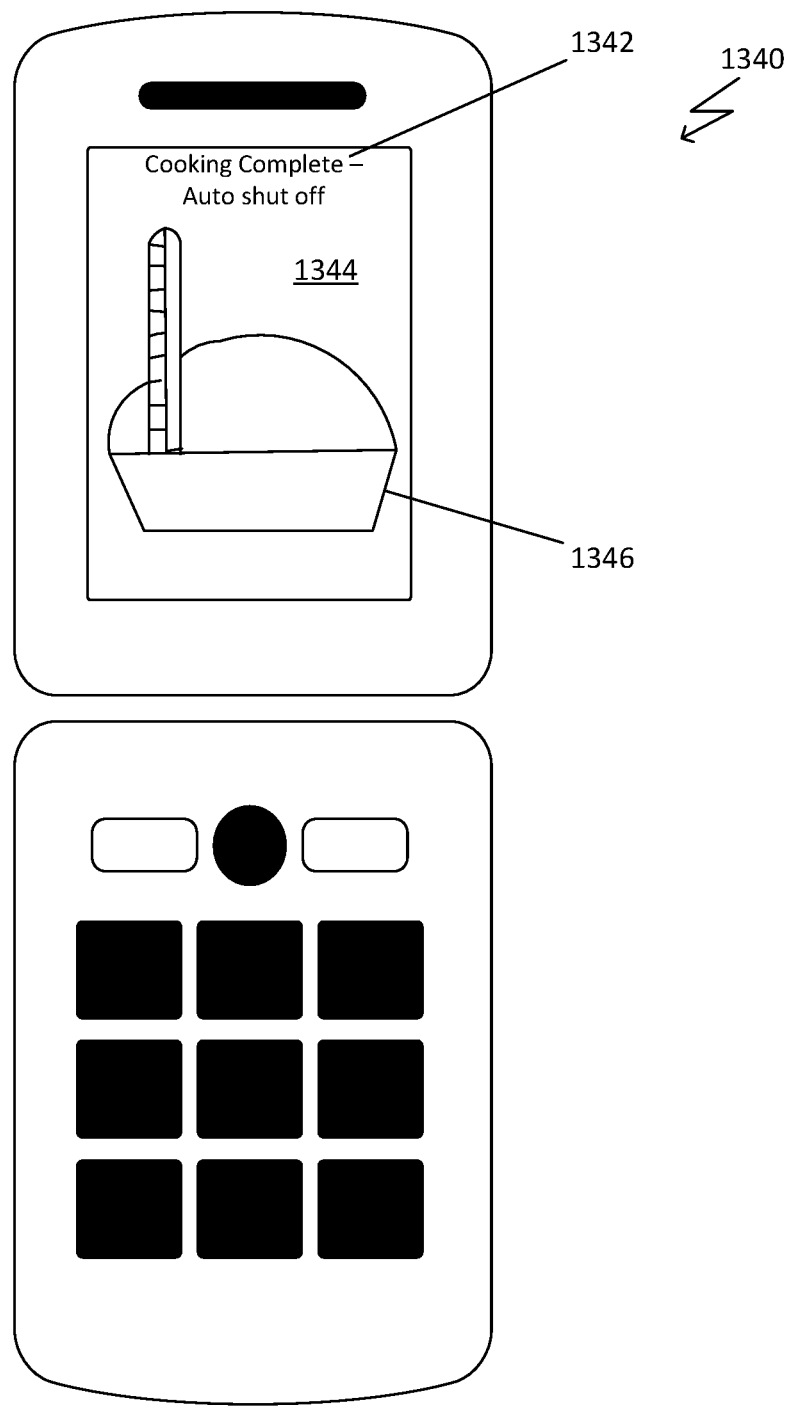

FIG. 13C shows a remote device 1340 displaying cooking information 1342 indicating a message "cooking complete" and "auto shut off" to show the cooking device is being automatically shut off. This may notify the person using the remote device the cake is completed baked and is ready to be removed from the cooking device. As shown in FIG. 13C, the remote device 1340 shows, on a display 1344, a cake 1346 which has risen. When a cake 1346 has risen, it is typically completed cooked. Thus, the person can then know the cake is finished baking and to remove it from the cooking device when returning home.

Figure 13D:
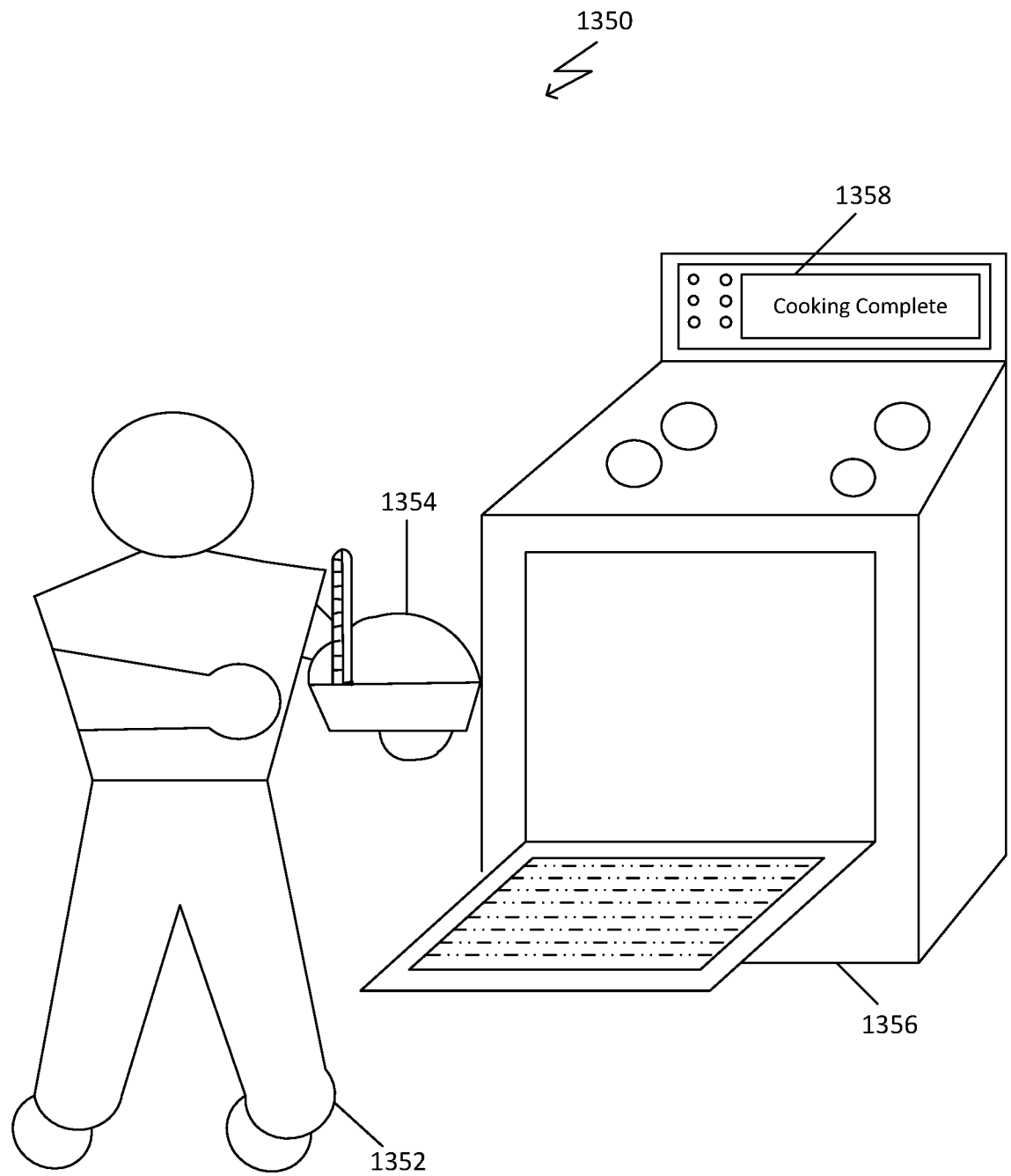

FIG. 13D at 1350 shows a person 1352 returning home and removing a completely cooled cake 1354 from a cooking device 1356. The cooking information indicated on a display 1358 of the cooking device 1356 states the message "cooking compete" which mirrors the message shown on the remote device from FIG. 13C.

Figure 14A:
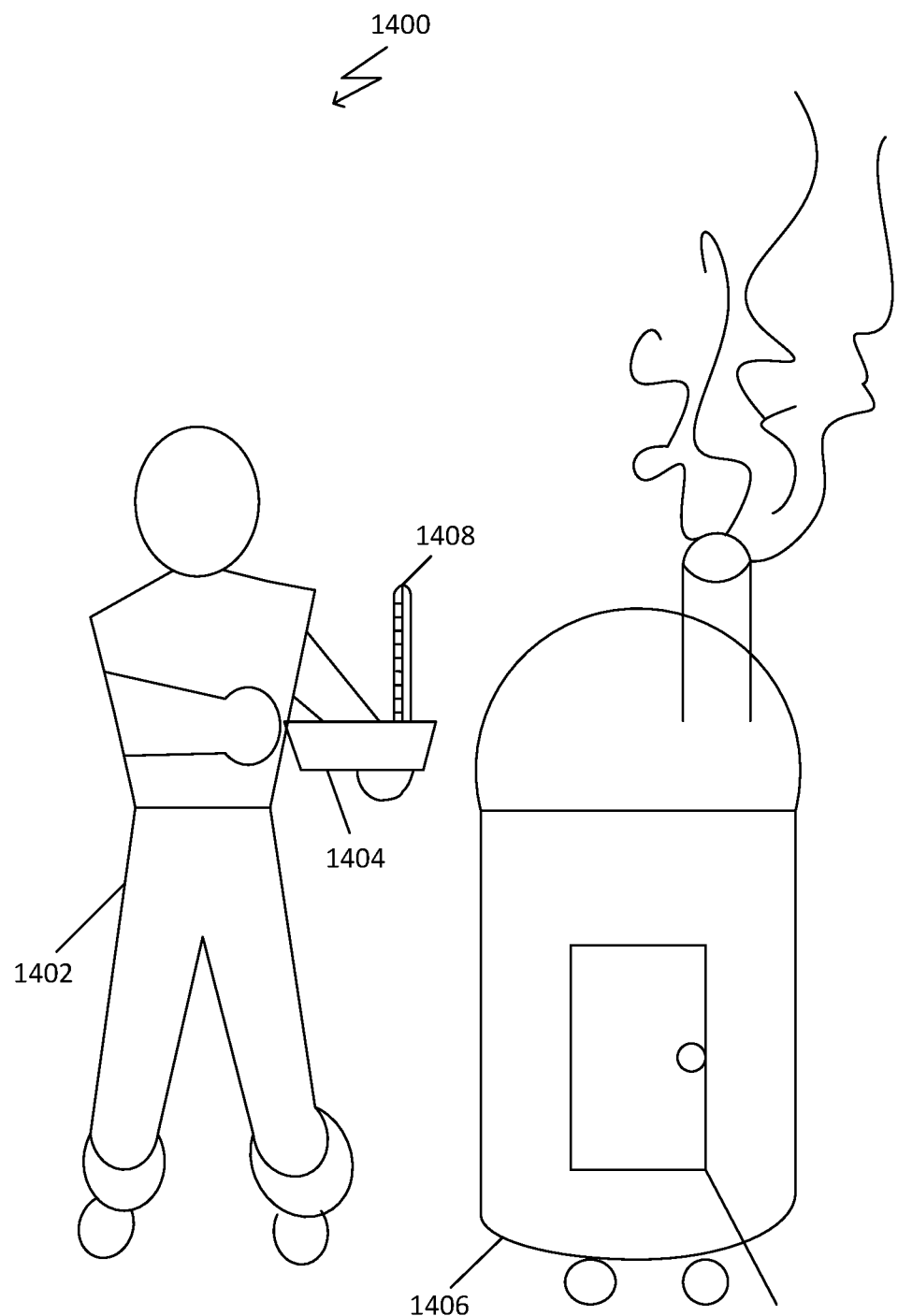
FIGS. 14A-14C illustrate still another example for monitoring cooking.
Figure 14B:
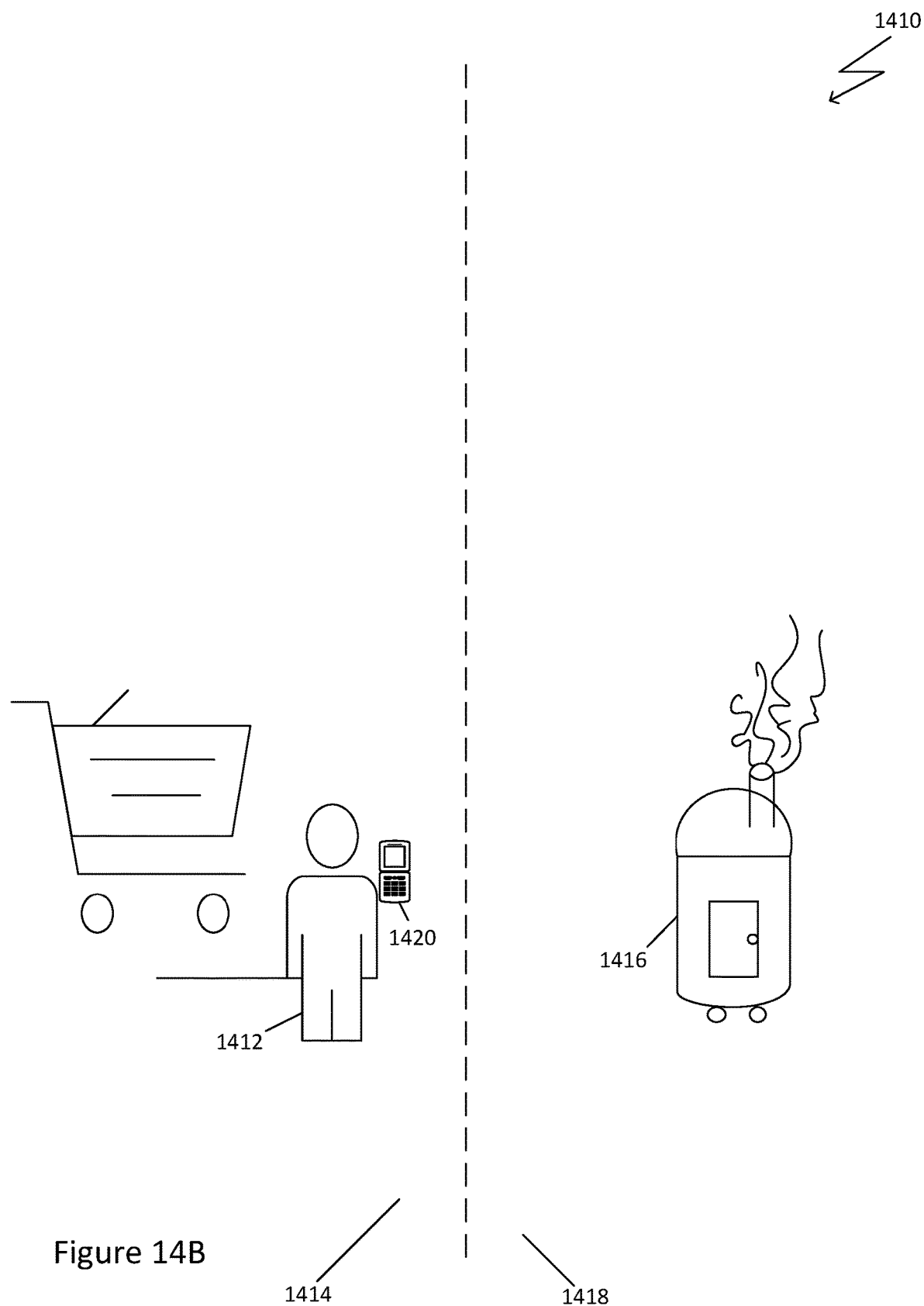
Figure 14C:
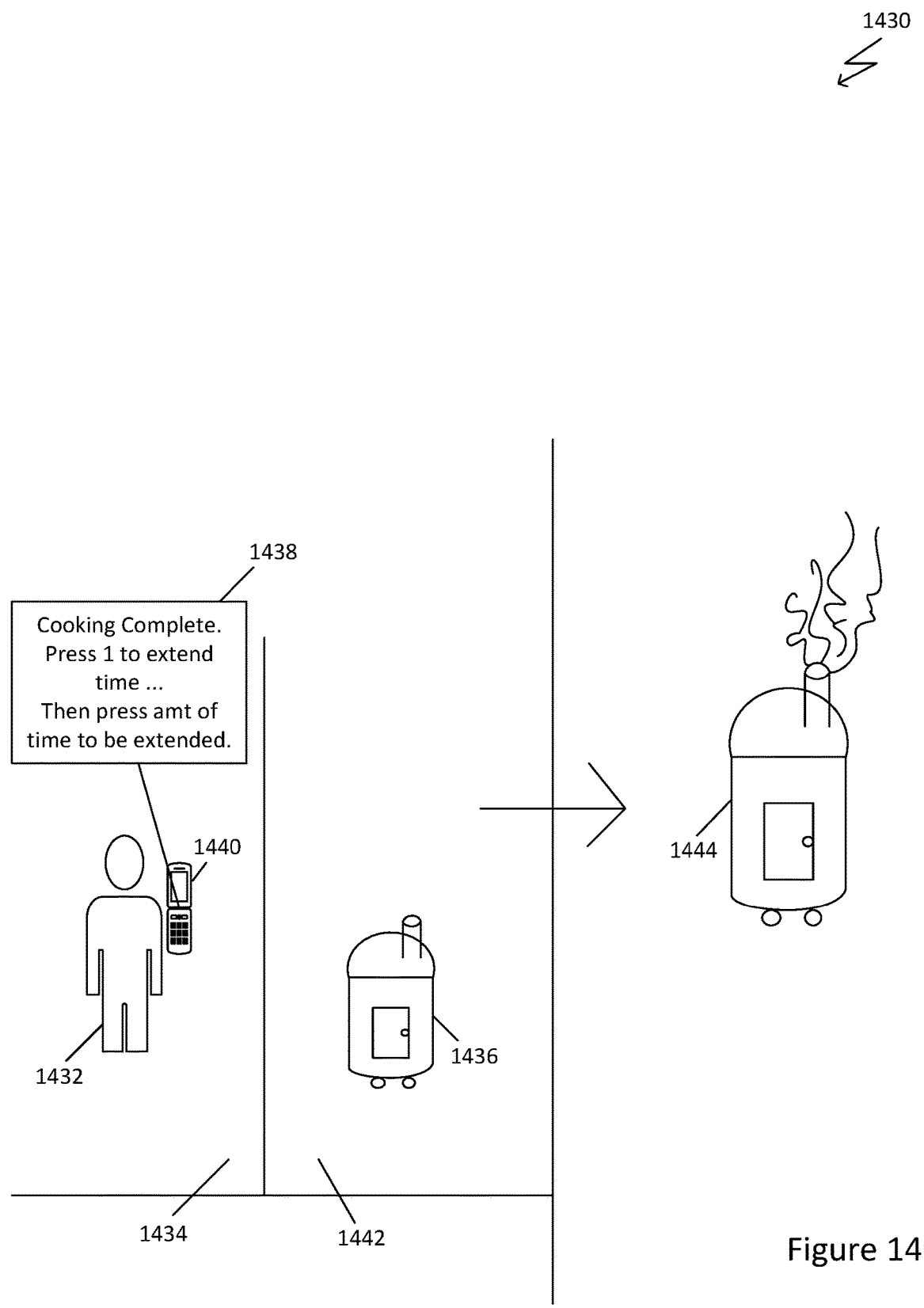

FIGS. 14A-14C illustrate still another example for monitoring cooking. FIG. 14A at 1400 illustrates a person 1402 placing an item 1404 to be cooked into a cooking device 1406. In this example, the cooking device 1406 is a "smart" smoker. The cooking device 1406 may comprise a built-in temperature sensor and a built-in imaging device (all not shown). When a cooking device is "smart," it can be programmed to perform some automatic tasks without manual user instruction or user interference. Smart cooking devices may also be controlled remotely as further discussed below. For example, a smart cooking device may automatically adjust cooking times, temperature, or pressure when cooking or baking. In another example, a smart cooking device may automatically obtain images or videos of the items being cooked. In other words, a smart cooking device may perform functions either automatically or instructions may be remotely transmitted to the smart cooking device. In this example a temperature sensor 1408 (i.e. thermometer) is also being placed into the cooking device 1406; the temperature sensor 1408 will be used to measure the temperature of the item 1406 being cooked.

The cooking device 1406 also may have a temperature sensor built inside (not shown). The temperature sensor may be configured to monitor the temperature of the item being cooked or baked inside the cooking device 1406. The temperature sensor can be any device capable of obtaining temperature, such as a thermometer, memory metal, infrared sensor, or any other similar device. The temperature sensor may be positioned on the cooking device 1406, in the item being cooked or baked, or on a substrate containing the item being cooked or baked.

The cooking device 1406 may include an imaging device (e.g. a camera, camcorder, or any other similar device capable of taking images and/or video) capable of obtaining images or videos of the items inside the cooking device (not shown). In one embodiment, the cooking device 1406 may obtain the image and/or video via the imaging device periodically and/or over a predetermined period of time. For example, the imaging device may acquire the images or video every two (2), five (5), or ten (10) minutes. In another example, the imaging device may acquire the images or video every ten (10), fifteen (15), thirty (30), or forty-five (45) seconds. In another embodiment, the desired time periods may be set. For example, cooking device 1406 may be set to obtain the images or video every one (1), five (5), or ten (10) minutes. A user may choose from a list of preprogrammed time increments or choose to self-program time increments. For example, the user may manually choose a preprogrammed setting to acquire the images or video every two (2), five (5), or ten (10) minutes.

The cooking device 1406 may obtain the images and/or video, in set time increments, for a predetermined period of time during the cooking time. For example, if the cooking time is forty-five (45) minutes, the imaging device may acquire the images and/or video during the entire forty-five (45) minutes. In another embodiment, the imaging device may begin acquiring the image and/or video in the middle of the cooking time. If the cooking time is one hour, the imaging device may begin to obtain the image and/or video after thirty (30) minutes of cooking time has passed. In still another embodiment, the imaging device may begin to acquire the image and/or video in the last ten (10) or fifteen (15) minutes of cooking time. Regardless of when the imaging device begins the imaging time period, the imaging device may obtain the images periodically (e.g. as discussed above, such as every five (5) minutes, thirty (30) seconds, etc.) during the predetermined period of time.

FIG. 14B at 1410 illustrates the person 1412 shopping in a store at 1414, while the food is cooking in a "smart" cooking device 1416 at home at 1418. The "smart" cooking device in this figure is a "smart" smoker. The cooking device 1416 may control and command the built in imaging device to acquire still images or video of the item being cooked. The cooking device may then send the acquired images to a remote device 1420 for a viewing of the cooking progress.

The cooking device 1416 can also have a built-in temperature sensor. The cooking device 1416 can automatically make adjustments to ensure an ideal temperature is being provided to cook the item to a desirable state. The cooking device 1416 can repeat this process until cooking completion has been reached.

The person 1412 is remotely monitoring the progress of the food being cooked via his or her remote device 1420; in this figure the remote device 1420 is a cellular phone. The remote device 1420 can be any portable or non-portable computing device such as a cellular phone, tablet, computer, media device, netbook, laptop, or any other similar electronic device. The remote device 1420 may have a display to present or display the stored images and/or video. This may allow for remote monitoring of items within the cooking device 1420 as the items are being cooked or baked. As such, it is not necessary to be physically near the cooking device to constantly monitor the item inside the cooking device to prevent being overcooked or burned. In other examples, a user can be watching TV, taking a bath, working outside, or any other similar activities while monitoring the cooking information on their remote device.

The cooking device 1416 can transmit cooking information, such as temperature data and images to the remote device 1420. The cooking device 1416 and/or the remote device 1420 can store recipes or pre-determined cooking instructions and automatically adjust cooking temperature and cooking time according to the pre-determined instructions.

FIG. 14C at 1430 illustrates a person 1432 still shopping at a store at 1434, while a cooking device 1436 sends a "cooking completion" message 1438 to a person's remote device 1440. The cooking device 1436 shuts off at home at 1442 since the cooking time has expired. But the person 1432 may decide to extend the cooking time by remotely changing the cooking time for the cooking device 1436.

The cooking information displayed on the remote device 1440 may be compared with the desired cooking information. For example, the images or video of the item being cooked at a certain time may be viewed on the remote device 1440 and compared with what the item being cooked typically looks like at that certain time. In another example, the temperature inside of the cooking device may be viewed on the remote device 1440 and compared with the desired temperature used when cooking that item at that point in time. In another example, the cooking time remaining for the item being cooked may be compared with the desired amount of cooking time remaining at that point in time when cooking that item.

After the cooking information is compared, then it may be determined whether the cooking time and/or cooking temperature needs to changed. If necessary, the cooking temperature and/or cooking time may be changed to their desired levels using the remote device 1440. For example, if the images or video of the item being cooked appear undercooked for that point in time, the cooking temperature may be raised and/or cooking time may be lengthened using the remote device 1440. The cooking temperature and time may be changed using a touch screen display (not shown) on the remote device 1430. The touch screen may contain buttons to press to raise and lower temperature and/or time. In another example, the remote device 1440 may receive audio messages and make the changes according to that audio message. A person 1432 may say "raise the temperature to 400 degrees" and the remote device 1440 will cause the temperature to be raised to that temperature. In yet another example, the person 1432 can turn the off the cooking device via the remote device 1440, such as for example if they receive an alert the food is burning. This may provide a piece of mind when cooking such that the item being cooked will not burn and potentially start a fire if the person 1432 is away from the cooking device 1436.

The cooking device 1436 may communicate wirelessly with the remote device 1440 using the wireless transceiver located within the cooking device. The cooking device may communicate wirelessly with remote device via any known wireless means such as Bluetooth, Wi-Fi, WAN, or any other similar wireless communication methods. This may allow changing the temperature and time when not being physically near the cooking device. For example, a user can be watching TV, taking a bath, working outside, shopping, or any other similar activities while changing the cooking time and temperature on their remote device.

In this embodiment, the person 1432 receives a "cooking is complete" message on his remote device 1440, with additional instructions to extend the cooking time if desired. The alert and additional instructions can be via text message, automated audio message, or both. The message on the remote device 1440 shows the option to press a key on the phone to extend the cooking time and to press additional keys to set the length of the extended cooking time. In another embodiment the command to extend the cooking time and set the amount of time to be extended may be given via voice commands. In another example the cooking time may not need to be extended, the cooking device 1436 may automatically shut off as shown at 1444 and the person 1432 can simply remove the food from the cooking device 1436 at their convenience.

Figure 15A:
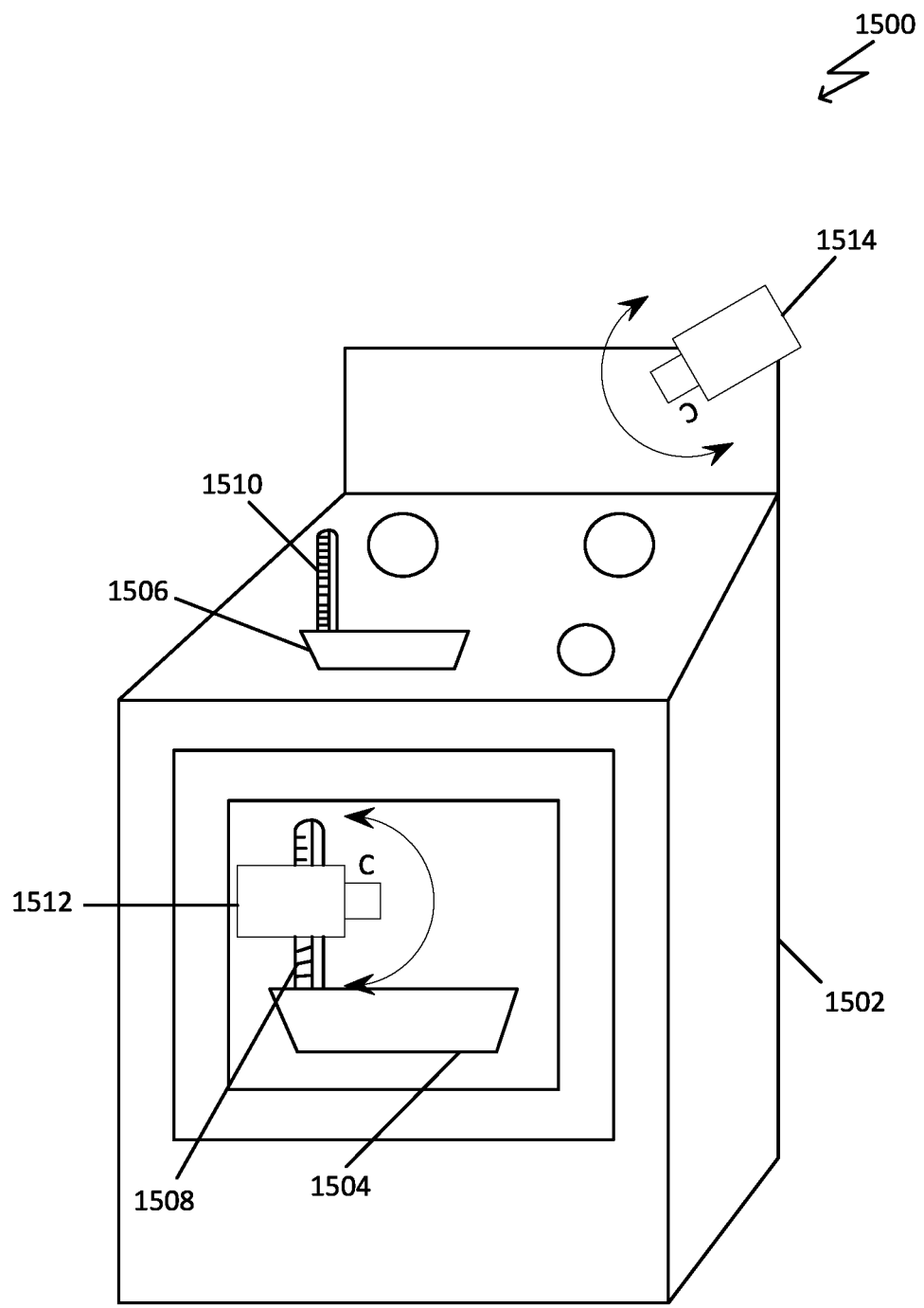
FIGS. 15A and 15B illustrate still yet another example for monitoring cooking.
Figure 15B:
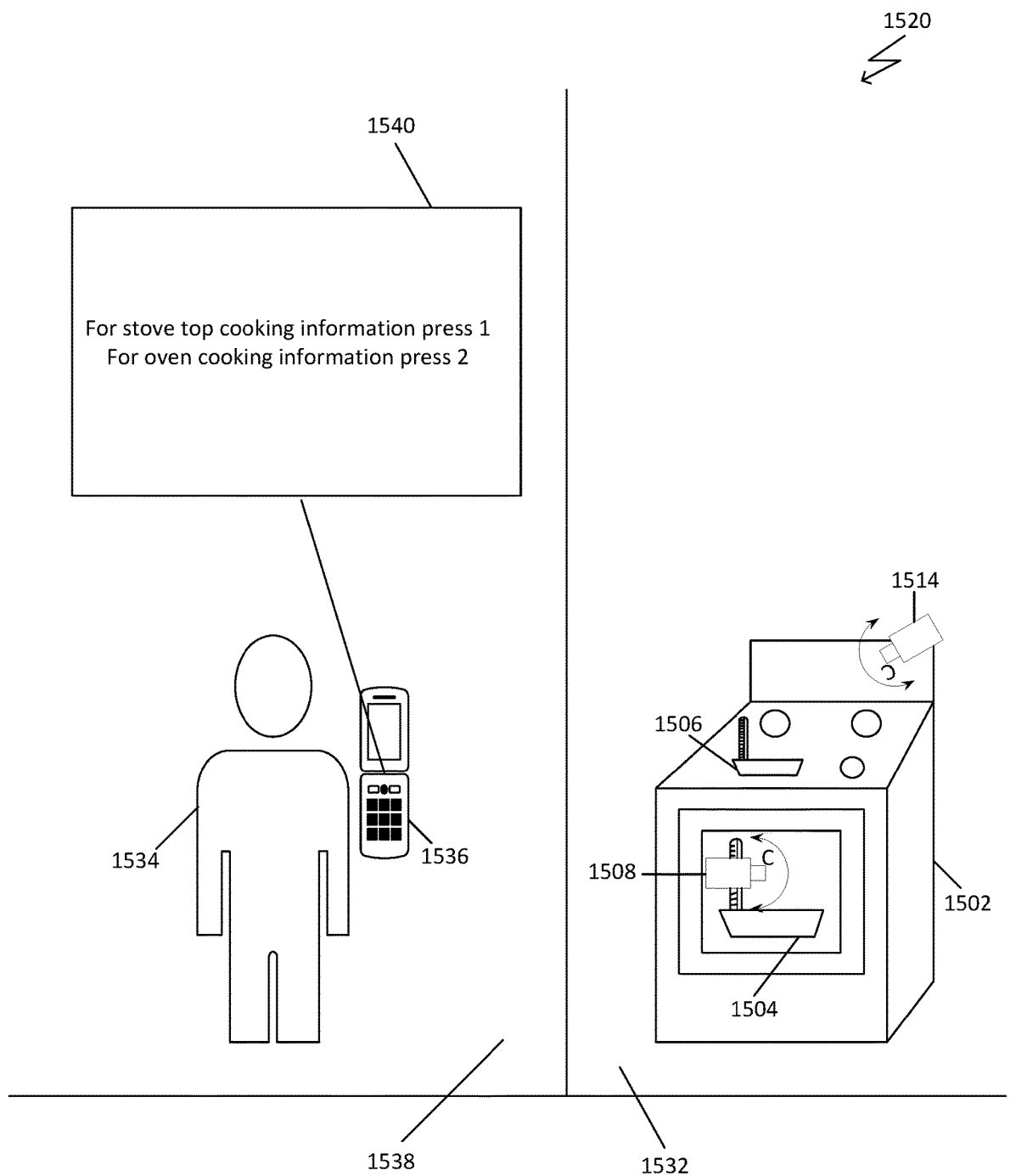

FIGS. 15A and 15B illustrate still yet another example for monitoring cooking. FIG. 15A at 1500 shows a cooking device 1502, which is an oven here. A dish inside the oven contains a first item 1504 being cooked and a dish on top of the oven contains a second item 1506 being cooked. A first temperature sensor 1508 (i.e. thermometer) has been placed into the cooking device 1502 along with the first item 1504 being cooked and a second temperature sensor 1510 (i.e. thermometer) has been placed on top of the cooking device 1502 along with the second item 1506 being cooked. The temperature sensors are being used to measure the temperature of the items being cooked. A first image acquisition device (IAD) 1512 has been set up, attached onto the window of the cooking device 1502, and IAD 1512 is rotatable. A second image acquisition device (IAD) 1514 has been set up, attached to the top of the cooking device 1502, and the IAD 1514 is rotatable. The rotatable IADs are acquiring images of the items being cooked, and they are able to rotate to obtain images from different angles or different areas of the cooking device 1502.

The IADs may contain attachment elements may be any known attachment elements such as suction cups, adhesive, magnets, hook and loop fasteners, or any other similar element capable of mounting the IADs.

The attachment elements may be used to removably mount or attach the IADs to a window of the cooking device. Attaching the IAD to a window of a cooking device may be useful when for example, in this embodiment, the cooking device is an oven with a window. The first IAD 1512 can be attached to the window of the oven and can obtain images/video or information of an item being cooked inside the oven. In this embodiment the cooking device 1502 is an oven also containing a stove on top. The second IAD 1514 is placed on the stove top. The second IAD 1514 may provide images/video or information of an item being cooked on top of the stove. The IADs 1512, 1514 may contain a camera, camcorder, or any other similar device capable of taking images and/or video of the items being cooked.

FIG. 15B at 1520 illustrates a cooking device 1502 contained in FIG. 15A in a kitchen 1532, which contains an oven and a stove. The dish inside the oven contains the first item 1504 being cooked and the dish on top of the oven contains the second item 1506 being cooked. The first IAD 1508 has been set up, attached onto the window of the oven, and the first IAD 1508 is rotatable. A second IAD 1514 has been set up, attached to the top of the oven, and the second IAD 1514 is also rotatable. Meanwhile a person 1534 is monitoring the food being cooked on his remote device 1536 using a remote location 1538. In this example, the remote device 1536 is a cellular phone. A screen on the remote device 1536 shows that the person 1534 may view the cooking information for either or both items being cooked. A plurality of items may be cooked simultaneously and the person 1534 may monitor all at the same time or view one at a time using one remote device 1536. For example, as shown at 1540, the remote device 1536 may contain a choice to press different buttons to view the different images being cooked. Once a choice is made and a number is pressed, the chosen item being cooked appears on the display of the remote device 1536.

Additionally, U.S. Provisional Patent Application No. 62/273,897, entitled "METHOD AND SYSTEM FOR ACQUIRING COOKING INFORMATION," and filed on Dec. 31, 2015, is hereby incorporated herein by reference for all purposes.

The various aspects of the invention can be used separately or in any combination.

The invention can be implemented in hardware, software or a combination of hardware and software. The invention can also be embodied as computer readable code on a computer readable medium. The computer readable medium is any data storage device that can store data which can be thereafter be read by a computer system. Examples of the computer readable medium include read-only memory, random-access memory, field programmable gate arrays (FPGAs), application specific integrated circuits (ASICs), CD-ROMs, magnetic tape, optical data storage devices, and carrier waves. The computer readable medium can also be distributed over a network coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An apparatus for acquiring a plurality of images inside a cooking device, comprising:
   a housing having a front surface, back surface, and an interior;
   at least one attachment coupled to the housing, the attachment configured to removably secure the housing to an external surface of the cooking device;
   a camera positioned at least partially within the interior of the housing, the camera configured to acquire the plurality of images at predetermined periods of time; and a controller configured to: i) receive the plurality of images acquired by the camera and ii) transmit the plurality of images to a remote electronic device, wherein the cooking device is an oven, and wherein the external surface of the cooking device comprises a window of the oven.

2. The apparatus of claim 1, wherein the housing further comprises:

a camera opening configured to receive the camera; and a data port configured to receive and transmit data.

3. The apparatus of claim 1, further comprising a memory configured to store the at least one image.

4. The apparatus of claim 1, comprising a plurality of other cameras wherein each of the plurality of cameras is designed to view different locations inside the cooking device.

5. The apparatus of claim 4, wherein each of the plurality of cameras is electronically controlled by the remote electronic device.

6. The apparatus of claim 4, wherein each of the plurality of cameras is manually positionable.

7. An apparatus for acquiring a plurality of images inside a cooking device, comprising:

a housing having a front surface, back surface, and an interior;

at least one attachment coupled to the housing, the attachment configured to removably secure the housing to an external surface of the cooking device;

a camera positioned at least partially within the interior of the housing, the camera configured to acquire the plurality of images at predetermined periods of time;

a controller configured to: i) receive the plurality of images acquired by the camera and ii) transmit the plurality of images to a remote electronic device; and at least one display configured to present cooking data.

8. The apparatus of claim 7, wherein the cooking data includes at least temperature data, pressure data, instructional data, and the plurality of images.

9. The apparatus of claim 7, wherein the at least one display is configured to display an alert or notification.

10. The apparatus of claim 1, further comprising a pressure sensor configured to detect a location pressure.

11. An apparatus for acquiring a plurality of images inside a cooking device, comprising:

a housing having a front surface, back surface and a receiver opening configured to receive a portable electronic device including at least one camera;

at least one attachment coupled to the housing, the attachment configured to removably secure the housing to an external surface of the cooking device; and a controller configured to: i) receive each of the plurality of images acquired by the at least one camera in accordance with predetermined criterion and ii) transmit the plurality of images to a remote electronic device, wherein the cooking device is an oven, and wherein the external surface of the cooking device comprises a window of the oven.

12. The apparatus of claim 11, wherein the attachment includes at least one suction element.

13. The apparatus of claim 11, further comprising at least one display configured to present cooking data.

14. The apparatus of claim 13, wherein the cooking data includes at least temperature data, pressure data, instructional data, and the plurality of images.

15. The apparatus of claim 11, further comprising a pressure sensor configured to detect a location pressure.

16. The apparatus of claim 11, wherein the cooking device is a cooking device, and wherein the external surface of the cooking device comprises a window of the cooking device.

17. The apparatus of claim 11, wherein the apparatus is configured to present cooking data.

18. The apparatus of claim 17, wherein the cooking data includes at least temperature data, instructional data, and the plurality of images.

19. The apparatus of claim 18, wherein the cooking device is a cooking device, and wherein the external surface of the cooking device comprises a window of the cooking device.

20. An apparatus for acquiring a plurality of images inside a cooking device, comprising:

a housing having a front surface, back surface and a receiver opening configured to receive a portable electronic device including at least one camera;

at least one attachment coupled to the housing, the attachment configured to removably secure the housing to an external surface of the cooking device; and a controller configured to: i) receive each of the plurality of images acquired by the at least one camera in accordance with predetermined criterion and ii) transmit the plurality of images to a remote electronic device, wherein the attachment includes at least one suction element.

21. The apparatus of claim 20, wherein the cooking device is a cooking device, and wherein the external surface of the cooking device comprises a window of the cooking device.

22. The apparatus of claim 20, wherein the apparatus is configured to present cooking data.

23. The apparatus of claim 22, wherein the cooking data includes at least temperature data, instructional data, and the plurality of images.

24. The apparatus of claim 22, wherein the cooking data includes at least temperature data or instructional data.

25. The apparatus of claim 20, further comprising a pressure sensor configured to detect a location pressure.

26. The apparatus of claim 1, wherein the apparatus is configured to capture cooking data.

27. The apparatus of claim 26, wherein the cooking data includes at least temperature data.

* * * * *